United States Patent
Uhm et al.

(10) Patent No.: US 12,507,579 B2
(45) Date of Patent: Dec. 23, 2025

(54) ELECTRONIC DEVICE COMPRISING DISPLAY WITH AN OPAQUE PORTION THEREIN AND CAMERA DEVICE

(71) Applicant: Samsung Electronics Co., Ltd., Suwon-si (KR)

(72) Inventors: Minsuk Uhm, Suwon-si (KR); Sungyoung Shin, Suwon-si (KR); Hyunchang Shin, Suwon-si (KR); Byungduk Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

(21) Appl. No.: 18/155,415

(22) Filed: Jan. 17, 2023

(65) Prior Publication Data

US 2023/0156347 A1    May 18, 2023

Related U.S. Application Data

(63) Continuation of application No. PCT/KR2021/007948, filed on Jun. 24, 2021.

(30) Foreign Application Priority Data

Jul. 21, 2020   (KR) .................. 10-2020-0090163

(51) Int. Cl.
*H10K 59/80* (2023.01)
*H04N 23/81* (2023.01)
(Continued)

(52) U.S. Cl.
CPC ......... *H10K 59/8792* (2023.02); *H04N 23/81* (2023.01); *H10K 59/131* (2023.02);
(Continued)

(58) Field of Classification Search
CPC ...... H04N 23/81; H10K 59/131; H10K 59/80; H10K 59/35; H10K 59/90; H10K 59/121;
(Continued)

(56) References Cited

U.S. PATENT DOCUMENTS 8,233,066 B2 * 7/2012 Zheng ................. H10F 39/8033
                                                        348/340
8,314,869 B2 * 11/2012 Zheng ................... H10F 39/809
                                                         348/340
(Continued)

FOREIGN PATENT DOCUMENTS

CN          107241466 A     10/2017
KR      10-2008-0046321 A    5/2008
(Continued)

OTHER PUBLICATIONS

Indian Office Action dated May 13, 2024, issued in Indian Application No. 202317003477.

(Continued)

*Primary Examiner* — Chiawei Chen
(74) *Attorney, Agent, or Firm* — Jefferson IP Law, LLP

(57) ABSTRACT

An electronic device is provided. The electronic device includes a display and a camera device, the camera device overlaps at least a portion of an active area in a second direction of the display. The display comprises a display panel comprising a first active area, which has a first transmittance, at least partially overlaps on the camera device, and comprises a viewing angle area corresponding to the viewing angle of the camera device, and a second active area having a second transmittance that is lower than the first transmittance, the display panel comprises a mask layer comprising an opaque mask, and the opaque mask comprises a first portion at least partially formed in the viewing angle area, and a second portion formed to have a specified (Continued)

width and encompass the outer boundary of the viewing angle area.

15 Claims, 33 Drawing Sheets

(51) Int. Cl.
*H10K 59/131* (2023.01)
*H10K 59/35* (2023.01)
*H10K 59/65* (2023.01)

(52) U.S. Cl.
CPC ............. *H10K 59/80* (2023.02); *H10K 59/35* (2023.02); *H10K 59/65* (2023.02); *H10K 59/873* (2023.02); *H10K 59/8794* (2023.02)

(58) Field of Classification Search
CPC ............. H10K 59/8794; H10K 77/111; H10K 59/8792; H10K 59/65; H10K 59/873; H10K 2102/311; G06F 1/1637; G06F 1/1652; G06F 1/1686
See application file for complete search history.

(56) References Cited

U.S. PATENT DOCUMENTS

| | | | |
|---|---|---|---|
| 9,075,199 B2* | 7/2015 | Jiao | G02B 5/005 |
| 9,143,668 B2* | 9/2015 | Mathew | G06F 1/1637 |
| 9,411,471 B2* | 8/2016 | Rho | G06F 3/041 |
| 9,767,728 B2* | 9/2017 | Evans, V | G02B 27/0093 |
| 10,067,333 B2* | 9/2018 | Sakai | A61B 1/0052 |
| 10,331,260 B2* | 6/2019 | Evans, V | G06F 1/1637 |
| 10,332,920 B2* | 6/2019 | Evans, V | G02F 1/1341 |
| 10,917,506 B2* | 2/2021 | Cheng | H04M 1/0266 |
| 10,983,652 B2* | 4/2021 | Jung | G06F 1/1643 |
| 11,057,554 B2* | 7/2021 | Nakamura | G02F 1/1368 |
| 11,196,849 B2* | 12/2021 | Tang | G02F 1/133512 |
| 11,418,738 B2* | 8/2022 | Duan | H10F 39/8053 |
| 2008/0111159 A1* | 5/2008 | Gambino | H10F 39/802 257/E21.456 |
| 2008/0158396 A1* | 7/2008 | Fainstain | H04N 25/67 348/E9.037 |
| 2011/0157438 A1* | 6/2011 | Compton | H04N 25/617 348/294 |
| 2011/0223697 A1 | 9/2011 | Yong-Hwan et al. | |
| 2012/0038811 A1* | 2/2012 | Ellis-Monaghan | H04N 25/62 348/308 |
| 2012/0105400 A1* | 5/2012 | Mathew | G06F 1/1686 345/207 |
| 2012/0106063 A1 | 5/2012 | Mathew et al. | |
| 2012/0243091 A1 | 9/2012 | Amm et al. | |
| 2014/0027611 A1* | 1/2014 | Patel | H04N 25/673 250/208.1 |
| 2014/0063265 A1* | 3/2014 | Shukla | H04N 23/00 348/374 |
| 2014/0246714 A1* | 9/2014 | Lee | H10F 39/803 438/69 |
| 2015/0116533 A1* | 4/2015 | Hsu | H04N 25/633 348/223.1 |
| 2016/0161664 A1 | 6/2016 | Ishida et al. | |
| 2017/0026553 A1* | 1/2017 | Lee | G02F 1/1341 |
| 2017/0084231 A1 | 3/2017 | Chew | |
| 2017/0123575 A1 | 5/2017 | Evans, V et al. | |
| 2017/0187934 A1 | 6/2017 | Kwak et al. | |
| 2017/0251137 A1 | 8/2017 | Evans, V et al. | |
| 2018/0046837 A1 | 2/2018 | Gozzini et al. | |
| 2018/0067245 A1 | 3/2018 | Giachino et al. | |
| 2018/0213124 A1* | 7/2018 | Yokohama | H04N 1/4076 |
| 2019/0025954 A1 | 1/2019 | Wang et al. | |
| 2019/0123115 A1 | 4/2019 | Sun et al. | |
| 2019/0149687 A1* | 5/2019 | Chang | H01L 27/14605 257/292 |
| 2019/0245958 A1* | 8/2019 | Cheng | G06F 1/1656 |
| 2019/0317629 A1* | 10/2019 | Jung | G06F 3/0488 |
| 2019/0341741 A1* | 11/2019 | Liang | H01S 5/18361 |
| 2020/0074959 A1* | 3/2020 | Bhat | G09G 5/02 |
| 2020/0286436 A1* | 9/2020 | Lim | G06F 3/041 |
| 2021/0041737 A1* | 2/2021 | Aoki | G02F 1/133512 |
| 2021/0065625 A1* | 3/2021 | Wang | G09G 3/2003 |
| 2021/0157362 A1 | 5/2021 | Jo et al. | |
| 2021/0377496 A1* | 12/2021 | Kim | H04N 25/778 |
| 2021/0392767 A1* | 12/2021 | E | G03B 11/045 |
| 2022/0005906 A1* | 1/2022 | Jeong | H10K 71/00 |
| 2022/0155831 A1* | 5/2022 | Sun | H10K 59/8052 |
| 2022/0208897 A1* | 6/2022 | Yue | H10K 59/122 |

FOREIGN PATENT DOCUMENTS

| | | |
|---|---|---|
| KR | 10-2011-0101774 A | 9/2011 |
| KR | 10-2013-0114241 A | 10/2013 |
| KR | 10-2017-0077360 A | 7/2017 |
| KR | 10-2017-0109651 A | 9/2017 |
| KR | 10-2019-0120051 A | 10/2019 |
| KR | 10-2019-0121604 A | 10/2019 |

OTHER PUBLICATIONS

International Search Report dated Oct. 7, 2021, issued in International Patent Application No. PCT/KR2021/007948.
Extended European Search Report dated Dec. 7, 2023, issued in European Application No. 21845371.0-1224.
Korean Office Action dated Oct. 8, 2024, issued in Korean Patent Application No. 10-2020-0090163.
Korean Office Action dated Jun. 18, 2025, issued in a Korean Patent Application No. 10-2020-0090163.

* cited by examiner

ELECTRONIC DEVICE COMPRISING DISPLAY WITH AN OPAQUE PORTION THEREIN AND CAMERA DEVICE

CROSS-REFERENCE TO RELATED APPLICATION(S)

This application is a continuation application, claiming priority under § 365(c), of an International application No. PCT/KR2021/007948, filed on Jun. 24, 2021, which is based on and claims the benefit of a Korean patent application number 10-2020-0090163, filed on Jul. 21, 2020, in the Korean Intellectual Property Office, the disclosure of which is incorporated by reference herein in its entirety.

BACKGROUND

1. Field

The disclosure relates to an electronic device including a display and a camera device.

2. Description or Related Art

An electronic device, for example, a portable electronic device, is released in various sizes according to functions thereof and user preferences, and may include a large-screen touch display for securing wide visibility and convenience of manipulation. The electronic device may include at least one camera device. For example, the electronic device may include at least one camera device disposed near a display or to overlap at least a portion of the display.

The above information is presented as background information only to assist with an understanding of the disclosure. No determination has been made, and no assertion is made, as to whether any of the above might be applicable as prior art with regard to the disclosure.

SUMMARY

In order to expand the display area of a display, a camera device may be disposed near (e.g., under) an active area of the display in an electronic device. In this case, in order for at least a partial area overlapping the camera device, among the active regions of the display, to perform a display function while satisfying a transmittance required by the camera device, the arrangement of pixels and/or wirings may be changed differently from the surroundings (e.g., the area around the partial area overlapping with the camera device). For example, in the at least partial area overlapping the camera device, pixels and/or wirings may be arranged at a low density, and this area may be defined as a transmissive area.

In the case of an electronic device in which a camera device is disposed under an active area of a display, pixels and/or wirings (e.g., metal) are formed in an irregular arrangement structure in the transmissive area, and thus diffraction having various frequencies may occur in light entering the camera device. When the diffraction occurs, a phenomenon in which the modulation transfer function (MTF) for each frequency (e.g., spatial frequency) of the incoming light is not a straight-line shape (e.g., linear) but fluctuates in a curved shape (e.g., a sine wave) (e.g., a phenomenon in which the MTF is generally lowered) appears, and this phenomenon may deteriorate the image quality of the camera device.

A display may include a display panel and a protective layer attached to the rear surface of the display panel. The protective layer may include a metal sheet formed of a material of Cu, Al, Mg, steel use stainless (SUS), or metal clad (e.g., a stacked member in which SUS and Al are alternately disposed). The metal sheet may be used to increase rigidity of an electronic device and to shield noise. However, the metal sheet may increase the thickness of the electronic device, and when wrinkled, may cause a poor appearance of the display.

Aspects of the disclosure are to address at least the above-mentioned problems and/or disadvantages and to provide at least the advantages described below. Accordingly, an aspect of the disclosure is to provide an electronic device including a display and a camera device.

Another aspect of the disclosure is to provide an electronic device including a display and a camera device, the electronic device being configured to improve image quality by reducing diffraction of light entering the camera device.

Another aspect of the disclosure is to provide an electronic device including a display and a camera device, wherein at least a portion of a metal sheet disposed on the rear surface of the display may be removed, thereby reducing the thickness of the electronic device and preventing a poor appearance of the display due to wrinkling of the metal sheet.

Additional aspects will be set forth in part in the description which follows and, in part, will be apparent from the description, or may be learned by practice of the presented embodiments.

In accordance with an aspect of the disclosure, an electronic device is provided. The electronic device includes a display and a camera device disposed to overlap at least a portion of an active area in a second direction of the display, wherein the display includes a display panel which includes a first active area having a first transmittance, at least partially overlapping the camera device, and including a field-of-view area corresponding to the field of view of the camera device, and a second active area having a second transmittance lower than the first transmittance, the display panel includes a mask layer including an opaque mask, and the opaque mask includes a first portion at least partially formed in the field-of-view area, and a second portion formed to surround an outer boundary of the field-of-view area with a designated width.

In accordance with another aspect of the disclosure, a display for a camera device configured to capture an image of external light having passed through the display is provided. The display includes a display panel which includes a first active area having a first transmittance, at least partially overlapping the camera device, and including a field-of-view area corresponding to the field of view of the camera device, and a second active area having a second transmittance lower than the first transmittance, wherein the display panel includes a mask layer including an opaque mask, and the opaque mask includes a first portion at least partially formed in the field-of-view area, and a second portion formed to surround an outer boundary of the field-of-view area with a designated width.

According to various embodiments of the disclosure, a mask layer including patterns designated to at least partially overlap a camera device (or the field of view of the camera device) may be added to a display (e.g., a display panel), and thus diffraction of light entering the camera device may be reduced by the designated patterns.

According to various embodiments of the disclosure, an opaque mask forming the designated patterns in the mask layer may be formed to expand to the outside of the transmissive area, and thus the opaque mask may function as a metal sheet disposed on the rear surface of the display (e.g., the display panel).

According to various embodiments of the disclosure, at least a portion of a metal sheet may be removed, thereby reducing the thickness of the electronic device and preventing a poor appearance of the display due to the wrinkling of the metal sheet.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
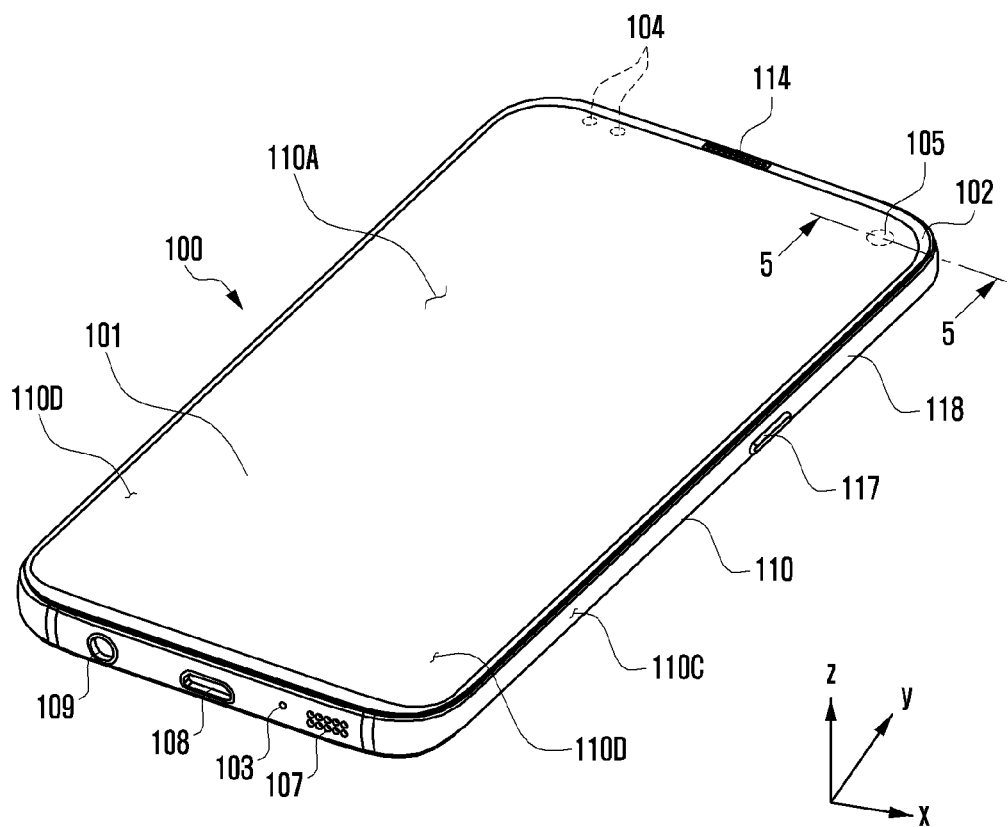
FIG. 1 is a perspective view of the front surface of an electronic device according to an embodiment of the disclosure.

FIG. 1 is a perspective view of the front surface of an electronic device according to an embodiment of the disclosure.

Figure 2:
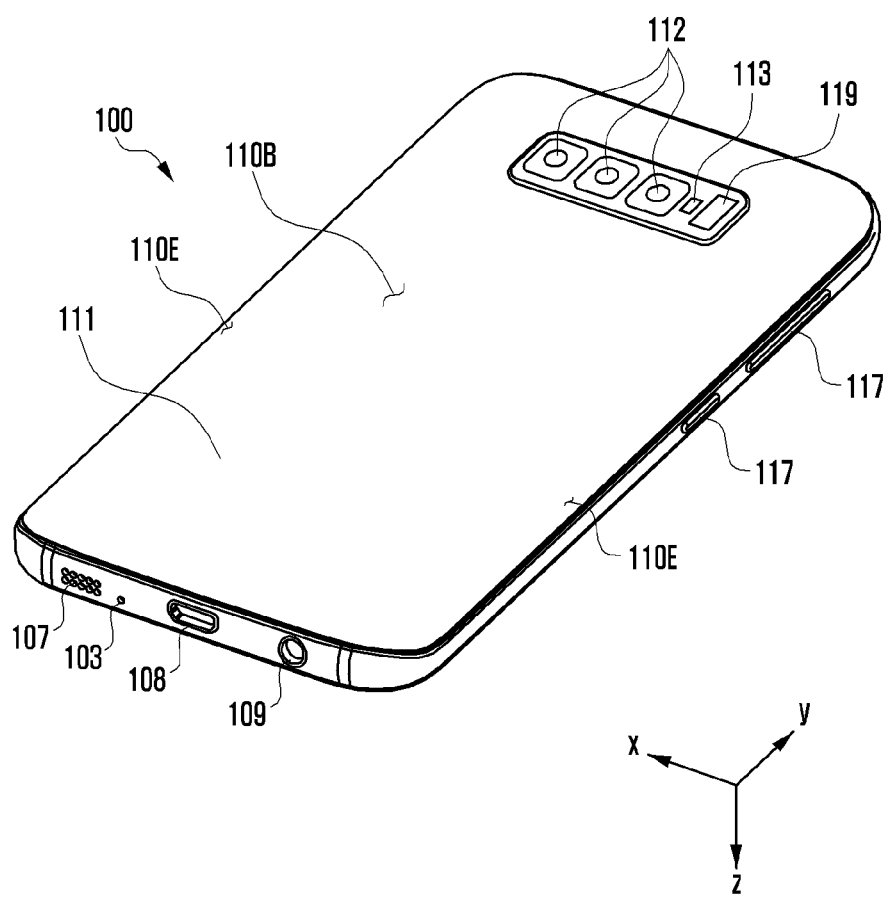
FIG. 2 is a perspective view of the rear surface of the electronic device of FIG. 1 according to an embodiment of the disclosure.

FIG. 2 is a perspective view of the rear surface of the electronic device of FIG. 1 according to an embodiment of the disclosure.

Referring to FIGS. 1 and 2, an electronic device 100 according to an embodiment may include a housing 110 including a first surface (or a front surface) 110A, a second surface (or a rear surface) 110B, and a side surface 110C surrounding the space between the first surface 110A and the second surface 110B. In another embodiment (not shown), the housing may refer to a structure that forms some of the first surface 110A, the second surface 110B, and the side surface 110C of FIG. 1. According to one embodiment, the first surface 110A may be formed by a front plate 102 (e.g., a glass plate including various coating layers, or a polymer plate), at least a portion of which is substantially transparent. The second surface 110B may be formed by a substantially opaque rear plate 111. The rear plate 111 may be formed of, for example, coated or colored glass, ceramic, polymer, metal (e.g., aluminum, stainless steel (STS), or magnesium), or a combination of at least two of the above materials. The side surface 110C may be coupled to the front plate 102 and the rear plate 111, and may be formed of a lateral bezel structure 118 (or "a lateral member") including a metal and/or a polymer. In an embodiment, the rear plate 111 and the lateral bezel structure 118 may be integrally formed and may include an identical material (e.g., a metal material such as aluminum).

In the illustrated embodiment, the front plate 102 may include a first area 110D, which is curved and seamlessly extends from the first surface 110A toward the rear plate, at both ends of a long edge of the front plate. In the illustrated embodiment (see FIG. 2), the rear plate 111 may include a second area 110E, which is curved and seamlessly extends from the second surface 110B toward the front plate, at both ends of the long edge. In an embodiment, the front plate 102 or the rear plate 111 may include only one of the first area 110D or the second area 110E. In an embodiment, the front plate 102 may include only a flat surface disposed parallel to the second surface 110B without including the first area 110D and the second area 110E. In the above-mentioned embodiments, when viewed from the side surface of the electronic device 100, the lateral bezel structure 118 may have a first thickness (or width) at a side surface in which the first area 110D or the second area 110E as described above is not included, and may have a second thickness thinner than the first thickness at a side surface including the first area 110D or the second area 110E.

According to one embodiment, the electronic device 100 may include at least one among a display 101, an input device 103, sound output devices 107 and 114, sensor modules 104 and 119, camera devices 105, 112, and 113, a key input device 117, an indicator (not shown), and connectors 108 and 109. In an embodiment, in the electronic device 100, at least one (e.g., the key input device 117, the connectors 108 and 109, or an indicator) of the elements may be omitted, or other elements may be additionally included.

According to an embodiment, the display 101 may be viewed through at least a portion of the front plate 102, for example. In an embodiment, at least a portion of the display 101 may be viewed through the front plate 102 forming the first area 110D of the first surface 110A and the side surface 110C. In an embodiment, an edge of the display 101 may be shaped to be substantially identical to the shape of adjacent outer edge of the front plate 102. In another embodiment (not shown), in order to expand the exposed area of the display 101, the distance between the outer edge of the display 101 and the outer edge of the front plate 102 may be formed to be substantially equal.

According to an embodiment, the surface of the housing 110 (or the front plate 102) may include a screen display area formed as the display 101 is visually exposed. In an example, the screen display area may include the first surface 110A and the first area 110D of the side surface 110C.

According to one embodiment, in the electronic device 100, the camera device 105 may be disposed under at least a portion of the screen display areas 110A and 110D of the display 101, and thus may perform a related function (e.g., image capturing) while the location of the camera device 105 is not visually distinguished (or exposed). For example, when the screen display areas 110A and 110D of the display 101 are viewed in the z-axis direction, the camera device 105 may be disposed to overlap at least a portion of the screen display areas 110A and 110D, and may acquire an image of an external subject without being exposed to the outside. In an embodiment, the camera device 105 may include multiple camera devices 105 and 112. In another embodiment, the camera devices 105 and 112 may be arranged to be visually distinguished (or exposed) from the screen display areas 110A and 110D of the display 101 in the inner space of the electronic device 100.

In another embodiment, a recess or opening may be formed in a portion of the screen display area (e.g., the first surface 110A or first area 110D) of the display 101, and at least one among the sound output device 114, the sensor modules 104, a light-emitting element (e.g., a flash), and the camera device 105 at least partially aligned with the recess or the opening may be included. In another embodiment (not shown), at least one among the sound output device 114, the sensor module 119, a light-emitting element (e.g., a flash), and the camera device 112 may be included in the rear surface of the screen display area of the display 101.

According to an embodiment, the display 101 may be coupled to or disposed adjacent to a touch sensing circuit, a pressure sensor capable of measuring the intensity (pressure) of a touch, and/or a digitizer for detecting a magnetic field-type stylus pen. In an embodiment, at least some of the sensor modules 104 and 119 and/or at least some of the key input devices (e.g., key input device 117) may be disposed in the first area 110D and/or the second area 110E.

According to an embodiment, the input device 103 may include a microphone 103. In an embodiment, the input device 103 may include multiple microphones 103 disposed to detect the direction of sound. The sound output devices 107 and 114 may include speakers 107 and 114. The speakers 107 and 114 may include an external speaker 107 and a call receiver 114. In an embodiment, the microphone 103, the speakers 107 and 114, and the connectors 108 and 109 are arranged in the space of the electronic device 100, and may be exposed to the external environment through at least one hole formed in the housing 110. In an embodiment, the hole formed in the housing 110 may be used in common for the microphone 103 and the speakers 107 and 114. In an embodiment, the sound output devices 107 and 114 may include a speaker (e.g., piezo speaker) that operates without the hole formed in the housing 110.

According to an embodiment, the sensor modules 104 and 119 may generate an electrical signal or data value corresponding to the operation state inside the electronic device 100 or an external environmental state. The sensor modules 104 and 119 may include, for example, a first sensor module 104 (e.g., a proximity sensor) and/or a second sensor module (not shown) (e.g., a fingerprint sensor) disposed on the first surface 110A of the housing 110, and/or a third sensor module 119 (e.g., a heart rate monitor (HRM) sensor) disposed on the second surface 110B of the housing 110. The fingerprint sensor may be disposed under the first surface 110A of the housing 110, a partial area of the second surface 110B, or under the display 101. The electronic device 100 may include at least one of unillustrated sensor modules, for example, a gesture sensor, a gyro sensor, a barometric pressure sensor, a magnetic sensor, an acceleration sensor, a grip sensor, a color sensor, an infrared (IR) sensor, a biosensor, a temperature sensor, a humidity sensor, or an illuminance sensor.

According to an embodiment, the camera devices 105 and 112 may include a first camera device 105 disposed on the first surface 110A of the electronic device 100, and/or a second camera device 112 disposed on the second surface 110B. The camera devices 105 and 112 may include one or more lenses, an image sensor, and/or an image signal processor. The camera devices 105 and 112 may include a flash 113. The flash 113 may include, for example, a light-emitting diode or a xenon lamp. In an embodiment, two or more lenses (a wide-angle lens, an ultra-wide-angle lens, or a telephoto lens) and image sensors may be disposed on one surface of the electronic device 100.

According to an embodiment, the electronic device 100 may include multiple camera devices (e.g., dual cameras, or triple cameras) having different attributes (e.g., the field of view) or functions. For example, multiple camera devices 105 and 112 including lenses having different fields of view may be included. The electronic device 100 may control to change the fields of view of the camera devices 105 and 112, based on a user's selection. For example, at least one of the multiple camera devices 105 and 112 may be a wide-angle camera, and at least other one may be a telephoto camera. According to an embodiment, at least one of the multiple camera devices 105 and 112 may be a front camera facing the front in the z-axis direction of the electronic device 100, and at least other one may be a rear camera facing the rear surface opposite to the front surface. According to an embodiment, the multiple camera devices 105 and 112 may include at least one of a wide-angle camera, a telephoto camera, or an infrared (IR) camera (e.g., a time-of-flight (TOF) camera or a structured light camera). According to an embodiment, the IR camera may be operated as at least some of the sensor modules 104 and 119. For example, the TOF camera may be operated as at least some of the sensor modules 104 and 119 for detecting a distance to a subject.

According to an embodiment, the key input device 117 may be disposed on the side surface 110C of the housing 110. In another embodiment, the electronic device 100 may not include some or all of the above-mentioned key input devices (e.g., key input device 117), and the key input device 117 that is not included may be implemented in another form such as a soft key on the display 101. In another embodiment, the key input device 117 may be implemented using a pressure sensor included in the display 101.

According to an embodiment, the indicator may be disposed, for example, on the first surface 110A of the housing 110. The indicator may provide, for example, state information of the electronic device 100 in the form of light (e.g., a light-emitting element). In another embodiment, the light-emitting element may provide, for example, a light source that operates in conjunction with the operation of the camera device 105. The indicator may include, for example, a light-emitting diode (LED), an IR LED, and a xenon lamp.

According to one embodiment, the connector holes 108 and 109 may include a first connector hole 108 capable of accommodating a connector (e.g., a USB connector) for transmitting and receiving power and/or data to and from an external electronic device, and/or a second connector hole (or an earphone jack) 109 capable of accommodating a connector for transmitting and receiving audio signals to and from an external electronic device.

According to an embodiment, some cameras device 105 among the camera devices 105 and 112, some sensor modules 104 among the sensor modules 104 and 119, and/or the indicator may be disposed to be viewed through the display 101. In another embodiment, the camera device 105, the sensor modules 104, and/or the indicator may be disposed in the inner space of the electronic device 100 so as to be in contact with the external environment through a transparent area of the display 101 to the front plate 102. Also, some sensor modules 104 may be disposed to perform functions thereof without being visually exposed through the front plate 102 in the inner space of the electronic device.

Figure 3:
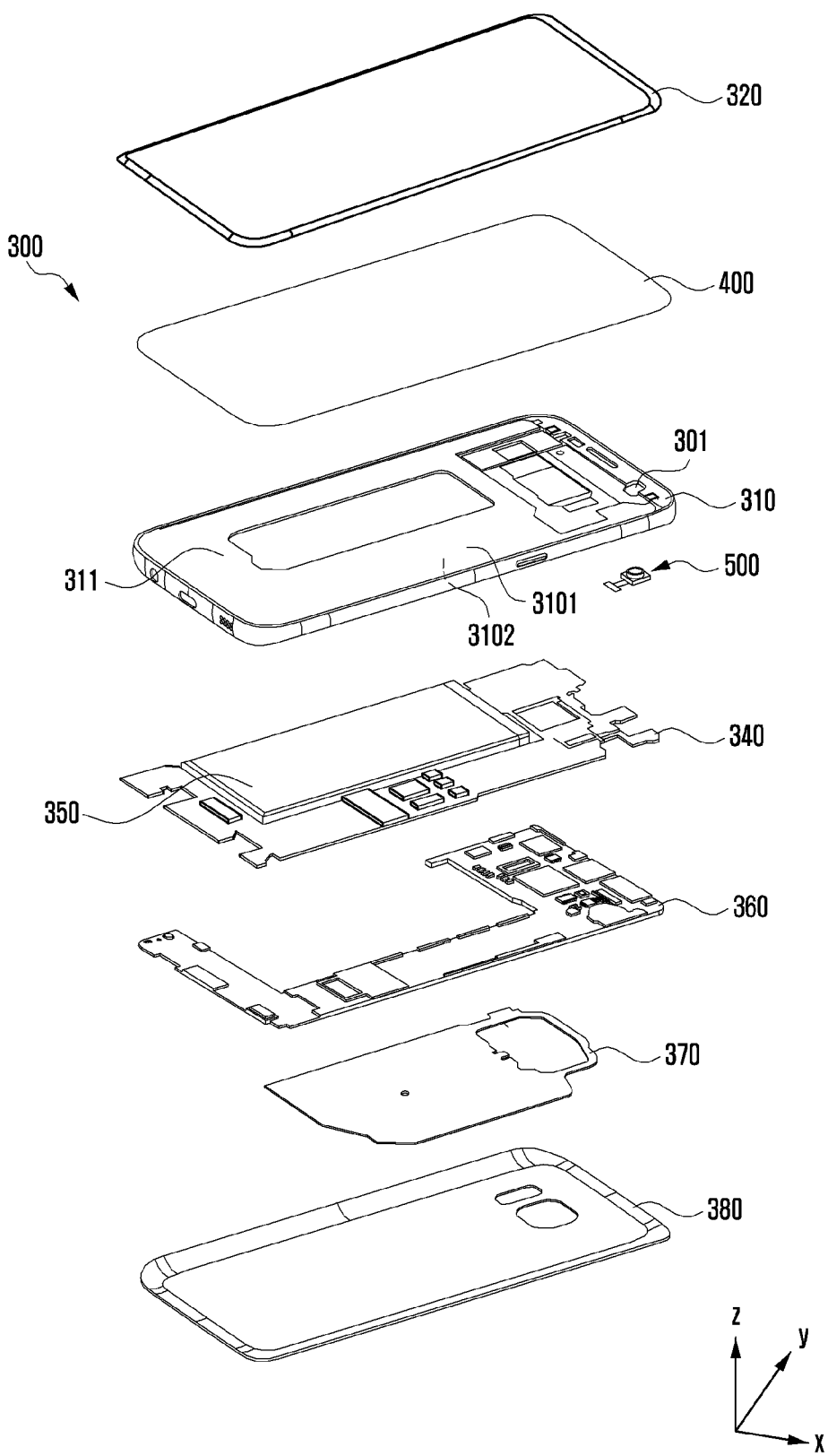
FIG. 3 is an exploded perspective view of the electronic device of FIG. 1 according to an embodiment of the disclosure.

FIG. 3 is an exploded perspective view of the electronic device of FIG. 1 according to an embodiment of the disclosure.

Electronic device 300 of FIG. 3 may be at least partially similar to the electronic device 100 of FIGS. 1 and 2 or may further include another embodiment of the electronic device.

Referring to FIG. 3, an electronic device 300 (e.g., the electronic device 100 of FIG. 1 or 2) may include a lateral member 310 (e.g., the lateral bezel structure 118 of FIG. 2), a first support member 311 (e.g., a bracket or a support structure), a front cover 320 (e.g., a front cover, or the front plate 102 of FIG. 1), a display 400 (e.g., the display 101 of FIG. 1), a printed circuit board 340 (e.g., a printed circuit board (PCB), a flexible PCB (FPCB), or a rigid flexible PCB (RFPCB)), a battery 350, a second support member 360 (e.g., a rear case), an antenna 370, and a rear plate 380 (e.g., a rear cover, or the rear plate 111 of FIG. 2). In an embodiment, in the electronic device 300, at least one (e.g., the first support member 311, or the second support member 360) of the elements may be omitted or other elements may be additionally included. At least one of the elements of the electronic device 300 may be identical or similar to at least one of the elements of the electronic device 100 of FIG. 1 or 2, and a redundant description thereof will be omitted below.

According to an embodiment, the first support member 311 may be disposed inside the electronic device 300 and connected to the lateral member 310, or may be formed integrally with the lateral member 310. The first support member 311 may be formed of, for example, a metal material and/or a non-metal (e.g., polymer) material. The first support member 311 may have one surface to which the display 400 is coupled, and the other surface to which the printed circuit board 340 is coupled.

According to an embodiment, a processor, a memory, and/or an interface may be mounted on the printed circuit board 340. The processor may include, for example, at least one of a central processing unit, an application processor, a graphics processing unit, an image signal processor, a sensor hub processor, or a communication processor.

According to an embodiment, the memory may include, for example, a volatile memory or a non-volatile memory.

According to an embodiment, the interface may include, for example, a high-definition multimedia interface (HDMI), a universal serial bus (USB) interface, a secure digital (SD) card interface, and/or an audio interface. The interface may, for example, electrically or physically connect the electronic device 300 to an external electronic device, and may include a USB connector, an SD card/multimedia card (MMC) connector, or an audio connector.

According to an embodiment, the battery 350 is a device for supplying power to at least one element of the electronic device 300, and may include, for example, a non-rechargeable primary battery, a rechargeable secondary battery, or a fuel cell. At least a portion of the battery 350 may be disposed substantially on the same plane as the printed circuit board 340, for example. The battery 350 may be integrally disposed in the electronic device 300. In another embodiment, the battery 350 may be disposed detachably from the electronic device 300.

According to an embodiment, the antenna 370 may be disposed between the rear plate 380 and the battery 350. The antenna 370 may include, for example, a near-field communication (NFC) antenna, a wireless charging antenna, and/or a magnetic secure transmission (MST) antenna. The antenna 370 may, for example, perform short-range communication with an external device or wirelessly transmit/receive power required for charging to/from the external device. In another embodiment, an antenna structure may be formed by a portion of the side bezel structure (e.g., lateral member 310) and/or the first support member 311 or a combination thereof.

According to an embodiment, the second support member 360 (e.g., the rear case) may be disposed between the printed circuit board 340 and the antenna 370. According to an embodiment, the second support member 360 may include one surface to which at least one of the printed circuit board 340 and the battery 350 is coupled, and the other surface to which the antenna 370 is coupled.

According to various embodiments, the first support member 311 of the lateral member 310 may include a first surface 3101 facing the front cover 320 and a second surface 3102 facing a direction opposite to the direction faced by the first surface 3101 (e.g., toward the rear plate 380). According to an embodiment, a camera device 500 (e.g., the camera device 105 of FIG. 1) may be disposed between the first support member 311 and the rear plate 380. According to an embodiment, the camera device 500 may be disposed to protrude or be seen in the direction of the front cover 320 through a through-hole 301 connected from the first surface 3101 to the second surface 3102 of the first support member 311. According to an embodiment, a portion of the camera device 500 protruding through the through-hole 301 may be disposed to detect an external environment at a corresponding position of the display 400. In another embodiment, when the camera device 500 is disposed between the display 400 and the first support member 311, the through-hole 301 may be unnecessary.

Hereinafter, the arrangement relationship of the display 400 and the camera device 500 in the electronic device 300 will be described in detail.

Figure 4:
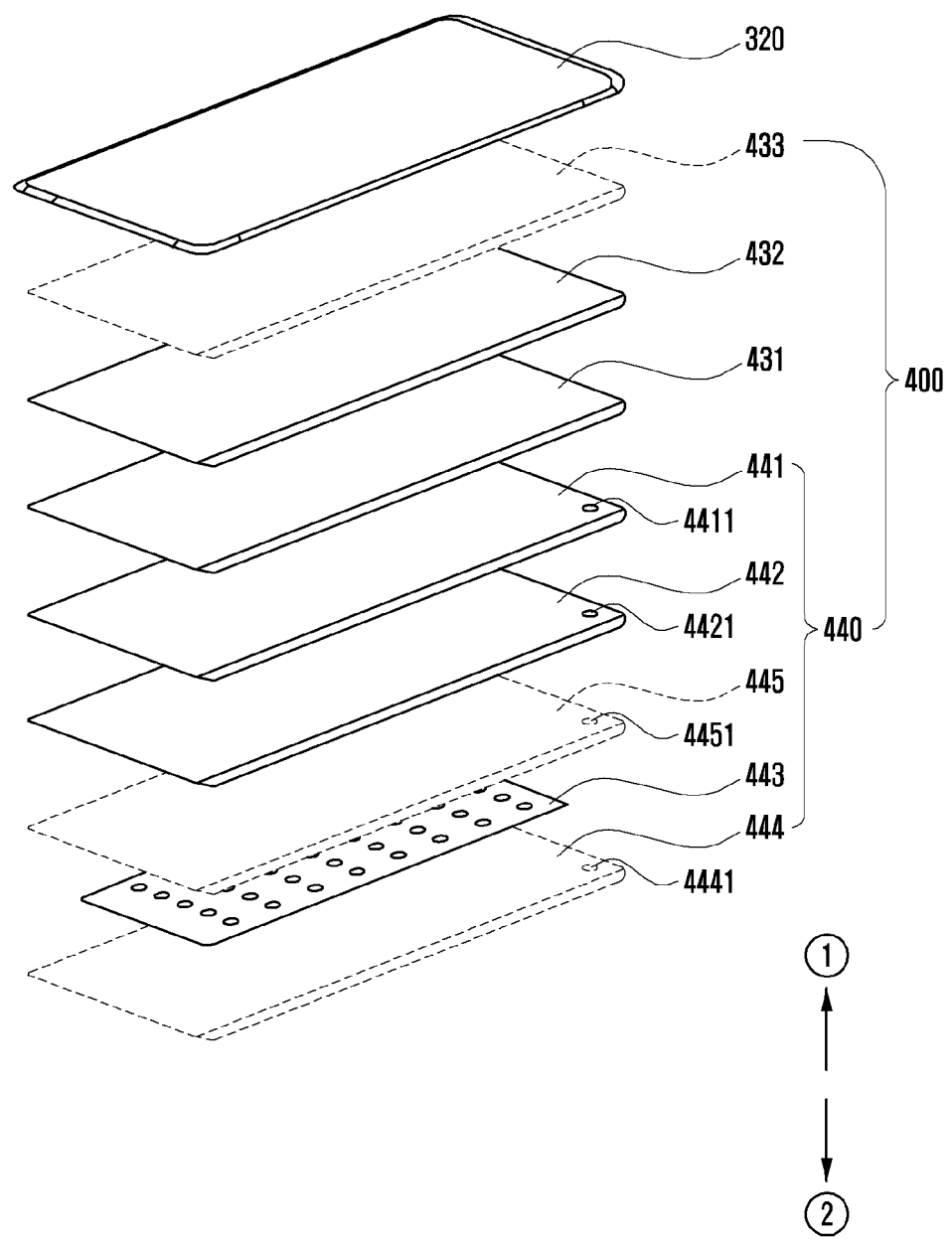
FIG. 4 is an exploded perspective view of a display according to an embodiment of the disclosure.

FIG. 4 is an exploded perspective view of a display according to an embodiment of the disclosure.

Display 400 of FIG. 4 may be at least partially similar to the display 101 of FIG. 1 and the display 400 of FIG. 3, or may further include another embodiment of the display.

Referring to FIG. 4, a display 400 may include a polarizer (POL) 432 (e.g., polarizing film), disposed through an adhesive (or a bonding agent) (e.g., an adhesive 410 of FIG. 5) on the rear surface (e.g., a surface facing a second direction (direction ②)) of the front cover 320 (e.g., a front plate, a glass plate, a first cover member, or a cover member), a display panel 431, and at least one protective layer 440 (e.g., subsidiary material layer) attached to the rear surface (e.g., a surface facing the second direction (direction ②)) of the display panel 431. According to an embodiment, the display 400 may have flexible properties.

According to an embodiment, the front cover 320 may include a glass layer. For example, the front cover 320 may include ultra-thin glass (UTG). In an embodiment, the front cover 320 may include a polymer. For example, the front cover 320 may include polyethylene terephthalate (PET) or polyimide (PI). In an embodiment, multiple front covers 320 may be disposed. In an embodiment, one layer of the multiple front covers 320 may be disposed with an adhesive having a weaker adhesive force or a thinner thickness than an adhesive of another layer so that the one layer can be well separated from the other layer. In an embodiment, the front cover 320 may further include various coating layers formed on at least a portion of at least one among a top surface, a bottom surface, and/or a side surface.

According to an embodiment, the adhesive may include an optical clear adhesive (OCA), a pressure sensitive adhesive (PSA), a heat-reactive adhesive, a general adhesive, and/or a double-sided tape.

Figure 7:
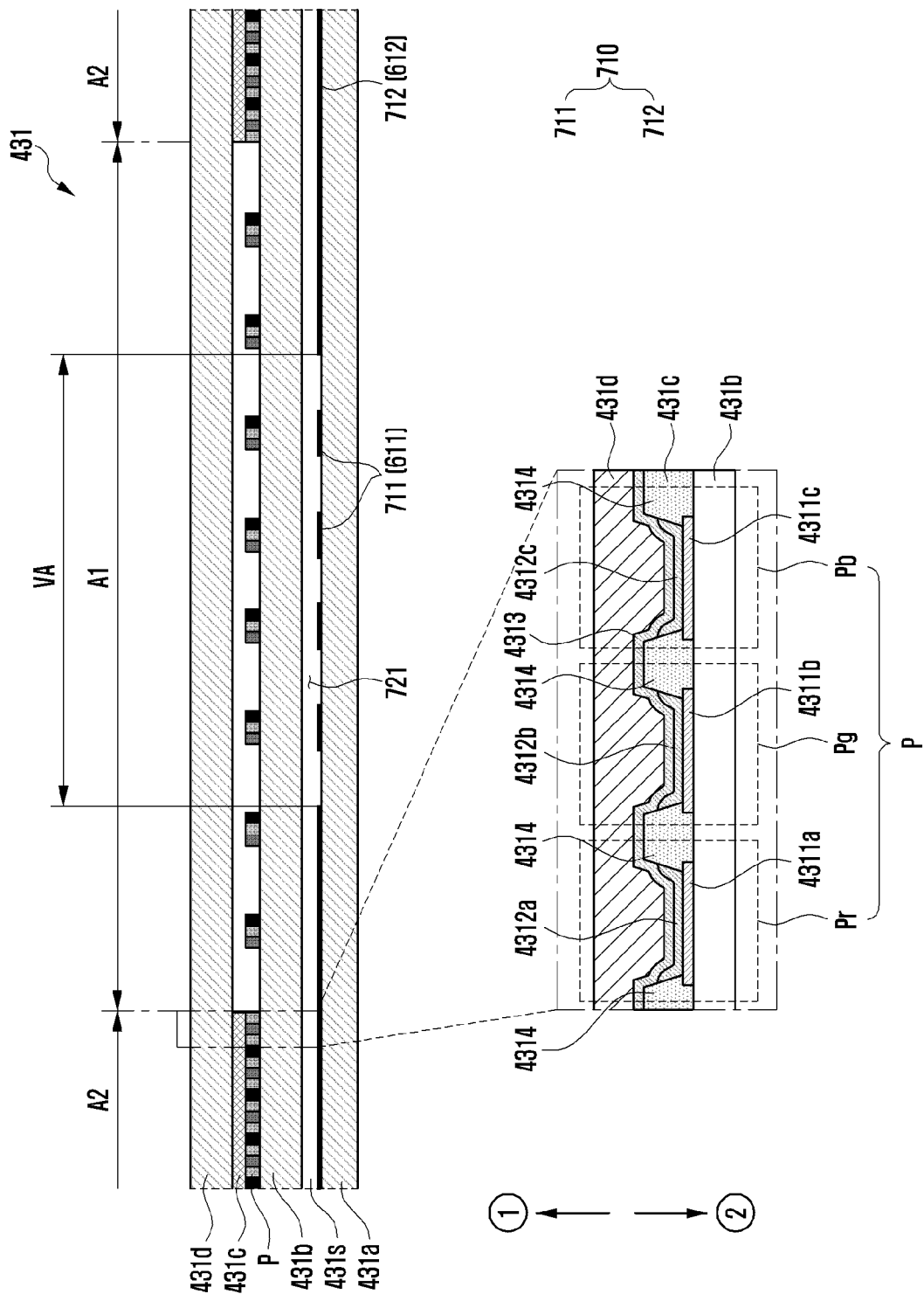
FIG. 7 is a partial cross-sectional view of a display panel in which area "7" of FIG. 6 is enlarged according to an embodiment of the disclosure.

According to an embodiment, the display panel 431 may include multiple pixels (e.g., a first sub-pixel area Pr, a second sub-pixel area Pg, or a third sub-pixel area Pb of FIG. 7). According to an embodiment, when the display 400 is viewed from a first direction (direction ①), multiple pixels may not be disposed in at least an area, which at least partially overlaps with a camera device (e.g., the camera device 105 of FIG. 1), among screen display areas (e.g., the first surface 110A and the first area 110D of FIG. 1). Also, the display panel 431 may include an encapsulation layer (e.g., an encapsulation layer 431d of FIG. 7) for protecting the multiple pixels. For example, the encapsulation layer may include encapsulation glass. According to an embodiment, the display panel 431 may include a low temperature polycrystalline silicon (LTPS) substrate (e.g., a flexible substrate made of glass or polymer) (not shown). According to an embodiment, the multiple pixels may include a thin film transistor (TFT) (not shown) formed on the LTPS substrate.

According to an embodiment, the display panel 431 may be formed of a flexible material. For example, the display panel 431 may include a bendable and flexible base film (not shown). According to one embodiment, the base film may include at least one material among polyethylene terephthalate (PET), polyethylene naphthalate (PEN), polyethylene sulfide (PES), polyethylene (PE), and polyimide (PI). According to one embodiment, a TFT layer (not shown) including multiple thin film transistors (TFTs) based on low temperature polycrystalline silicon (LTPS) or low temperature polycrystalline oxide (LTPO), an organic light-emitting layer (e.g., an intermediate layer 431c of FIG. 7) formed in the first direction (direction ①) from the TFT layer, or an encapsulation layer formed in the first direction (direction ①) from the organic light-emitting layer (e.g., the encapsulation layer 431d of FIG. 7) may be formed in the first direction (direction ①) from the base film. In an embodiment, the encapsulation layer may be a thin film encapsulation (TFE).

According to an embodiment, the POL 432 may selectively allow light, generated from a light source of the display panel 431 and vibrating in a predetermined direction, to pass therethrough. According to an embodiment, the display panel 431 and the POL 432 may be integrally formed. According to an embodiment, the display 400 is not limited to the illustrated structure and may be formed in various ways. For example, the display 400 may not include the POL 432 and may include a color filter layer (not shown) by a color filter on encapsulation (COE) method.

According to an embodiment, the front cover 320, the POL 432, the display panel 431, and the protective layer 440 may be attached to each other by using an adhesive.

According to various embodiments, the display 400 may include a control circuit (not shown). According to an embodiment, the control circuit may include a flexible printed circuit board (FPCB) for electrically connecting the printed circuit board (e.g., the printed circuit board 340 of FIG. 3) and the display panel 431 of the electronic device (e.g., the electronic device 300 of FIG. 3), and a display driver integrated circuit (DDIC) mounted on the FPCB. According to an embodiment, the control circuit (not shown) may include a display driver integrated circuit (DDIC) and/or a touch display driver integrated circuit (TDDIC) arranged in a chip-on-panel (COP) or chip-on-film (COF) manner According to an embodiment, the display 400 may additionally include a touch panel 433. According to an embodiment, when the display 400 operates as an in-cell type or on-cell type touch display depending on the arrangement position of the touch panel 433, the control circuit may include a touch display driver IC (TDDIC). In another embodiment, the display 400 may include a fingerprint sensor (not shown) disposed around the control circuit. According to one embodiment, the fingerprint sensor may include an ultrasonic or optical fingerprint sensor capable of recognizing a fingerprint of a finger that is in contact with or proximate to the outer surface of the front cover 320 through a hole at least partially formed in some of the elements of the display 400.

According to various embodiments, the at least one protective layer 440 (e.g., the subsidiary material layer) may include at least one polymer member 441 or 442 disposed on the rear surface (e.g., the side facing the second direction (direction ②)) of the display panel 431, at least one functional member 443 disposed on the rear surface (e.g., a side facing the second direction (direction ②)) of the at least one polymer member 441 or 442, and a metal sheet 444 disposed on the rear surface (e.g., a surface facing the second direction (direction ②)) of the at least one functional member 443.

According to one embodiment, the at least one polymer member 441 or 442 may include a light-blocking layer 441 for removing air bubbles, which are generated between the display panel 431 and attachments to the bottom thereof (e.g., the second direction (direction ②), and blocking light generated by the display panel 431 or light entering from the outside (e.g., a black layer including an uneven pattern) and/or a cushion layer 442 (e.g., a sponge layer) disposed for impact mitigation. According to an embodiment, the cushion layer 442 may include a cushion formed of polymer.

According to an embodiment, the at least one functional member 443 may include a heat dissipation sheet (e.g., a graphite sheet) for heat dissipation, a force touch FPCB, a fingerprint sensor FPCB, a communication antenna radiator, and a conductive/non-conductive tape, or an open cell sponge.

According to one embodiment, the metal sheet 444, which is a conductive member (e.g., a metal plate), may help to reinforce the rigidity of the electronic device (e.g., the electronic device 300 of FIG. 3), and may be used to shield ambient noise and dissipate heat emitted from surrounding heat-emission components. According to one embodiment, the metal sheet 444 may include at least one among Cu, Al, Mg, steel use stainless (SUS) (e.g., stainless steel (STS)), or metal clad (e.g., a stacked member in which SUS and Al are alternately arranged). In an embodiment, the metal sheet 444 may include other alloy materials. According to an embodiment, the electronic device may be a foldable electronic device in which at least a portion of the display 400 is folded. According to an embodiment, when the electronic device is a foldable electronic device, the metal sheet 444 may provide bendable (e.g., flexible) properties to the display 400. For example, at least a portion of the metal sheet 444 may include a bendable portion (not shown), wherein the bendable portion (not shown) includes multiple openings formed at predetermined intervals, thereby contributing to the bendable properties of the display 400. In an embodiment, the bendable portion (not shown) may include multiple recesses formed at predetermined intervals. For example, the bendable properties of the display 400 may be determined and/or changed according to the number, arrangement density and/or shape of multiple openings.

According to another embodiment, the metal sheet 444 may be omitted. For example, a mask layer (e.g., mask layer 431s of FIG. 7) including opaque masks (e.g., opaque mask 611 of FIG. 6 or opaque mask 710 of FIG. 7) for reducing diffraction of light entering the camera device (e.g., the camera device 500 of FIG. 5) may be formed in the display panel 431. According to another embodiment, the opaque mask (e.g., the opaque mask 710 of FIG. 7) forming the designated patterns in the mask layer 431s may be formed of an opaque metal. In another embodiment, the material of the opaque mask may contain an organic material or an inorganic material in addition to the opaque metal.

In one embodiment, the opaque mask 710 may be enlarged to a portion other than the transmissive area at least partially overlapping the camera device (e.g., the camera device 500 of FIG. 5), and the opaque mask 710 may provide the function of the metal sheet 444, whereby all or at least a portion of the metal sheet 444 may be omitted.

According to another embodiment, in the mask layer 431s, the opaque mask (e.g., the opaque mask 710 of FIG. 7) may be enlarged to at least a portion of an active area (e.g., a display area) of the display panel 431.

According to another embodiment, in the mask layer 431s, the opaque mask (e.g., the opaque mask 710 of FIG. 7) may be enlarged to at least a portion of the active area (e.g., display area) of the display panel 431, and also may be enlarged to at least a portion of a non-active area (e.g., a non-display area) of the display panel 431. For example, the non-active area (e.g., the non-display area) of the display panel 431 and may include a bonding area (not shown) which is electrically connected to a display driver IC (DDIC) and/or a touch display driver IC (TDDIC) in a chip-on-panel (COP) or chip-on-film (COF) manner and is bent in the second direction (direction ②) of the display panel 431. For example, the opaque mask (e.g., the opaque mask 710 of FIG. 7) of the mask layer 431s may be enlarged to at least a portion of the bonding area, and may provide a role of the metal sheet 444 in the bonding area. For example, since the opaque mask is enlarged to at least a portion of the bonding area (not shown), the metal sheet 444 may be removed (or deleted) in at least a portion overlapping the bonding area (not shown).

The disclosure according to the embodiment may remove (or delete) at least a portion of the metal sheet 444, thereby reducing the thickness of the electronic device (e.g., the electronic device 300 of FIG. 3) and preventing the poor appearance of the display 400 due to deformation (e.g., wrinkling, denting, or pressing) of the metal sheet 444. The disclosure according to the embodiment may remove (or delete) the metal sheet 444 at the at least portion overlapping the bonding area (not shown), thereby reinforcing the rigidity of the bonding area and preventing defects such as lifting of the bonding area.

According to an embodiment, the display 400 may further include a detection member 445 for detecting an input by an electromagnetic induction-type writing member (e.g., an electronic pen). According to an embodiment, the detection member 445 is a digitizer, and may include a coil member disposed on a dielectric substrate so as to detect an electromagnetic induction resonance frequency applied from the electronic pen. In an embodiment, the detection member 445 may be omitted. According to an embodiment, the detection member 445 may be disposed between the at least one polymer member 442 and the functional member 443. In another embodiment, the detection member 445 may be disposed between the display panel 431 and the at least one polymer member 441. In another embodiment, the detection member 445 may be disposed under the metal sheet 444.

Figure 5:
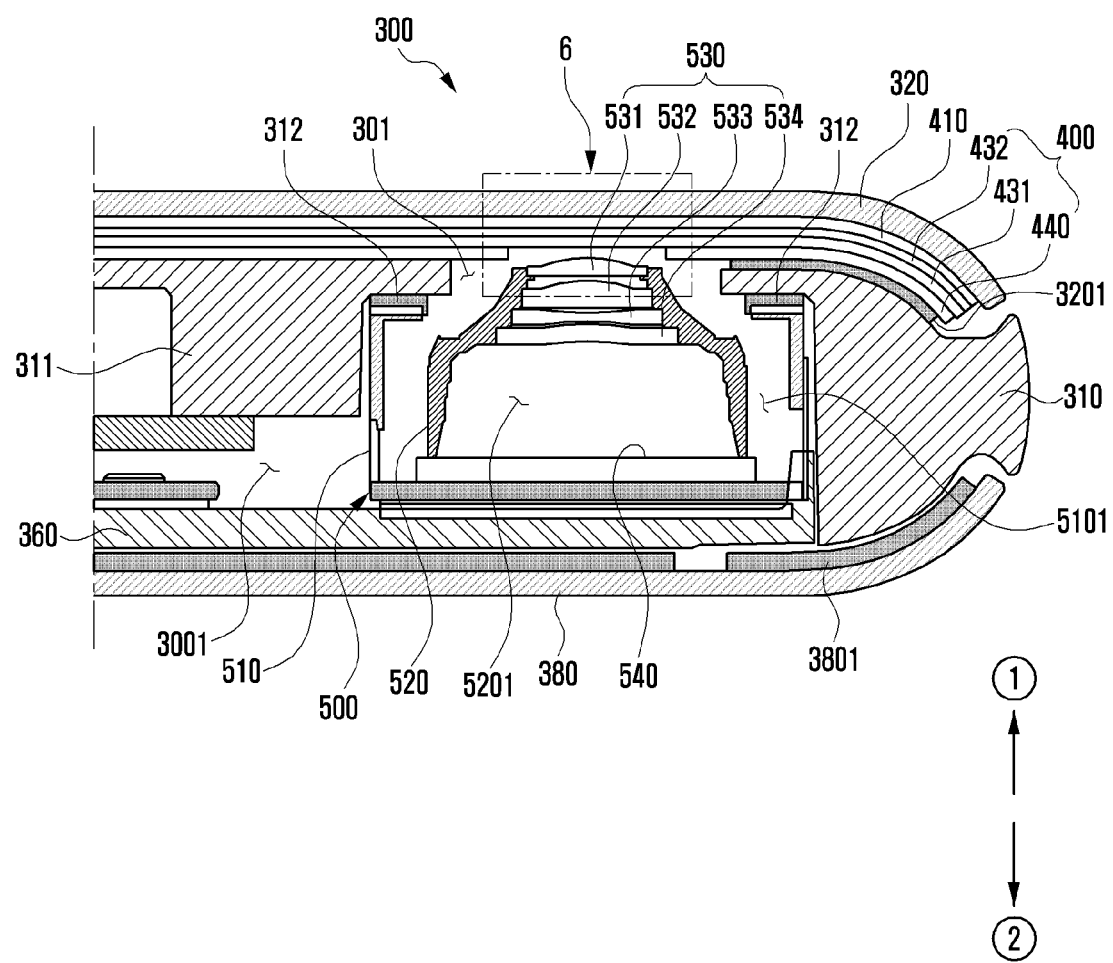
FIG. 5 is a partial cross-sectional view of an electronic device (e.g., the electronic device of FIG. 1) taken along line "5-5" of FIG. 1 according to an embodiment of the disclosure.

According to various embodiments, the protective layer 440 may include openings 4411, 4421, 4451, and 4441 formed at positions at which the protective layer 440 overlaps the camera device (e.g., the camera device 500 of FIG. 5). According to an embodiment, the camera device 500 may be disposed to be close to the rear surface (e.g., the surface facing the second direction (direction ②)) of the display panel 431 through the openings 4411, 4421, 4451, and 4441. According to an embodiment, the POL 432 and/or the touch panel 433 disposed on the display panel 431 may further include openings perforated at corresponding positions in order to prevent deterioration of the performance of the camera device 500 due to the refractive index. In another embodiment, at positions corresponding to the camera device 500, the POL 432 and/or the touch panel 433 may be processed to be transparent, or polarization characteristics may be removed. In one embodiment, the display panel 431 and/or the POL 432 may not include openings corresponding to the position of the camera device 500. According to one embodiment, the sizes (e.g., diameters, or areas) of the multiple openings 4411, 4421, 4451, and 4441 may be formed based on the size of the camera device 500 and/or the field of view of the camera device 500, and the sizes of the openings 4411, 4421, 4451, and 4441 may be different from each other.

According to various embodiments, the display 400 may include an organic light-emitting diode (OLED) display or a liquid crystal display (LCD).

According to an embodiment, the display 400 may not include at least one among the touch panel 433, the detection member 445, and/or the metal sheet 444.

According to some embodiments, the display 400 may not include the POL 432, but may include a color filter layer (not shown) by a color filter on encapsulation (COE) method. According to an embodiment, the display 400 may not include the POL 432 as a polarizing plate, and thus an increased transmittance and a reduced thickness. For example, in the case of the display 400 according to an embodiment, the POL 432 may be removed, and thus, compared with a display including the POL 432, the transmittance may be improved by about 20% or more, and the thickness may be reduced by about 100 μm to about 150 μm. According to an embodiment, the color filter layer (not shown) may perform a function identical or similar to that of the POL 432 applied to a display including organic light-emitting diodes (OLEDs). For example, the color filter layer (not shown) may block reflected light of the display panel 431 to improve outdoor visibility. In addition, the color filter layer (not shown) may improve the color purity of the display panel 431 so that a high-quality image can be provided to a user.

According to an embodiment, an intermediate layer (e.g., the intermediate layer 431c of FIG. 7) of the display panel 431 may include multiple pixels (e.g., a first sub-pixel area Pr, a second sub-pixel area Pg, or a third sub-pixel area Pb of FIG. 7), an electrode (e.g., a first pixel electrode 4311a, a second pixel electrode 4311b, or a third pixel electrode 4311c of FIG. 7), and a pixel define layer (e.g., a pixel define layer 4314 of FIG. 7) (e.g., bank or a partition wall). For example, the pixel define layer may include an organic material such as polyacrylates resin or polyimides resin, or a silica-based inorganic material. According to an embodiment, the pixel define layer may include a light-blocking material (e.g., an opaque material) to block light. According to an embodiment, when the pixel define layer includes a light-blocking material, it is possible to prevent mixture of colors of light generated in a specific pixel and light generated in a pixel adjacent to the specific pixel (e.g., a pixel arranged adjacent to the specific pixel). For example, when the pixel define layer does not include the POL 432, the pixel define layer may serve to block reflection of external light.

Figure 6:
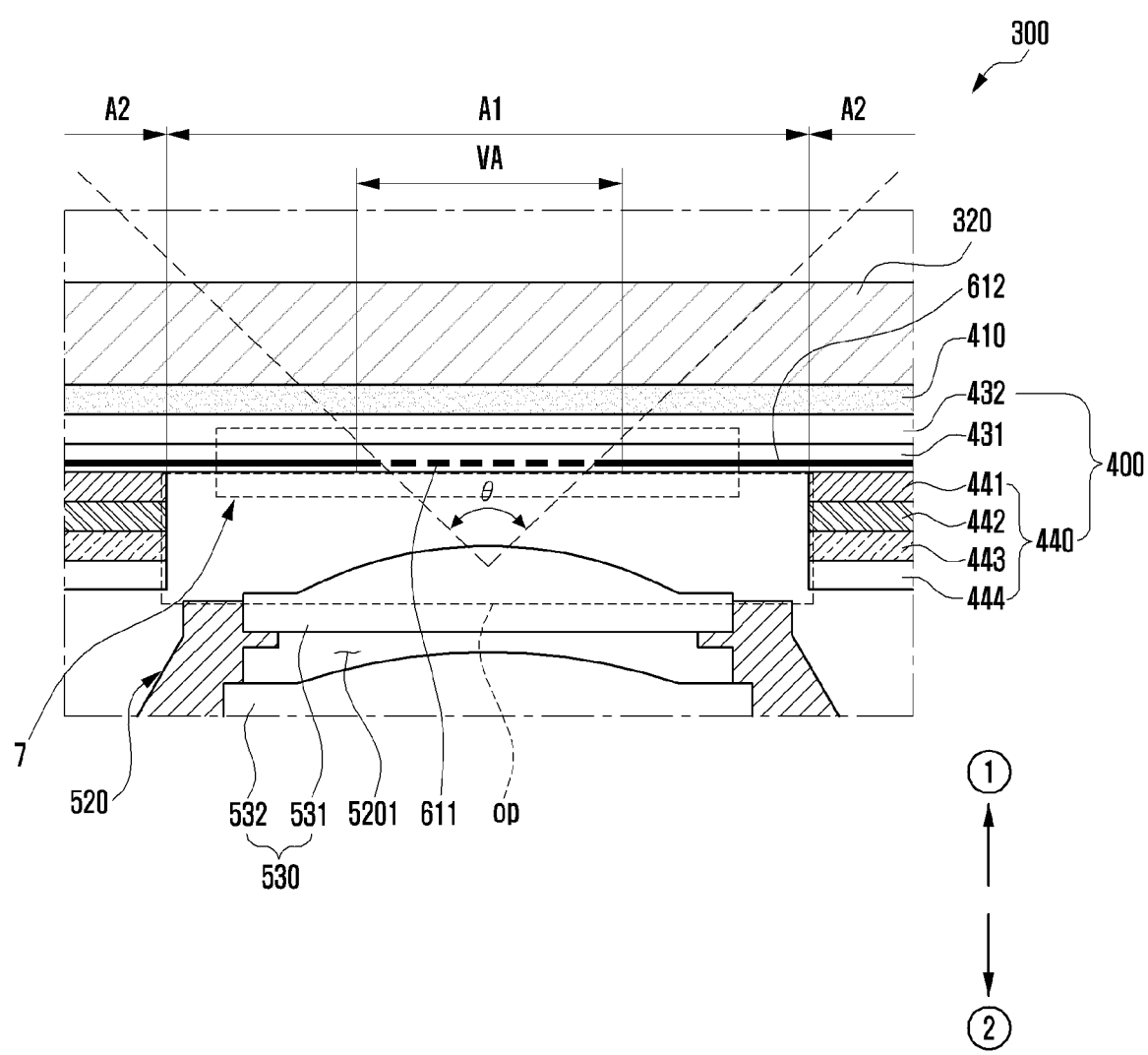
FIG. 6 is a partial cross-sectional view of an electronic device, in which area "6" of FIG. 5 is enlarged according to an embodiment of the disclosure.

An electronic device (e.g., the electronic device 100 of FIG. 1) according to various embodiments of the disclosure may include a display (e.g., display 400 of FIG. 5), and a camera device (e.g., the camera device 105 of FIG. 1) disposed to overlap at least a portion of an active area of the display 400 in a second direction, wherein the display 400 includes a display panel (e.g., the display panel 431 of FIG. 7) which includes a first active area (e.g., a first active area A1 of FIG. 7) having a first transmittance, at least partially overlapping the camera device 105, and including a field-of-view area (e.g., a field-of-view area (VA) of FIG. 6) corresponding to the field of view of the camera device 105, and a second active area (e.g., a second active area A2 of FIG. 7) having a second transmittance lower than the first transmittance, the display panel 431 includes a mask layer (e.g., mask layer 431s of FIG. 7) including an opaque mask (e.g., opaque mask 710 of FIG. 7), and the opaque mask 710 includes a first portion 711 at least partially formed in the field-of-view area VA, and a second portion 712 formed to surround an outer boundary of the field-of-view area VA with a designated width.

According to one embodiment, the opaque mask 710 may further include a third portion (e.g., a third portion 713 of FIG. 15A) at least partially formed in the first active area A1 and formed outside the second portion 712.

According to an embodiment, the opaque mask 710 may further include a fourth portion (e.g., a fourth portion 714 of FIG. 15A) at least partially formed in the second active area A2.

According to one embodiment, the first portion 711 may be formed to have a first pattern, the third portion 713 may be formed to have a second pattern, and the fourth portion 714 may be formed to have a third pattern.

According to an embodiment, all of the first pattern to the third pattern may be identical.

According to an embodiment, the second pattern may be different from the first pattern, and the third pattern may be different from the first pattern and/or the second pattern.

According to an embodiment, the third portion 713 may be formed to correspond to the entirety of an area outside the second portion 712.

According to an embodiment, the fourth portion 714 may be formed to correspond to the entirety of the second active area A2.

According to one embodiment, the display panel 431 may include a base layer (e.g., a base layer 431a of FIG. 7), a wiring layer (e.g., wiring layer 431b of FIG. 7) stacked in a first direction from the base layer and having multiple wirings and multiple thin film transistors formed therein, an intermediate layer (e.g., intermediate layer 431c of FIG. 7) stacked in the first direction from the wiring layer and including an organic layer; and an encapsulation layer (e.g., encapsulation layer 431d of FIG. 7) stacked in the first direction from the intermediate layer, wherein the mask layer is stacked between the base layer and the wiring layer.

According to an embodiment, the electronic device may further include the protective layer 440 attached in the second direction from the display panel 431, wherein the protective layer (e.g., protective layer 440 of FIG. 6) does not include a metal sheet.

A display (e.g., display 400 of FIG. 5) according to various embodiments of the disclosure may be for a camera device (e.g., the camera device 105 of FIG. 1) configured to capture an image of external light having passed through the display 400, and may include a display panel (e.g., the display panel 431 of FIG. 7) which includes a first active area (e.g., first active area A1 of FIG. 7) having a first transmittance, at least partially overlapping the camera device 105, and including a field-of-view area (e.g., field-of-view area VA of FIG. 6) corresponding to the field of view of the camera device 105, and a second active area (e.g., a second active area A2 of FIG. 7) having a second transmittance lower than the first transmittance, wherein the display panel 431 includes a mask layer (e.g., mask layer 431s of FIG. 7) including the opaque mask 710, and the opaque mask 710 includes the first portion 711 at least partially formed in the field-of-view area VA, and the second portion 712 formed to surround an outer boundary of the field-of-view area VA with a designated width.

According to one embodiment, the opaque mask 710 may further include the third portion 713 at least partially formed in the first active area A1 and formed outside the second portion 712, and the fourth portion 714 at least partially formed in the second active area A2.

According to one embodiment, the first portion 711 may be formed to have a first pattern, the third portion 713 may be formed to have a second pattern, and the fourth portion 714 may be formed to have a third pattern.

According to one embodiment, the second portion 712 of the opaque mask 710 may be enlarged to correspond to at least a portion of the first active area A1 outside the field-of-view area VA and the entirety of the second active area A2.

According to an embodiment, all of the first pattern to the third pattern may be identical.

According to an embodiment, the second pattern may be different from the first pattern, and the third pattern may be different from the first pattern and/or the second pattern.

According to an embodiment, the third portion 713 may be formed to correspond to the entirety of an area outside the second portion 712.

According to an embodiment, the fourth portion 714 may be formed to correspond to the entirety of the second active area A2.

According to an embodiment, the display may further include the protective layer 440 attached in a second direction from the display panel 431, wherein the protective layer 440 does not include a metal sheet.

A display (e.g., display 400 of FIG. 5) according to various embodiments of the disclosure may be for a camera device (e.g., the camera device 105 of FIG. 1) configured to capture an image of external light having passed through the display 400, and may include a display panel (e.g., the display panel 431 of FIG. 7) which includes a first active area (e.g., first active area A1 of FIG. 7) having a first transmittance, at least partially overlapping the camera device 105, and including a field-of-view area (e.g., field-of-view area VA of FIG. 6) corresponding to the field of view of the camera device 105, and a second active area (e.g., the second active area A2 of FIG. 7) having a second transmittance lower than the first transmittance, and a protective layer (e.g., protective layer 440 of FIG. 6) attached in a second direction from the display panel 431, wherein the display panel 431 includes a mask layer (e.g., mask layer 431s of FIG. 7) including the opaque mask 710, the opaque mask 710 includes the first portion 711 at least partially formed in the field-of-view area VA, the second portion 712 formed to surround an outer boundary of the field-of-view area VA with a designated width, the third portion 713 at least partially formed in the first active area A1 and formed outside the second portion 712, and the fourth portion 714 at least partially formed in the second active area A2, and the protective layer 440 does not include a metal sheet.

FIG. 5 is a partial cross-sectional view of an electronic device (e.g., an electronic device of FIG. 1) taken along line "5-5" of FIG. 1 according to an embodiment of the disclosure.

FIG. 6 is a partial cross-sectional view of an electronic device, in which area "6" of FIG. 5 is enlarged according to an embodiment of the disclosure.

Referring to FIGS. 5 and 6, an unbreakable (UB)-type organic light-emitting diode (OLED) display (e.g., a curved display) has been described as an example, but the disclosure is not limited thereto. For example, the disclosure may also be applied to a flat-type display employing an on-cell-touch active-matrix organic light-emitting diode (AMO-LED) (OCTA). At least one of elements of the electronic device 300 and/or the display 400 according to an embodiment may be identical or similar to at least one of the components of the electronic devices 100 and 300 in FIGS.

1 to 3 and/or the display 400 of FIG. 4. Hereinafter, a redundant description will be omitted.

Referring to FIG. 5, an electronic device 300 may include a front cover 320 (e.g., a cover member, a front plate, a front window, or a first plate) facing a first direction (direction ①), the rear plate 380 (e.g., a rear cover member, a rear cover, a rear window, or second plate) facing a direction (e.g., a second direction (direction)) opposite to the direction faced by the front cover 320, and the lateral member 310 surrounding an inner space 3001 between the front cover 320 and the rear plate 380. According to an embodiment, the electronic device 300 may include a first waterproof member 3201 disposed between the protective layer 440 of the display 400 and the lateral member 310. According to an embodiment, the electronic device 300 may include a second waterproof member 3801 (e.g., a waterproof tape) disposed between the lateral member 310 and the rear plate 380. The first waterproof member 3201 and the second waterproof member 3801 may prevent external foreign matter or moisture from flowing into the inner space 3001 of the electronic device 300. In another embodiment, the waterproof member may be disposed on at least a portion of a mounting support structure between the camera device 500 and the lateral member 310. In another embodiment, the first waterproof member 3201 and/or the second waterproof member 3801 may be replaced with an adhesive.

According to various embodiments, the lateral member 310 may further include the first support member 311 at least partially extending in the inner space 3001 of the electronic device 300. According to an embodiment, the first support member 311 may be formed by structural coupling with the lateral member 310. According to an embodiment, the first support member 311 may support the camera device 500 such that the camera device 500 is aligned and disposed near the rear surface (e.g., a surface facing the second direction (direction ②)) of the display panel 431 through an opening (e.g., opening OP of FIG. 6) of the protective layer 440 of the display 400.

According to various embodiments, the camera device 500 may include a camera housing 510, a lens housing 520 disposed in an interior space 5101 of the camera housing 510 and at least partially protruding toward the display (e.g., in direction ①)), multiple lenses 530 (e.g., lens 531, lens 532, lens 533, and lens 534) disposed at regular intervals in an inner space 5201 of the lens housing 520, and at least one image sensor 540 disposed to acquire at least a portion of light having passed through the multiple lenses 530 in the interior space 5101 of the camera housing 510. According to an embodiment, when the camera device 500 includes an auto focus (AF) function, the lens housing 520 may be moved by a predetermined driving unit from the camera housing 510 so that the distance from the display panel 431 is varied. According to an embodiment, a separate driving unit may be disposed to change the position of at least one of the multiple lenses 530 in order for the camera device 500 to perform the AF function. In another embodiment, in the camera device 500, the camera housing 510 may be omitted, and the lens housing 520 may be directly disposed on the first support member 311 through a predetermined alignment process. According to an embodiment, when the lens housing 520 is directly disposed directly on the first support member 311, in order to reduce the camera arrangement space, the camera housing 510 may be omitted and the lens housing 520 may be disposed to be attached to one side surface of the first support member 311. According to an embodiment, the camera device 500 may be aligned through the through-hole 301 of the first support member 311, and then may be attached to the rear surface (e.g., a side facing the second direction (direction ②)) of the first support member 311 through an adhesive 312 (e.g., a bonding member or a tape member).

According to various embodiments, the display 400 may include the POL 432, the display panel 431, and at least one protective layer (e.g., the protective layer 440 of FIG. 4). According to an embodiment, the camera device 500 may be supported by the second support member 360 (e.g., a rear case) additionally disposed in the inner space of the electronic device.

Referring to FIG. 6, an electronic device 300 may include an adhesive 410, the POL 432, the display panel 431, and the protective layer 440 disposed between the rear surface (e.g., the surface facing the second direction (direction ②)) of the front cover 320 and the lateral member 310.

According to an embodiment, when the front cover 320 is viewed in the first direction (direction ①), the protective layer 440 may include an opening (OP) formed in an area at least partially overlapping the multiple lenses 530. According to one embodiment, the opening OP formed in the protective layer 440 may be formed as one opening OP in such a way that an opening formed in a light-blocking layer 441 (e.g., opening 4411 of FIG. 4), an opening formed in a cushion layer 442 (e.g., opening 4421 of FIG. 4), and an opening formed in a functional member 443 (e.g., opening 4431 of FIG. 4), and an opening formed in a metal sheet 444 (e.g., opening 4441 of FIG. 4) overlap at least partially. According to an embodiment, the respective openings may have different sizes to correspond to the shape of the camera device 500.

According to various embodiments, the display panel 431 may include an active area (e.g., a display area) and a non-active area (e.g., a non-display area). In an embodiment, the non-active area may be disposed outside the active area. For example, the non-active area may be an area corresponding to a bezel area of the display panel 431.

According to an embodiment, the active area of the display panel 431 may include the first active area A1 having a first transmittance and at least partially overlapping the camera device 500, and the second active area A2 having a second transmittance lower than the first transmittance. For example, the second active area A2 may be the remaining active area other than the first active area A1.

According to an embodiment, the first active area A1 may be formed to have a transmittance ranging from about 5% to 20%, and may be defined as a "transmissive area." The first active area A1 may include the field-of-view area VA corresponding to a field-of-view θ of the camera device 500 through which light for generating an image by the image sensor passes. According to an embodiment, the size or shape of the first active area A1 and the second active area A2 may be determined by the field-of-view θ of the camera device 500.

According to an embodiment, the second active area A2 may be formed to have a transmittance of less than about 5%, and may be defined as a "non-transmissive area."

According to an embodiment, in order to have the transmittance ranging from about 5% to 20%, the first active area A1 may include multiple pixels (e.g., pixels P of FIG. 7) and/or wirings arranged at a lower density than the second active area A2. According to an embodiment, the multiple pixels (e.g., pixels P of FIG. 7) and/or the wirings may be irregularly arranged in the first active area A1 in order to increase transmittance. The above-mentioned irregular arrangement of the multiple pixels (e.g., pixels P of FIG. 7) and/or the wirings may induce unintentional diffraction of light entering the camera device 500, and may cause a phenomenon in which a modulation transfer function (MTF) for each frequency is not constant and decreases at a low frequency. For example, when diffracted light reaches the image sensor 540 through the multiple lenses 530 of the camera device 500, the diffracted light is unnecessary for capturing an image, and may deteriorate the quality of the image. For example, when diffracted light is concentrated, a shape such as a cross shape may appear in an image, a double image in which images overlap may appear around the image shape, or a phenomenon in which the image looks blurry may appear.

In one embodiment of the disclosure, a mask layer (e.g., mask layer 431s of FIG. 7) may be formed on at least some layers of the display panel 431, and the mask layer 431s may include opaque masks (e.g., opaque mask 611 of FIG. 6 and the first portion 711 of the opaque mask 710 of FIG. 7) for reducing unintentional diffraction of light in the first active area A1. For example, the opaque masks 611 may be formed of an opaque metal, and multiple openings 721 (e.g., openings 721 of FIG. 7) may be formed by adjusting the shape, size, and/or arrangement density of the opaque masks 611. According to an embodiment, the opaque masks 611 may have a thickness of about several thousand angstrom A.

According to an embodiment, the opaque masks 611 may be arranged in the field-of-view area VA corresponding to the field of view (e.g., the field-of-view θ of FIG. 6) of the first active area A1. According to an embodiment, the mask layer 431s may further include an opaque mask 612 (e.g., the second portion 712 of the opaque mask 710 of FIG. 7) formed on at least a portion of an area outside the field-of-view area VA.

According to an embodiment, the multiple openings (e.g., the openings 721 of FIG. 7) formed by the opaque masks 611 may prevent deterioration of the quality of an image acquired through the camera device 500 by reducing the diffraction of light entering the camera device 500 from the first active area A1 while maintaining high modulation transfer function (MTF) characteristics. The opaque mask (e.g., the opaque mask 710 of FIG. 7) formed on the mask layer 431s will be described in detail later with reference to FIG. 7.

FIG. 7 is a partial cross-sectional view of a display panel, in which area "7" of FIG. 6 is enlarged according to an embodiment of the disclosure.

Referring to FIG. 7, a display panel (e.g., the display panel 431 of FIG. 6) may include the base layer 431a, the wiring layer 431b, the intermediate layer 431c stacked in a first direction (direction ①) from the wiring layer 431b, and/or the encapsulation layer 431d stacked in the first direction (direction ①) from the intermediate layer 431c.

According to an embodiment, the display panel 431 may include multiple pixels P in which a first sub-pixel area Pr (pixel red), a second sub-pixel area Pg (pixel green), and a third sub-pixel area Pb (pixel blue) are defined as one pixel P (pixel). According to an embodiment, an area in which the multiple pixels P are disposed may be defined as an "active area."

According to various embodiments, the wiring layer 431b may include electrical connection members electrically connected to first to third pixel electrodes 4311a, 4311b, and 4311c of the intermediate layer 431c, respectively. According to an embodiment, the electrical connection members may include multiple wirings, a low-temperature polycrystalline silicon (LTPS), and/or a thin film transistor (TFT).

According to an embodiment, the display panel 431 may include, in the intermediate layer 431c, the first pixel electrode 4311a, the second pixel electrode 4311b, and the third pixel electrode 4311c which are disposed on the wiring layer 431b so as to correspond to the first sub-pixel region Pr, the second sub-pixel area Pg, and the third sub-pixel area Pb. According to an embodiment, in the intermediate layer 431c, the display panel 431 may include a first organic layer 4312a, a second organic layer 4312b, and a third organic layer 4312c, which are disposed on (e.g., in the first direction (direction ①) of) the first to third pixel electrodes 4311a, 4311b, and 4311c, respectively. According to an embodiment, the first to third sub-pixel areas Pr, Pg, and Pb may be partitioned by the pixel defining layer 4314 made of an insulating material. According to an embodiment, a counter electrode 4313 may be commonly disposed on the first to third organic layers 4312a, 4312b, and 4312c. According to an embodiment, the first to third pixel electrodes 4311a, 4311b, and 4311c may include a reflective electrode including a reflective layer.

According to various embodiments, the first to third organic layers 4312a, 4312b, and 4312c may include organic light-emitting layers which emit light of a first color, a second color, and a third color, respectively. According to an embodiment, the first to third colors may be red, green, and blue, respectively. In another embodiment, if white light can be emitted, a combination of various colors other than a combination of red, green, and blue may be used.

According to various embodiments, the counter electrode 4313 may be configured as a transparent or translucent electrode, may include at least one material selected from among silver (Ag), aluminum (Al), magnesium (Mg), lithium (Li), calcium (Ca), copper (Cu), lithium fluoride/calcium alloy (LiF/Ca), lithium fluoride/aluminum alloy (LiF/Al), magnesium-silver alloy (MgAg), or calcium-silver alloy (CaAg), and may be formed as a thin film having a thickness of several nanometers (nm) to several tens of nm. According to an embodiment, light emitted from the first to third organic light-emitting layers included in the first to third organic layers 4312a, 4312b, and 4312c may be emitted toward the counter electrode 4313 directly or by being reflected by the first to third pixel electrodes 4311a, 4311b, and 4311c.

According to an embodiment, the encapsulation layer 431d may be disposed on the counter electrode 4313 (e.g., in the first direction (direction ①) of the counter electrode 4313) to protect the counter electrode 4313.

According to an embodiment, the base layer 431a may be formed under (e.g., in a second direction (direction ②) of) the wiring layer 431b. For example, the wiring layer 431b may be stacked above (e.g., (e.g., in first direction (①) direction) of) the base layer 431a. According to an embodiment, the wiring layer 431b and/or the base layer 431a may include a transparent insulating substrate (e.g., a substrate). For example, the wiring layer 431b and/or the base layer 431a may be formed of a glass substrate, a quartz substrate, or a transparent resin substrate. The transparent resin substrate may include a polyimide-based resin, an acryl-based resin, a polyacrylate-based resin, a polycarbonate-based resin, a polyether-based resin, a sulfonic acid-based resin, and/or a polyethyleneterephthalate-based resin.

According to an embodiment, the display panel 431 may include multiple pixels P formed in the intermediate layer 431c between the base layer 431a and the encapsulation layer 431d. In an embodiment, the arrangement density of the multiple pixels P in first active area A1 may be different from the arrangement density thereof in second active area A2. For example, the arrangement density of the multiple pixels P formed in the first active area A1 may be lower than the arrangement density of the multiple pixels P formed in the second active area A2. In an embodiment, the multiple pixels P may be omitted in the first active region.

According to an embodiment, the mask layer 431s may be formed between the base layer 431a and the wiring layer 431b. In an embodiment, at least a portion of the mask layer 431s may be electrically connected to a power supply voltage such as ELVDD and ELVSS, and/or a ground GND.

According to another embodiment, a layer on which the mask layer 431s is formed may be variously changed. For example, the mask layer 431s may be formed in the second direction (direction ②) from the base layer 431a.

According to an embodiment, the mask layer 431s may include the opaque mask 710, for example, a colored (e.g., black) opaque mask 710. For example, the opaque mask 710 may be formed of one or more materials selected from molybdenum (Mo), Mo alloy, aluminum (Al), or Al alloy.

In an embodiment, the opaque mask 710 may be formed in the field-of-view area VA corresponding to the field of view (e.g., the field-of-view θ of FIG. 6) of a camera device (e.g., the camera device 500 of FIG. 5) in the first active area A1. For example, the opaque mask 710 may be formed to correspond to at least a portion of the field-of-view area VA.

According to an embodiment, the opaque mask 710 formed in at least a portion of the field-of-view area VA may be defined as "a first portion 711 of the opaque mask 710."

According to an embodiment, the first portion 711 of the opaque mask 710 may be formed with a designated pattern (e.g., a designated first pattern), and may be regularly formed (or arranged). According to an embodiment, a portion where the first portion 711 is not formed may form an opening 721 (e.g., the transmissive areas TA of FIG. 8A) of the mask layer 431s. For example, in the mask layer 431s, an area where the opaque mask 710 is not formed may be a transmissive area TA having the opening 721, and the transmissive area TA may imply an area through which light can pass.

According to an embodiment, the transmissive area TA may be formed to have a designated pattern as the first portion 711 of the opaque mask 710 is regularly formed in the field-of-view area VA.

According to an embodiment, the opaque mask 710 of the mask layer 431s may be further formed outside the field-of-view area VA. In an embodiment, the opaque mask 710 formed outside the field-of-view area VA and formed to surround the outer boundary of the field-of-view area VA may be defined as "a second portion 712 of the opaque mask 710."

According to an embodiment, the opaque mask 710 may be further formed in at least a portion outside the field-of-view area VA. In an embodiment, the opaque mask 710 may be further formed in the entire first active area A1 outside the field-of-view area VA. Alternatively, the opaque mask 710 may be further formed at least partially in the first active area A1 outside the field-of-view area VA. In another embodiment, the opaque mask 710 may be further formed in the entire first active area A1 and the entire second active area A2 outside the field-of-view area VA. Alternatively, the opaque mask 710 may be further formed at least partially in the first active area A1 and the second active area A2 outside the field-of-view area VA.

According to one embodiment, the opaque mask 710 formed in all or at least a portion of the second active area A2 in the mask layer 431s may function as a metal sheet (e.g., the metal sheet 444 of FIG. 6) disposed on the rear surface (e.g., the surface facing the second direction (direction ②)) of the display panel 431. For example, the opaque mask 710 may provide a function of preventing image quality defects such as flicker by shielding electromagnetic noise generated from components around the display panel 431. According to various embodiments, the additional formation of the opaque mask 710 in at least a portion outside the field-of-view area VA will be described in detail later with reference to FIGS. 10A, 10B, 11A, 11B, 12A, 12B, 14A, 14B, 15A, 15B, 16A, and 16B.

In one embodiment, the opaque mask 710 may be a black metal stacked between the base layer 431a and the wiring layer 431b. According to an embodiment, a method for forming the opaque mask 710 may be identical or similar to a method for forming the first to third pixel electrodes 4311a, 4311b, and 4311c of the intermediate layer 431c, and may use, for example, a semiconductor process (e.g., vapor deposition, photoresist (PR) coating, exposure, development, etching, or stripping). Therefore, the opaque mask 710 may be formed to be thinner than the metal sheet (e.g., the metal sheet 444 of FIG. 6) disposed in the second direction (② direction) of (e.g., under) the display panel 431. According to an embodiment, the shape, size, placement density, and/or arrangement interval of the first portion 711 of the opaque mask 710 may be adjusted. According to one embodiment, multiple openings 721, which have designated patterns and through which light can pass, may be formed in a portion where the first portion 711 of the opaque mask 710 is not formed. In an embodiment of the disclosure, a high MTF characteristic may be maintained by forming multiple openings 721. According to an embodiment, the first portion 711 of the opaque mask 710 may help to provide an improved image by reducing diffraction of light entering the camera device 500 from the first active area A1. For example, the degree of diffraction of light entering through the first active area A1 may be determined by the size, shape, arrangement density, or arrangement interval of the multiple openings 721. According to an embodiment, the multiple openings 721 may be formed to have shapes, sizes, and/or arrangement intervals identical or different from each other.

According to an embodiment, the display panel 431 may be formed to have a transmittance corresponding to a pixel arrangement density ranging from about 100 pixels per inch (ppi) to about 300 ppi through the multiple openings 721 in the first active area A1.

According to an embodiment, the first portion 711 of the opaque mask 710 formed in the mask layer 431s may be disposed to overlap the multiple pixels P and/or the multiple wirings (e.g., multiple wirings 803 of FIG. 8A) of the first active area A1. For example, when the display panel 431 is viewed from the first direction (direction ①), the multiple pixels P and/or the multiple wirings 803 in the first active area A1 may be disposed so as to avoid (e.g., so as not to overlap) the multiple openings 721. According to an embodiment, when the display panel 431 is viewed from the first direction (direction ①), the multiple pixels P and/or the multiple wirings 803 may be disposed to at least partially overlap the first portion 711 of the opaque mask 710.

According to another embodiment, when the display panel 431 is viewed from the first direction (direction ①), at least some of the multiple pixels and/or the multiple wirings 803 in the first active area A1 may be disposed to overlap the multiple openings 721.

According to various embodiments, in the first active area A1 of the display panel 431, the diffraction of light may be adjusted by changing the shape of the multiple openings 721. For example, when the display panel 431 is viewed from the first direction (direction ①), the multiple openings 721 formed between patterns of the opaque masks 611 may be designed in various shapes in order to control the diffraction of light. Examples of various forms of the multiple openings 721 will be described later with reference to FIGS. 8A and 8B.

According to an embodiment, the opaque mask 710 forming the multiple patterns of the opaque masks 611 in the mask layer 431s may not only be formed in a field-of-view area (e.g., the field-of-view area VA of FIG. 6) corresponding to the field-of-view (e.g., the field-of-view θ of FIG. 6) of the first active area A1, but may also be enlarged to be in an area outside the field-of-view area. For example, the opaque mask 710 may include the second portion 712 formed in at least a portion outside the field-of-view area VA. According to an embodiment, the second portion 712 formed in the first active area A1 and arranged in at least a portion outside the field-of-view area VA may function as an aperture.

Figure 8A:
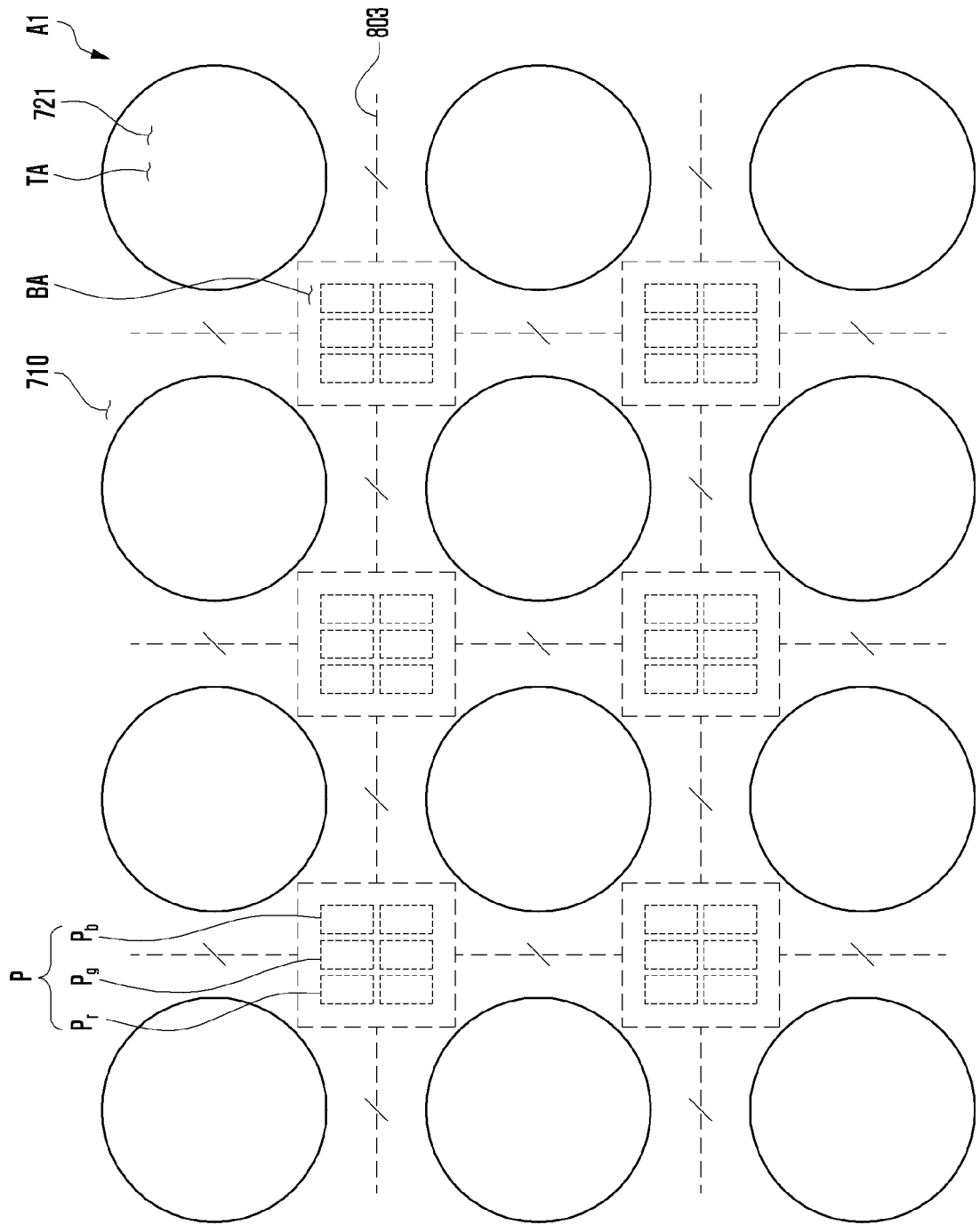
FIGS. 8A and 8B are plan views illustrating a first active area of a display panel according to various embodiments of the disclosure.
Figure 8B:
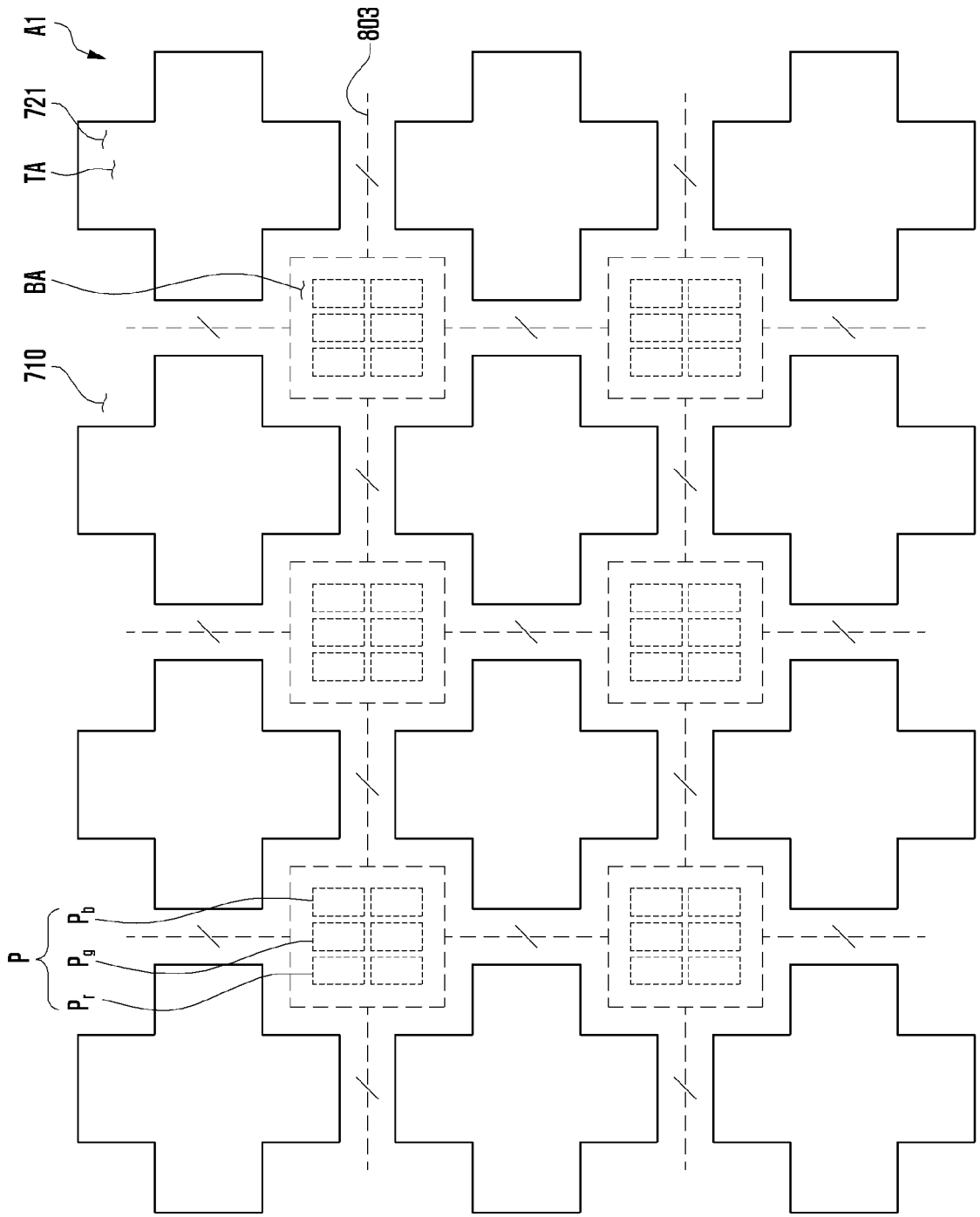

FIGS. 8A and 8B are plan views illustrating a first active area A1 of display panel according to various embodiments of the disclosure. For example, FIGS. 8A and 8B may be plan views of a field-of-view area illustrated in FIG. 7 (e.g., the field-of-view area VA of FIG. 6) as viewed from the first direction (direction ①).

The display panel 431 illustrated in FIGS. 8A and 8B may be at least partially similar to the display panel 431 illustrated in FIG. 7, or may further include another embodiment. Hereinafter, in connection with FIGS. 8A and 8B, only parts that have not been described with reference to FIG. 7 or have been changed will be described.

Referring to FIGS. 8A and 8B, elements formed on a mask layer (e.g., the mask layer 431s of FIG. 7) of the display panel 431 are illustrated by solid lines. In FIGS. 8A and 8B, elements, formed on an intermediate layer (e.g., the intermediate layer 431c of FIG. 7) and a wiring layer (e.g., the wiring layer 431b of FIG. 7) of the display panel 431 including the multiple pixels (P) and/or the multiple wirings 803, are illustrated by dotted lines.

Referring to FIG. 8A, when a first active area (e.g., the first active area A1 of FIG. 7) of the display panel 431 according to an embodiment is viewed from above (e.g., the first direction (direction C)) of FIG. 7), an opaque mask (e.g., the opaque mask 710 of FIG. 7) may be disposed in the mask layer 431s of the display panel 431.

According to an embodiment, the opaque mask 710 may form light-blocking areas BA through which light does not pass or which has a light transmittance less than a designated value. According to an embodiment, multiple pixels (e.g., the multiple pixels P of FIG. 7) may be arranged to correspond to the light blocking areas BA.

According to an embodiment, the opaque mask 710 may include multiple openings (e.g., the multiple openings 721 of FIG. 7) disposed at intervals. For example, the multiple openings 721 may be areas in which the opaque mask 710 is not formed, and may imply areas through which light can pass According to an embodiment, the multiple openings 721 may be arranged while being spaced apart from each other, and may form transmissive areas TA. According to an embodiment, the transmissive areas TA formed by the multiple openings 721 may be formed in a circular or elliptical shape. According to an embodiment, the transmissive areas TA may be disposed so as not to overlap the multiple pixels P and/or the multiple wirings 803 formed in the first active area A1.

According to an embodiment, the opaque mask 710 may form designated patterns by the multiple openings 721 formed at intervals. According to an embodiment, the width of the opaque mask 710 or the width of the multiple openings 721 may be identical or similar to the width of the multiple pixels P. According to another embodiment, the maximum width of the opaque mask 710 or the maximum width of the multiple openings 721 may be greater than the width of the multiple pixels P.

Referring to FIG. 8B, when the first active area A1 of the display panel 431 according to another embodiment is viewed from above (e.g., the first direction (direction C)) of FIG. 7), multiple openings 721 may be formed in a cross-type (e.g., cross) shape and disposed at intervals.

According to various embodiments, the shape, size, arrangement density, and/or arrangement interval of transmissive areas TA formed by the multiple openings 721 may be variously changed in addition to the examples shown in FIGS. 8A and 8B. For example, the width or breadth of the transmissive areas TA may affect an angle at which light is diffracted and may perform a role to collect or spread diffracted energy. In an embodiment, a gap between the transmission areas TA may cause destructive interference between diffracted light rays, and may perform a role to narrow or widen a gap between diffracted light patterns. The shape of the transmissive areas TA may change the diffraction angle, thereby affecting the shape of the diffracted patterns.

According to an embodiment of the disclosure, adjusting the shape, size (e.g., diameter and area), arrangement structure, and/or arrangement interval of the multiple transmissive areas TA may reduce the degree of diffraction while maintaining the MTF performance of the camera device 500, thereby providing high-quality images. For example, a camera device (e.g., the camera device 500 of FIG. 5) may obtain, through the first active area A1 having the transmittance by the multiple openings 721, an MTF curve substantially matching the diffraction-limit curve of a lens (e.g., the multiple lenses 530 of FIG. 5) of the camera device (e.g., the camera device 500 of FIG. 5). For example, it is possible to secure camera performance having responsivity (modulation transfer) (e.g., a contrast input/output ratio) greater than or equal to a designated value compared with contrast in a low frequency band.

Figure 9A:
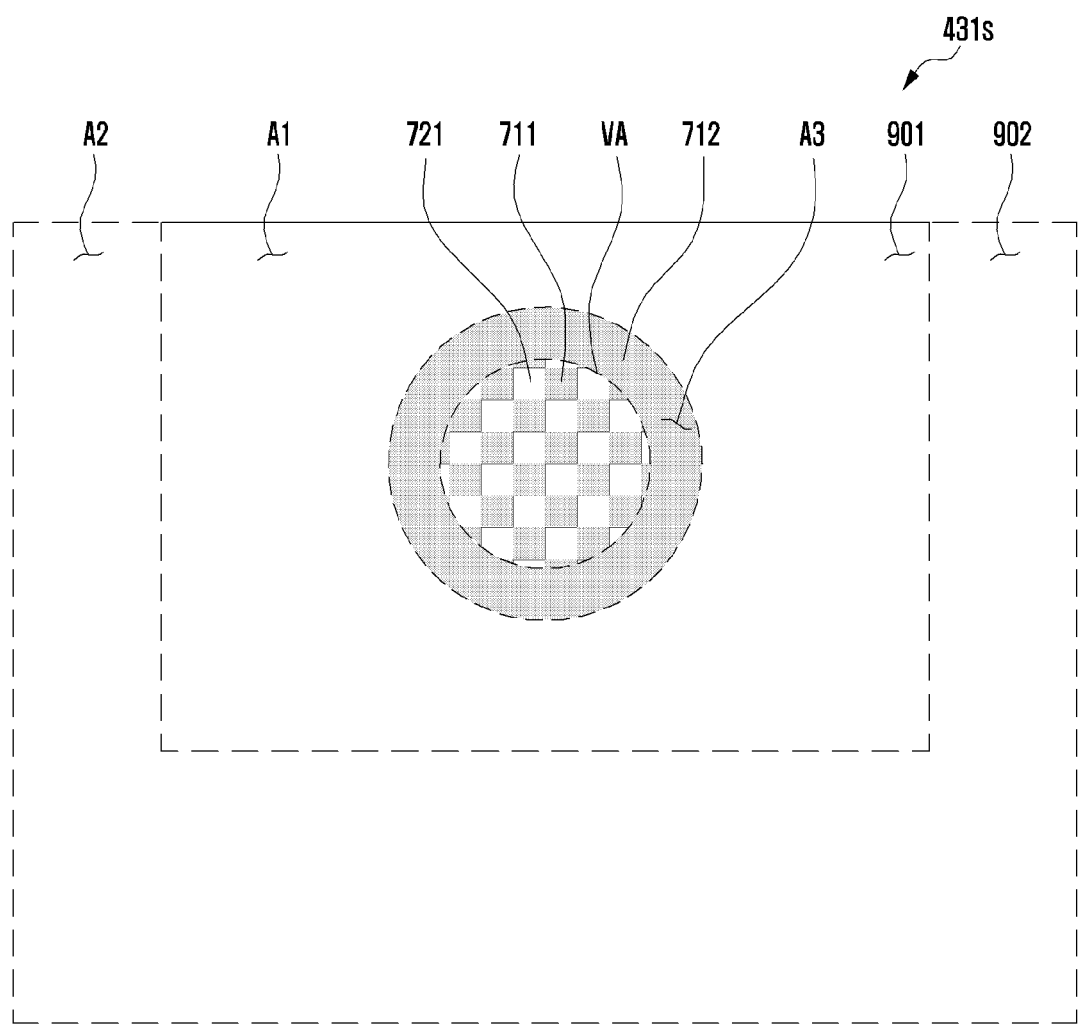
FIG. 9A is a plan view illustrating the shape of an opaque mask of a mask layer according to an embodiment of the disclosure.
Figure 9B:
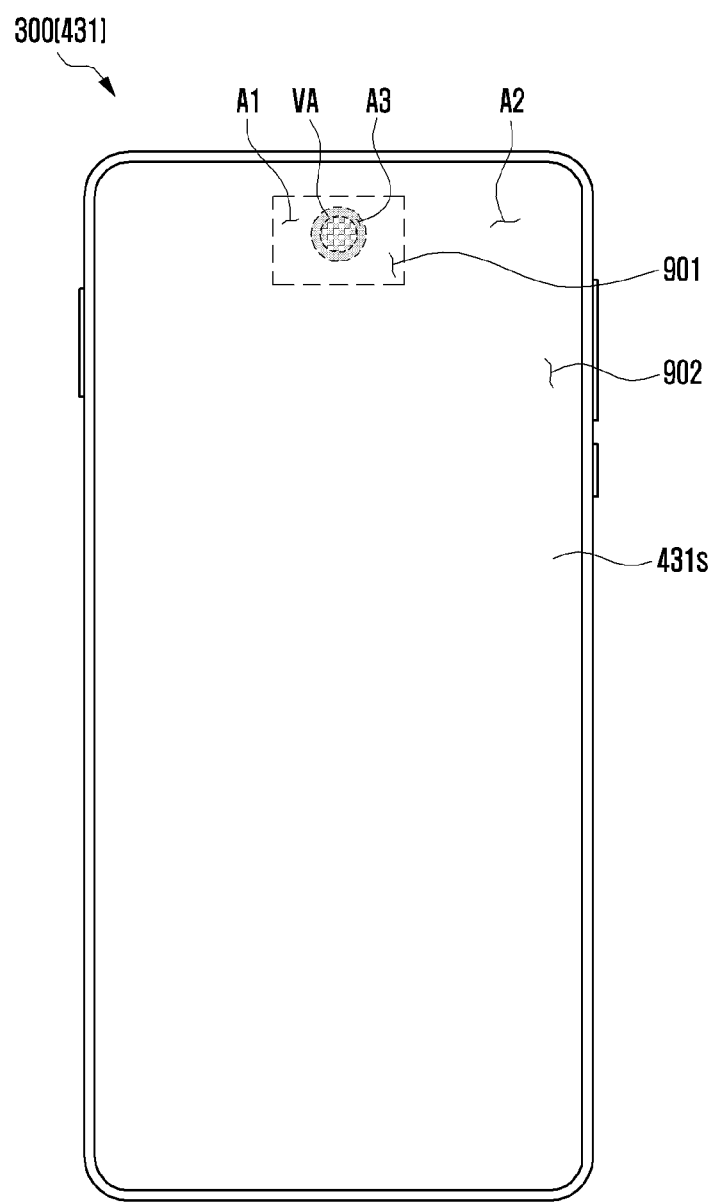
FIG. 9B illustrates a shape of an opaque mask of a mask layer when a front surface (or display panel) of an electronic device is viewed from a first direction according to an embodiment of the disclosure.

FIG. 9A is a plan view illustrating the shape of an opaque mask of a mask layer according to an embodiment of the disclosure. FIG. 9B illustrates the shape of an opaque mask of a mask layer when the front surface (or a display panel) of an electronic device is viewed from a first direction (direction ①) according to an embodiment of the disclosure.

Referring to FIGS. 9A and 9B, an electronic device (e.g., the electronic device 300 of FIG. 3) according to an embodiment may include one camera device (e.g., the camera device 500 of FIG. 5) facing the front surface, and a display panel (e.g., the display panel 431 of FIG. 7) may include the first active area A1 in which the display panel at least partially overlaps the one camera device 500. The first active area A1 may include the field-of-view area VA so as to correspond to (or overlap) a lens (e.g., the multiple lenses 530 of FIG. 5) of the one camera device 500.

According to an embodiment, in the mask layer 431s, first portion 711 of the opaque mask 710 may be formed in at least a portion of the field-of-view area VA. In an embodiment, the first portion 711 may be formed to have a specific shape, a specific size, and/or a specific arrangement density, and portions in which the first portion 711 is not formed may form multiple openings 721 (e.g., first openings 721). For example, as the first portion 711 is formed to have a specific shape, a specific size, and/or a specific arrangement density, first portion 711 may form first patterns in the field-of-view area VA.

According to an embodiment, the opaque mask 710 of the mask layer 431s may be enlarged to the outside of the field-of-view area VA corresponding to the field of view of the camera device 500. According to an embodiment, when the display panel 431 is viewed from the first direction (direction ①), the opaque mask 710 of the mask layer 431s may include at least one first portion 711 formed in at least a portion of the field-of-view area VA, and the second portion 712 enlarged to the outside of the field-of-view area VA.

According to the illustrated example, the second portion 712 of the opaque mask 710 may have a designated width and may be formed to surround a boundary portion A3 of the field-of-view area VA. For example, the second portion 712 of the opaque mask 710 may be formed in at least a portion of the first active area A1 while surrounding the boundary portion A3 of the field-of-view area VA. For example, the field-of-view area VA may have a circular shape, and the second portion 712 of the opaque mask 710 may be formed in a circular shape to surround the outer boundary of the field-of-view area VA.

According to an embodiment, the first active area A1 may be formed in various shapes. For example, the first active area A1 may be formed in a circular shape in which the first active area A1 substantially coincides with the field-of-view area VA or surrounds the field-of-view area VA. The first active area A1 is not limited thereto, and may be formed in various shapes (e.g., polygons). The second portion 712 of the opaque mask 710 may facilitate detection of misalignment (align miss) between the display panel 431 and the camera device 500 in the assembly process of the electronic device 300. For example, when misalignment (align miss) between the display panel 431 and the camera device 500 occurs in the assembly process of the electronic device 300, the second portion 712 of the opaque mask 710 may overlap the field-of-view area VA to block light, thus causing vignetting in an image acquired through the camera device 500. According to an embodiment of the disclosure, misalignment (align miss) between the display panel 431 and the camera device 500 may be detected by detecting the vignetting phenomenon, thereby reducing assembly defects and increasing production yield.

In the illustrated example, the openings 721 have a tetragonal shape, but the openings 721 of the disclosure may be modified or changed into various shapes.

Figure 10A:
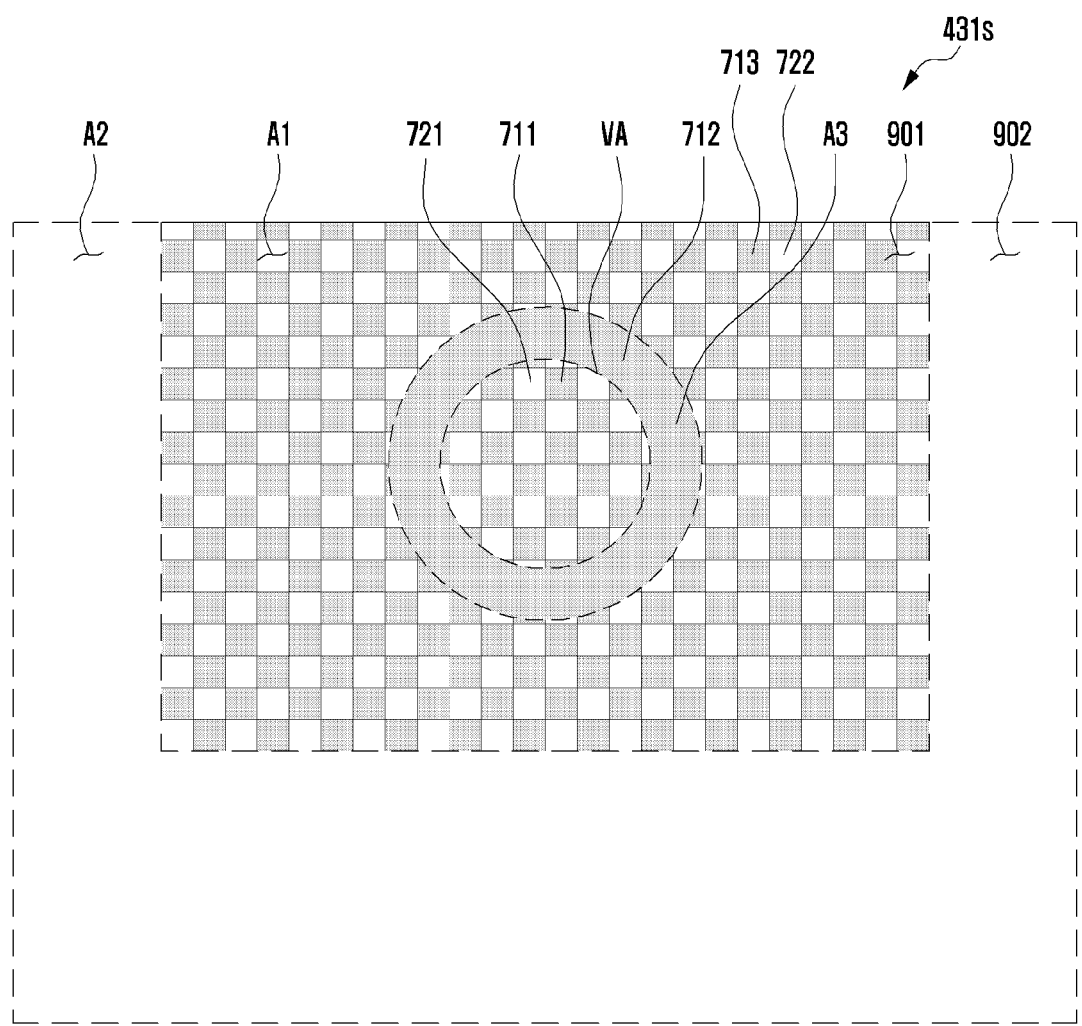
FIG. 10A is a plan view illustrating a shape of an opaque mask of a mask layer according to an embodiment of the disclosure.
Figure 10B:
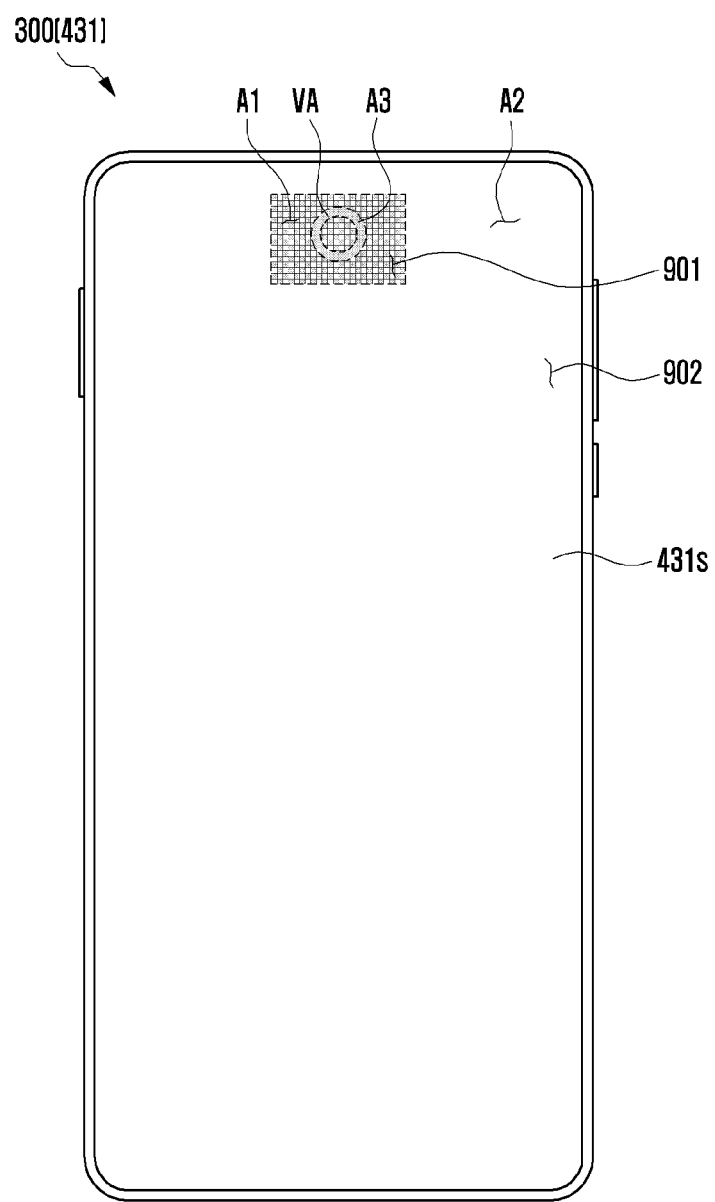
FIG. 10B illustrates a shape of an opaque mask of a mask layer when a front surface of an electronic device is viewed from a first direction according to an embodiment of the disclosure.

FIG. 10A is a plan view illustrating the shape of an opaque mask of a mask layer according to an embodiment of the disclosure. FIG. 10B illustrates the shape of an opaque mask of a mask layer when the front surface (or a display panel) of an electronic device is viewed from a first direction (direction ①) according to an embodiment of the disclosure.

The mask layer 431s illustrated in FIGS. 10A and 10B may be at least partially similar to the mask layer 431s illustrated in FIGS. 9A and 9B, or may further include another embodiment. Hereinafter, in connection with FIGS. 10A and 10B, only changed parts will be described.

Referring to FIGS. 10A and 10B, when the display panel 431 is viewed from the first direction (direction ①)), the mask layer 431s according to another embodiment may further include an opaque mask (e.g., third portion 713) enlarged to at least a portion 901 (e.g., an area corresponding to 901 of FIGS. 9A and 9B) of first active area A1.

In another embodiment, opaque masks 711, 712, 713 formed in the mask layer 431s may include first portions 711 at least partially formed in the field-of-view area VA, a second portion 712 formed to surround the outer boundary of the field-of-view area VA, and third portions 713 at least partially formed in the first active area A1 outside the second portion 712.

In an embodiment, the first portions 711 may be formed to have a specific shape, a specific size, and/or specific arrangement density, and portions in which the first portions 711 are not formed may form multiple openings 721 (e.g., first openings 721). For example, as the first portions 711 are formed to have a specific shape, a specific size, and/or specific arrangement density (or the degree of dispersion), the first portions 711 may form first patterns in the field-of-view area VA.

In an embodiment, the third portions 713 may be formed to have a specific shape, a specific size, and/or a specific arrangement density, and portions in which the third portions 713 are not formed may form multiple openings 722 (e.g., second openings 722). For example, as the third portions 713 are formed to have a specific shape, a specific size, and/or a specific arrangement density, the third portions 713 may form second patterns in the first active area A1.

In an embodiment, the second patterns of the third portions 713 may be identical to or different from the first patterns of the first portions 711.

In the illustrated example, the openings 721 and 722 have a tetragonal shape, but the shape of the openings 721 and 722 of the disclosure may be modified or changed to various shapes.

Figure 11A:
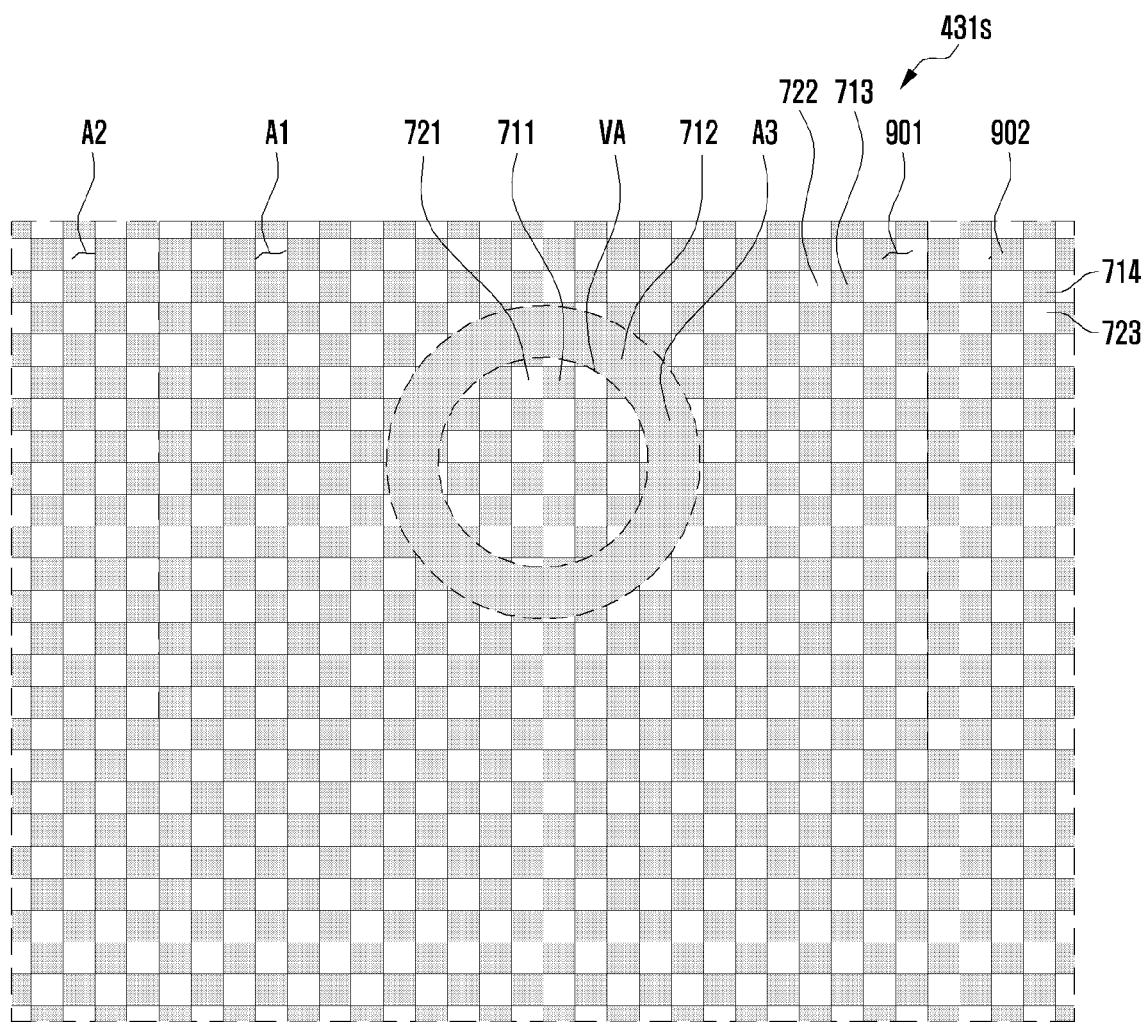
FIG. 11A is a plan view illustrating a shape of an opaque mask of a mask layer according to an embodiment of the disclosure.
Figure 11B:
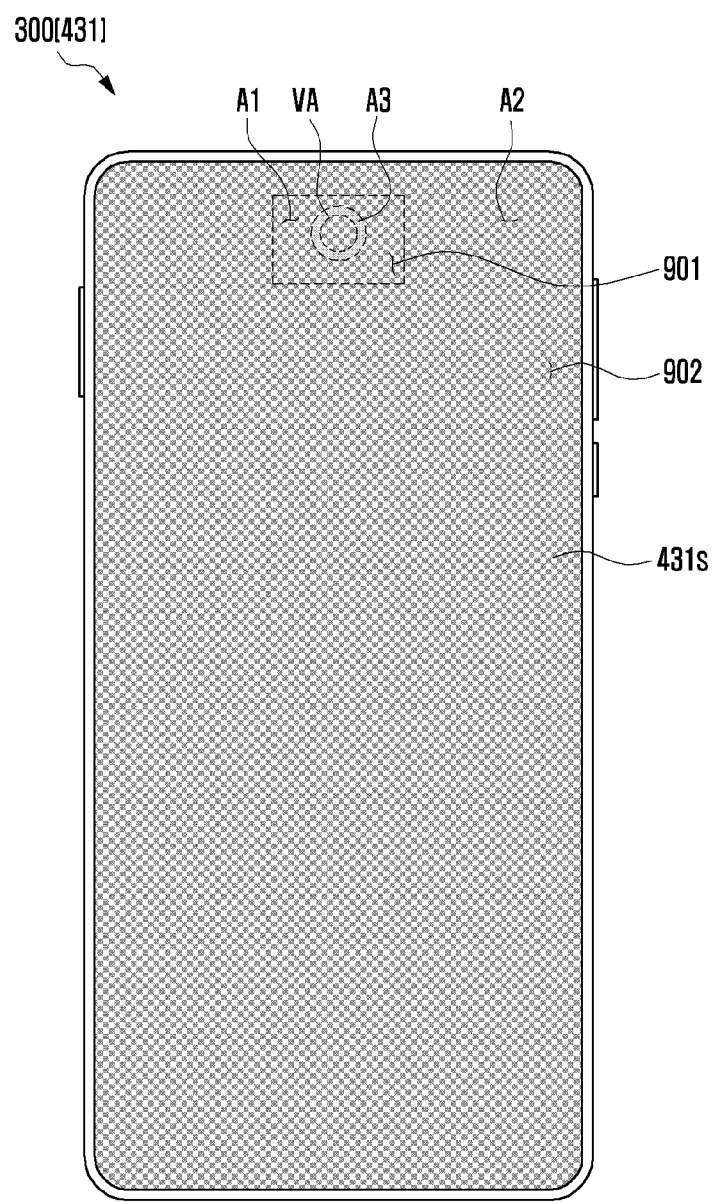
FIG. 11B illustrates a shape of an opaque mask of a mask layer when a front surface of an electronic device is viewed from a first direction according to an embodiment of the disclosure.

FIG. 11A is a plan view illustrating the shape of an opaque mask of a mask layer according to an embodiment of the disclosure. FIG. 11B illustrates the shape of an opaque mask of a mask layer when the front surface (or a display panel) of an electronic device is viewed from a first direction (direction ①) according to an embodiment of the disclosure.

The mask layer 431s illustrated in FIGS. 11A and 11B may be at least partially similar to the mask layer 431s illustrated in FIGS. 9A, 9B, 10A, and 10B, or may further include another embodiment. Hereinafter, in connection with FIGS. 11A and 11B, only changed parts will be described.

Referring to FIGS. 11A and 11B, when the display panel 431 is viewed from the first direction (direction ①), the mask layer 431s according to another embodiment may further include opaque masks 713 and 714 enlarged to at least a portion 901 (e.g., an area corresponding to 901 in FIGS. 9A and 9B) of the first active area A1 and at least a portion 902 (e.g., an area corresponding to 902 in FIGS. 9A and 9B) of the second active area A2.

In another embodiment, opaque masks 711, 712, 713, and 714 formed in the mask layer 431s may include first portions 711 at least partially formed in the field-of-view area VA, a second portion 712 formed to surround the outer boundary of the field-of-view area VA, third portions 713 at least partially formed in the first active area A1 outside the second portion 712, and fourth portions 714 at least partially formed in the second active area A2.

In an embodiment, the first portions 711 may be formed to have a specific shape, a specific size, and/or specific arrangement density, and portions in which the first portions 711 are not formed may form multiple openings 721 (e.g., first openings 721). For example, as the first portions 711 are formed to have a specific shape, a specific size, and/or specific arrangement density, the first portions 711 may form first patterns in the field-of-view area VA.

In an embodiment, the third portions 713 may be formed to have a specific shape, a specific size, and/or a specific arrangement density, and portions in which the third portions 713 are not formed may form multiple openings 722 (e.g., second openings 722). For example, as the third portions 713 are formed to have a specific shape, a specific size, and/or a specific arrangement density, the third portions 713 may form second patterns in the first active area A1.

In an embodiment, the fourth portions 714 may be formed to have a specific shape, a specific size, and/or a specific arrangement density, and portions in which the fourth portions 714 are not formed may form multiple openings 723 (e.g., third openings 723). For example, as the fourth portions 714 are formed to have a specific shape, a specific size, and/or a specific arrangement density, the fourth portions 714 may form third patterns in the second active area A2.

In an embodiment, the third patterns of the fourth portions 714 may be identical to or different from the first patterns of the first portions 711 and/or the second patterns of the third portions 713. For example, all of the first to third patterns may be identical. Alternatively, the second patterns may be different from the first patterns, and the third patterns may be different from the first patterns and/or the second patterns.

In the illustrated example, the openings 721, 722, and 723 have a tetragonal shape, but the shape of the openings 721, 722, and 723 of the disclosure may be modified or changed to various shapes.

Figure 12A:
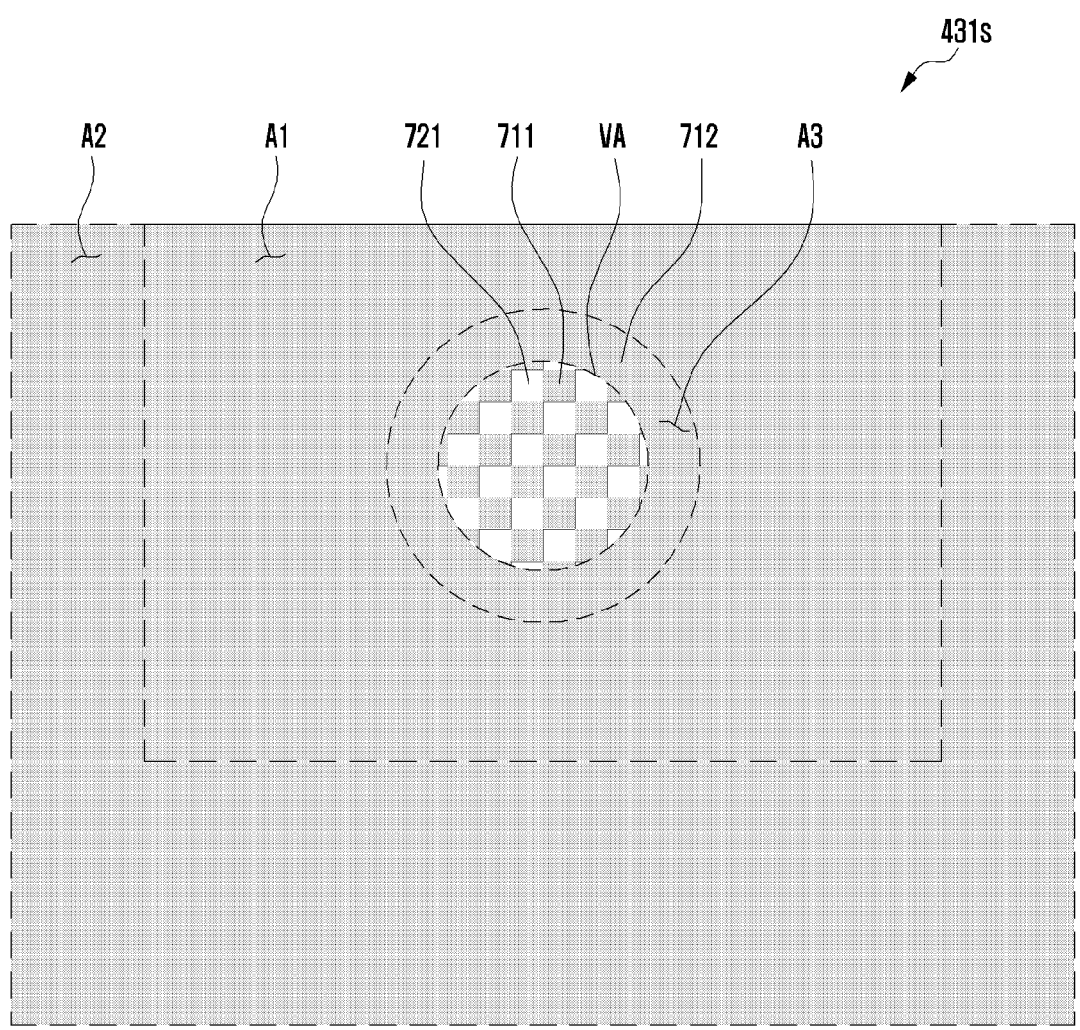
FIG. 12A is a plan view illustrating a shape of an opaque mask of a mask layer according to an embodiment of the disclosure.
Figure 12B:
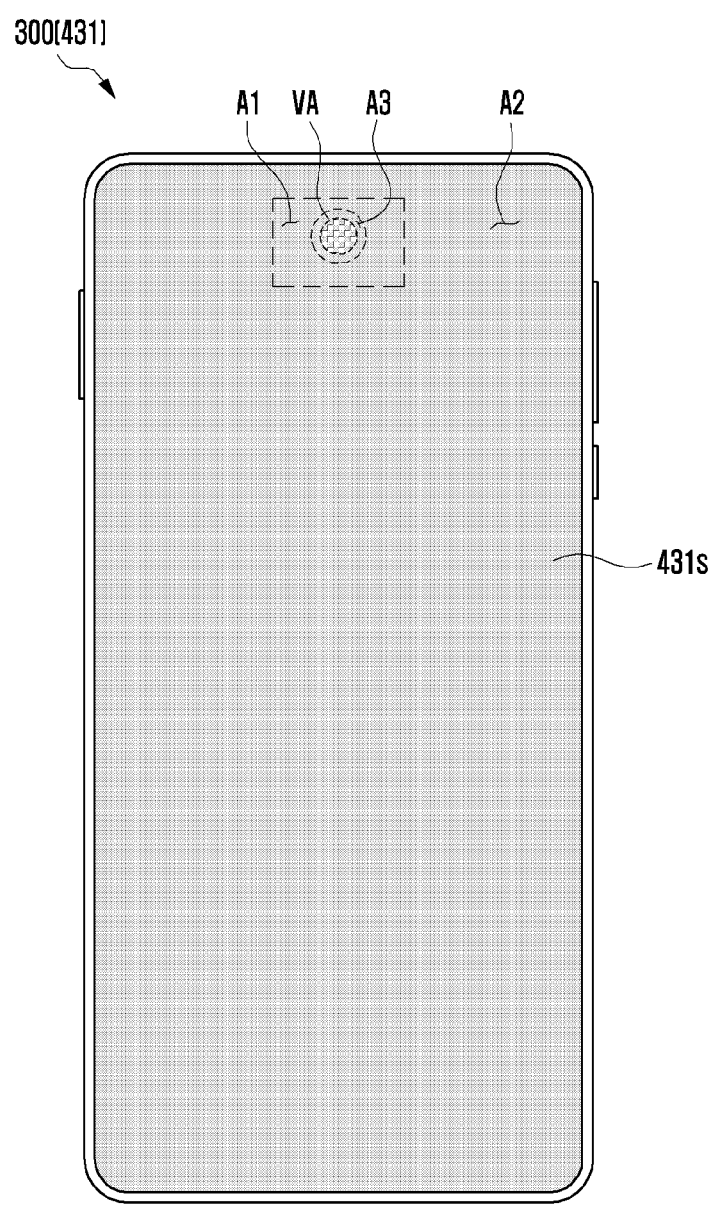
FIG. 12B illustrates a shape of an opaque mask of a mask layer when a front surface of an electronic device is viewed from a first direction according to an embodiment of the disclosure.

FIG. 12A is a plan view illustrating the shape of an opaque mask of a mask layer according to an embodiment of the disclosure. FIG. 12B illustrates the shape of an opaque mask of a mask layer when the front surface (or a display panel) of an electronic device is viewed from a first direction (direction ①) according to an embodiment of the disclosure.

The mask layer 431s illustrated in FIGS. 12A and 12B may be at least partially similar or identical to the mask layer 431s illustrated in FIGS. 9A, 9B, 10A, 10B, 11A, and 11B. Hereinafter, only parts changed in FIGS. 12A and 12B will be described.

Referring to FIGS. 12A and 12B, an opaque mask (e.g., the opaque mask 710 of FIG. 7) according to an embodiment may be formed to correspond to a portion of the first active area A1 outside the field-of-view area VA and the entirety of the second active area A2. For example, the opaque mask 710 may be substantially formed over an area corresponding to most of the area of the display panel 431, except that the opaque mask 710 is at least partially formed in the field-of-view area VA.

According to the illustrated example, in the display panel 431, the opaque mask 710 of the mask layer 431s may be enlarged to the entirety of an area outside the field-of-view area VA, thereby shielding ambient noise and taking over the role of a metal sheet (e.g., the metal sheet 444 of FIG. 6) attached to the display panel 431 in a second direction (direction ②). Accordingly, in the electronic device 300 according to an embodiment of the disclosure, a metal sheet (e.g., the metal sheet 444 of FIG. 6) may be omitted or removed. The metal sheet (e.g., the metal sheet 444 of FIG. 6) may increase the thickness of the electronic device 300, and when deformed (e.g., wrinkled, dented, or pressed), may cause a poor appearance of the display. In the case of the electronic device 300 according to an embodiment of the disclosure, the metal sheet (e.g., the metal sheet 444 of FIG. 6) may be omitted or removed, thereby reducing the thickness of the electronic device 300 and preventing the poor appearance of the display due to wrinkling of the metal sheet.

Figure 13A:
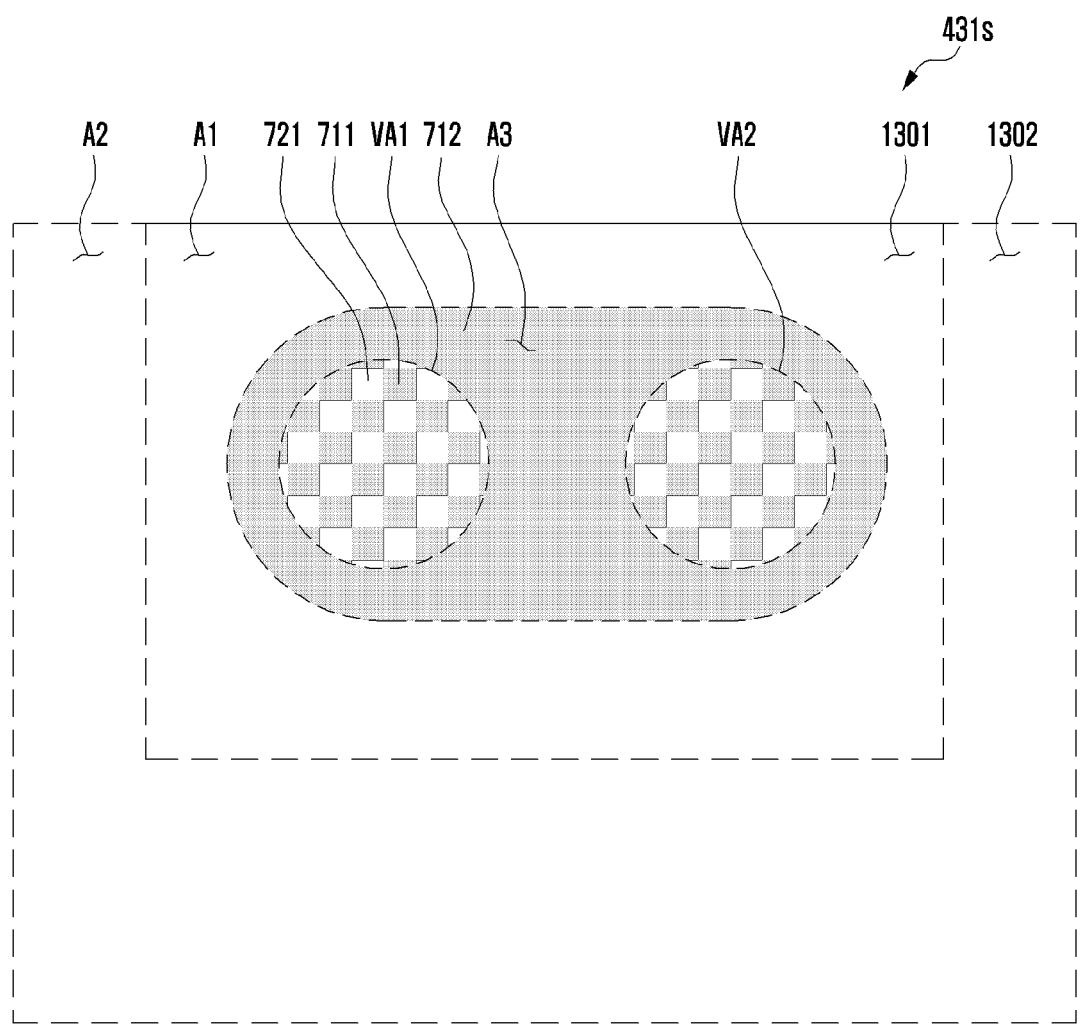
FIG. 13A is a plan view illustrating a shape of an opaque mask of a mask layer according to an embodiment of the disclosure.
Figure 13B:
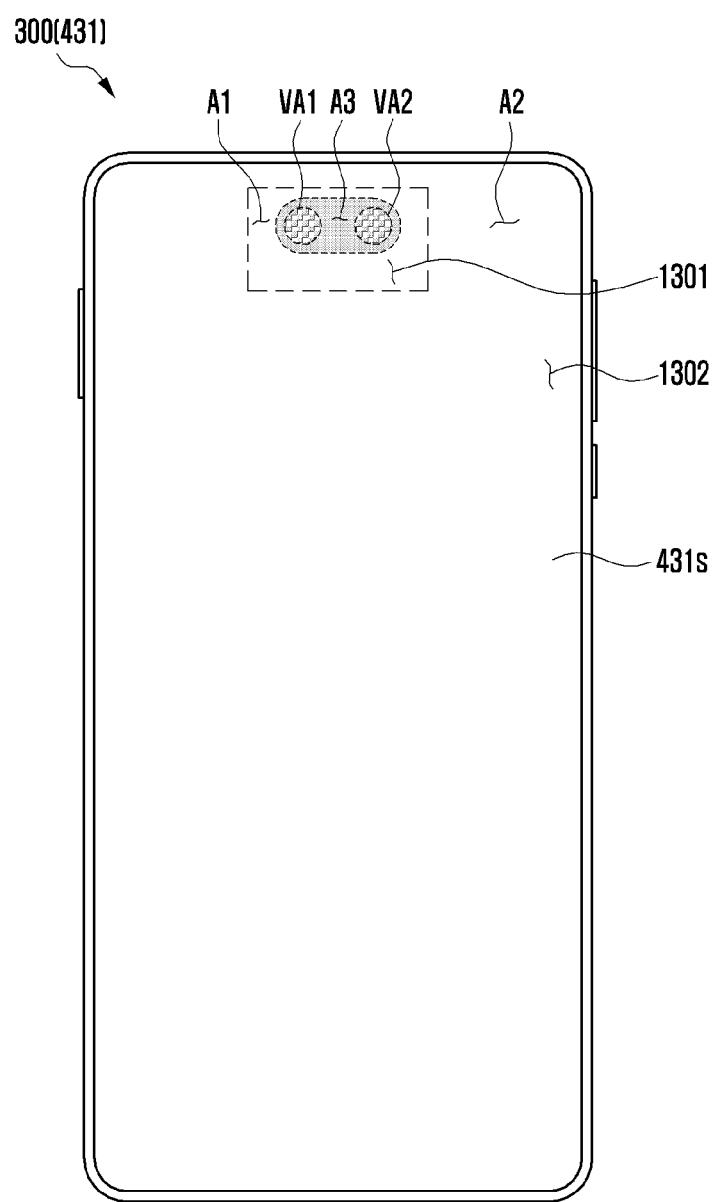
FIG. 13B illustrates a shape of an opaque mask of a mask layer when a front surface of an electronic device is viewed from a first direction according to an embodiment of the disclosure.

FIG. 13A is a plan view illustrating the shape of an opaque mask of a mask layer according to an embodiment of the disclosure. FIG. 13B illustrates a shape of an opaque mask of a mask layer when the front surface (or a display panel) of an electronic device is viewed from a first direction (direction ①) according to an embodiment of the disclosure.

The mask layer 431s illustrated in FIGS. 13A and 13B may be at least partially similar or identical to the mask layer 431s illustrated in FIGS. 9A, 9B, 10A, 10B, 11A, 11B, 12A, and 12B. Hereinafter, only parts changed in FIGS. 12A and 12B will be described.

Referring to FIGS. 13A and 13B, an electronic device (e.g., the electronic device 300 of FIG. 3) according to another embodiment may include multiple camera devices 500, for example, at least two camera devices (e.g., the camera device 500 of FIG. 3), facing the front surface (e.g., a first direction (direction ①)). The display panel 431 according to another embodiment may include the first active area A1 that at least partially overlaps the multiple camera devices 500. For example, the display panel 431 may include the first active area A1 that at least partially overlaps at least two camera devices 500. The first active area A1 may include multiple field-of-view areas VA1 and VA2 corresponding to (or overlapping) lenses (e.g., the multiple lenses 530 of FIG. 5) of the multiple camera devices 500. For example, the first active area A1 may include a first field-of-view area VA1 formed to correspond to a first lens (e.g., a wide-angle lens), and a second field-of-view area VA2 formed to correspond to a second lens (e.g., a telephoto lens). For example, the first field-of-view area VA1 may correspond to the size of the field of view (e.g., field-of-view θ of FIG. 6) related to the first lens (e.g., the wide-angle lens), and the second angle of view area VA2 may correspond to the size of the field of view (e.g., the field-of-view θ of FIG. 6) related to the second lens (e.g., the telephoto lens). In the illustrated example, an active area other than the first active area A1 may be the second active area A2.

According to the illustrated example, in the mask layer 431s, the opaque mask 710 may be formed in each of the multiple field-of-view areas VA1 and VA2. For example, according to an embodiment, in the mask layer 431s, first portions 711 of the opaque mask 710 may be at least partially formed in each of the multiple field-of-view areas VA1 and VA2. In an embodiment, the first portions 711 may be formed to have a specific shape, a specific size, and/or a specific arrangement density, and portions in which the first portions 711 are not formed may form multiple openings 721 (e.g., first openings 721). For example, as the first portions 711 are formed to have a specific shape, a specific size, and/or a specific arrangement density, the first portions 711 may form first patterns in the field-of-view area VA.

According to the illustrated example, the mask layer 431s may further include second portion 712 of the opaque mask 710 enlarged to the outside of the multiple field-of-view areas VA1 and VA2. For example, the second portion 712 of the opaque mask 710 may be formed in at least a portion of the first active area A1 while surrounding the boundary portion of the first field-of-view area VA1 and the boundary portion A3 of the second field-of-view area VA2.

Figure 14A:
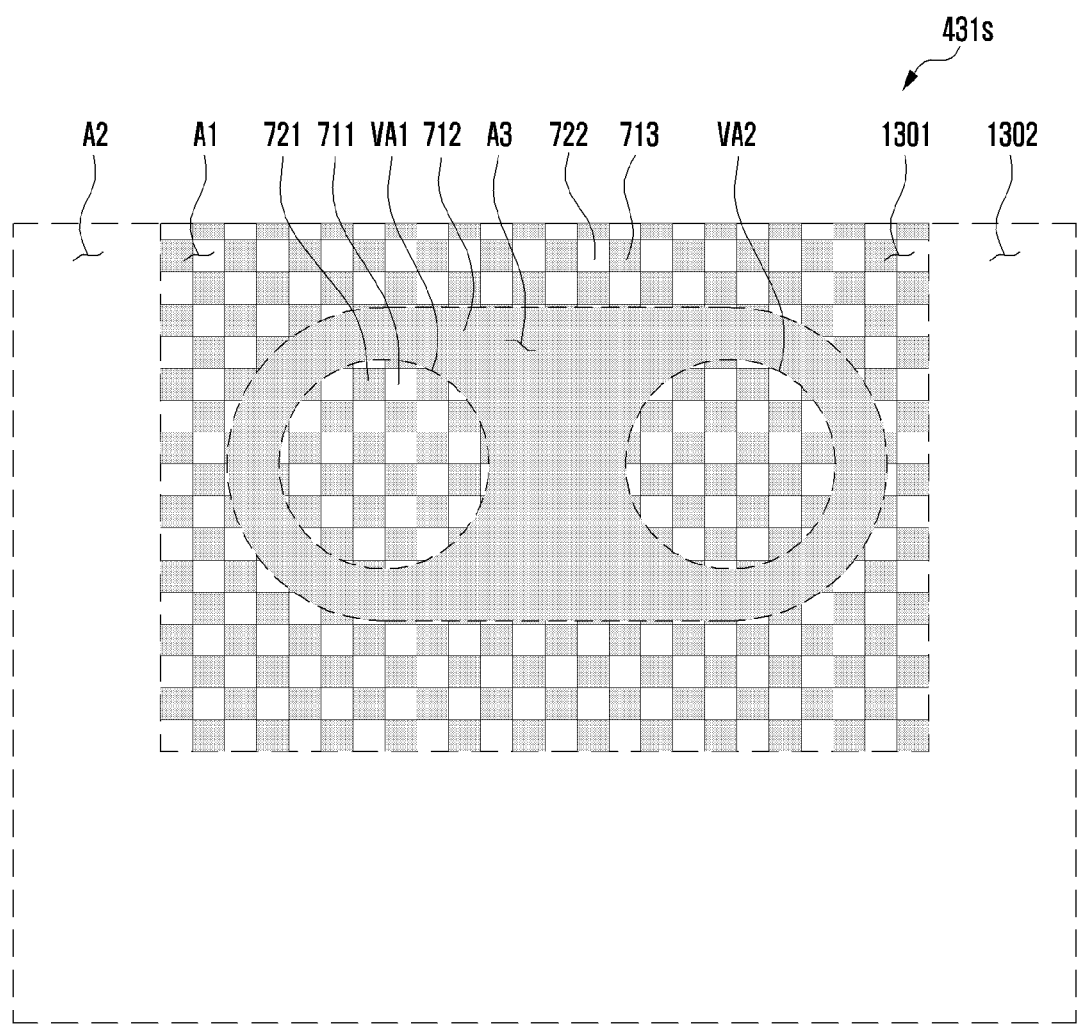
FIG. 14A is a plan view illustrating a shape of an opaque mask of a mask layer according to an embodiment of the disclosure.
Figure 14B:
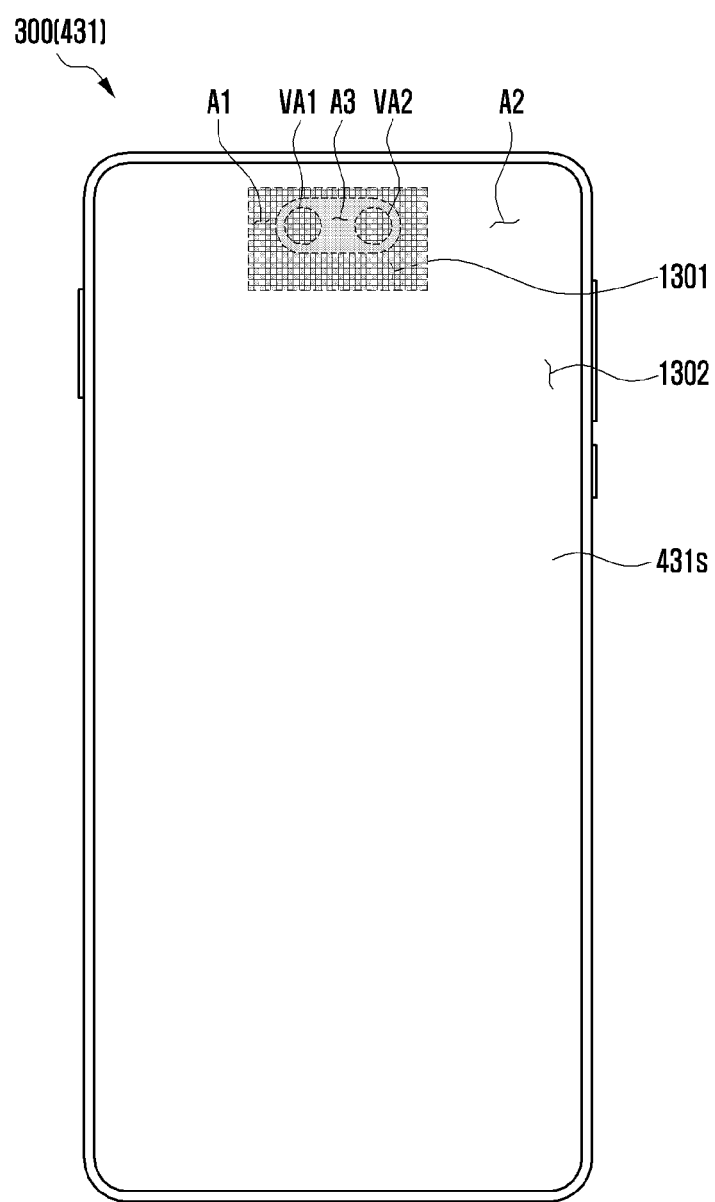
FIG. 14B illustrates a shape of an opaque mask of a mask layer when a front surface of an electronic device is viewed from a first direction according to an embodiment of the disclosure.

FIG. 14A is a plan view illustrating the shape of an opaque mask of a mask layer according to an embodiment of the disclosure. FIG. 14B illustrates the shape of an opaque mask of a mask layer when the front surface (or a display panel)

of an electronic device is viewed from a first direction (direction) according to an embodiment of the disclosure.

The mask layer 431s illustrated in FIGS. 14A and 14B may be at least partially similar to the mask layer 431s illustrated in FIGS. 9A, 9B, 10A, 10B, 11A, 11B, 12A, 12B, 13A, and 13B, or may further include another embodiment. Hereinafter, in connection with FIGS. 14A and 14B, only changed parts will be described.

Referring to FIGS. 14A and 14B, when the display panel 431 is viewed from the first direction (direction C)), the mask layer 431s according to another embodiment may further include an opaque mask 713 enlarged to at least a portion 1301 (e.g., an area corresponding to 1301 in FIGS. 13A and 13B) of the first active area A1.

In another embodiment, the opaque masks 711, 712, 713 formed in the mask layer 431s may include first portions 711 at least partially formed in field-of-view areas VA1 and VA2, a second portion 712 formed to surround the outer boundaries of the field-of-view areas VA1 and VA2, and third portions 713 at least partially formed in the first active area A1 outside the second portion 712.

In an embodiment, the first portions 711 may be formed to have a specific shape, a specific size, and/or a specific arrangement density, and portions in which the first portions 711 are not formed may form multiple openings 721 (e.g., first openings 721). For example, as the first portions 711 are formed to have a specific shape, a specific size, and/or specific arrangement density, the first portions 711 may form first patterns in the field-of-view area VA.

In an embodiment, the third portions 713 may be formed to have a specific shape, a specific size, and/or a specific arrangement density, and portions in which the third portions 713 are not formed may form multiple openings 722 (e.g., second openings 722). For example, as the third portions 713 are formed to have a specific shape, a specific size, and/or a specific arrangement density, the third portions 713 may form second patterns in the first active area A1.

In an embodiment, the second patterns of the third portions 713 may be identical to or different from the first patterns of the first portions 711.

In the illustrated example, the openings 721 and 722 have a tetragonal shape, but the shape of the openings 721 and 722 of the disclosure may be modified or changed to various shapes.

Figure 15A:
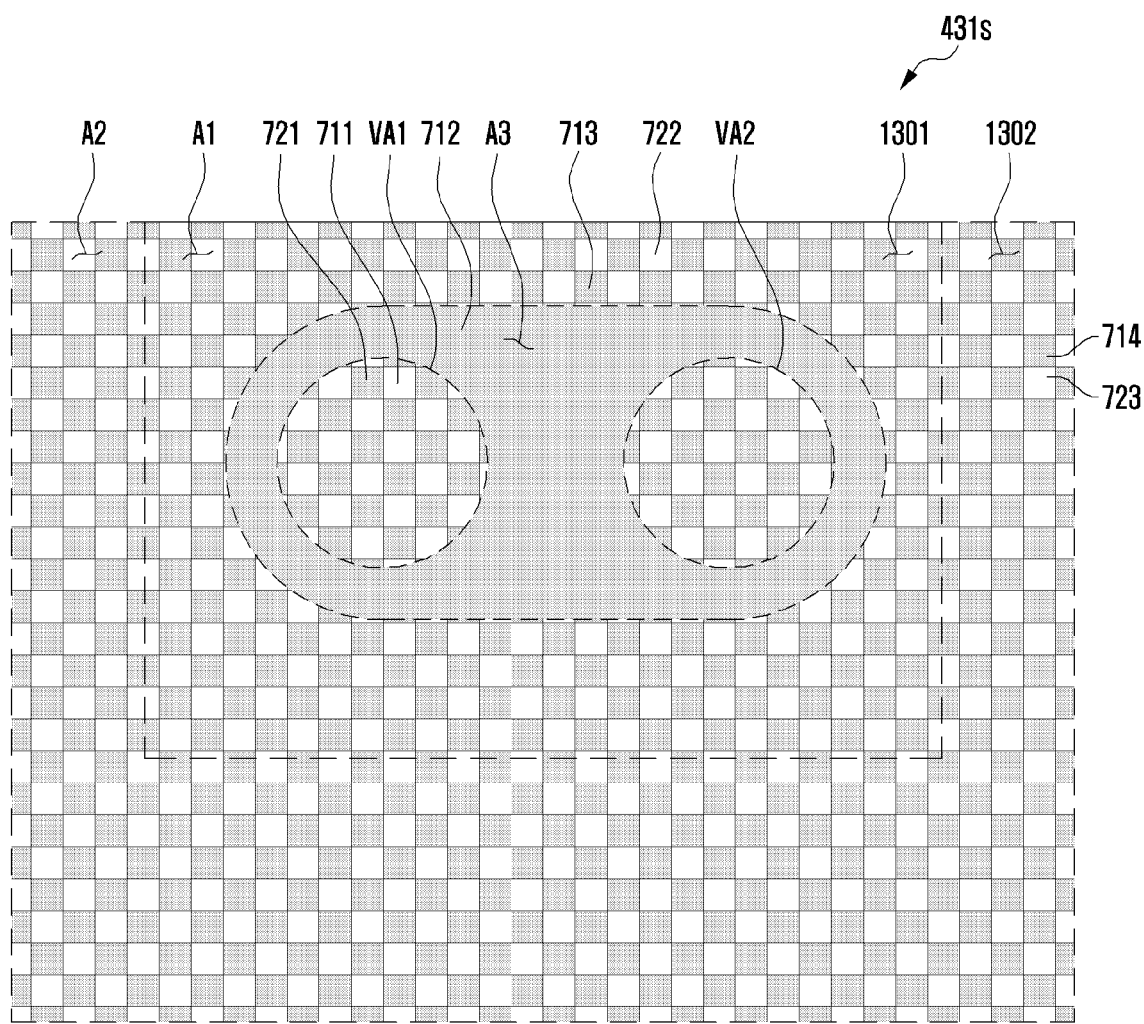
FIG. 15A is a plan view illustrating a shape of an opaque mask of a mask layer according to an embodiment of the disclosure.
Figure 15B:
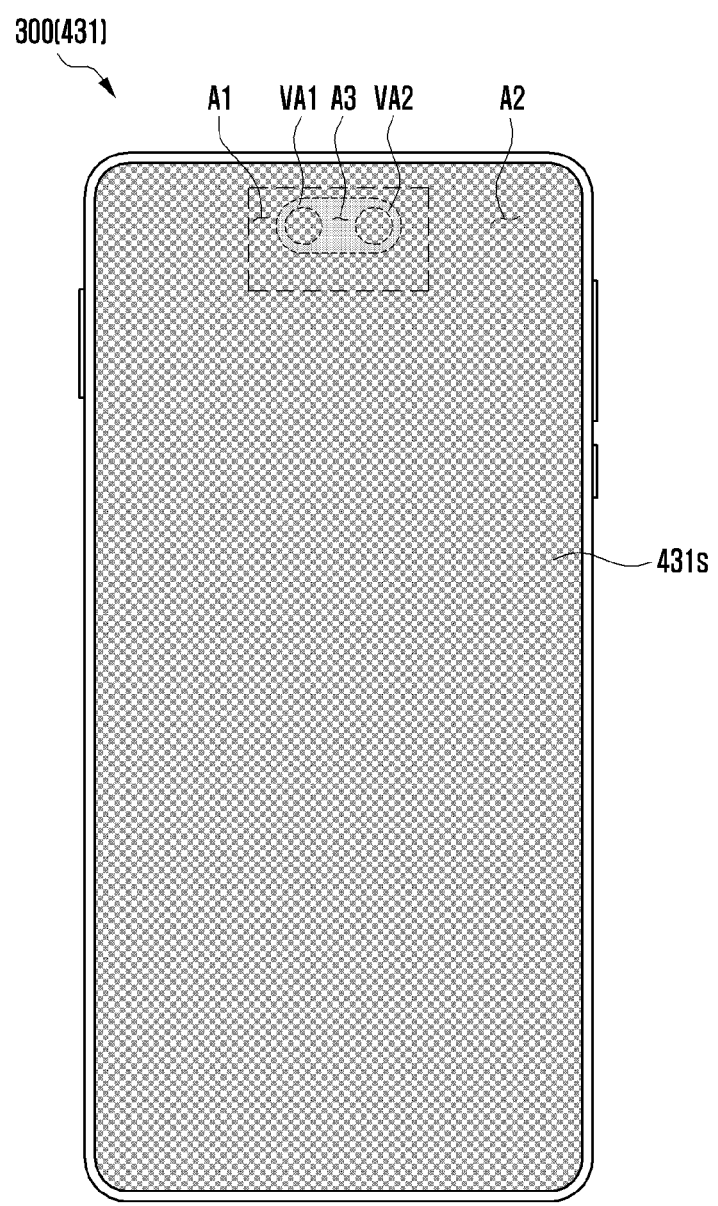
FIG. 15B illustrates a shape of an opaque mask of a mask layer when a front surface of an electronic device is viewed from a first direction according to an embodiment of the disclosure.

FIG. 15A is a plan view illustrating the shape of an opaque mask of a mask layer according to an embodiment of the disclosure. FIG. 15B illustrates the shape of an opaque mask of a mask layer when the front surface (or a display panel) of an electronic device is viewed from a first direction (direction ①) according to an embodiment of the disclosure.

The mask layer 431s illustrated in FIGS. 15A and 15B may be at least partially similar to the mask layer 431s illustrated in FIGS. 9A, 9B, 10A, 10B, 11A, 11B, 12A, 12B, 13A, 13B, 14A, and 14B, or may further include another embodiment. Hereinafter, in connection with FIGS. 15A and 15B, only changed parts will be described.

Referring to FIGS. 15A and 15B, when the display panel 431 is viewed from the first direction (direction ①), the mask layer 431s according to another embodiment may further include opaque masks 713 and 714 enlarged to at least a portion 1301 (e.g., an area corresponding to 1301 in FIGS. 13A and 13B) of the first active area A1 and at least a portion 1302 (e.g., an area corresponding to 1302 in FIGS. 13A and 13B) of the second active area A2.

In another embodiment, opaque masks 711, 712, 713, and 714 formed in the mask layer 431s may include first portions 711 at least partially formed in field-of-view areas VA1 and VA2, a second portion 712 formed to surround the outer boundaries of the field-of-view area VA, third portions 713 at least partially formed in the first active area A1 outside the second portion 712, and fourth portions 714 at least partially formed in the second active area A2.

In an embodiment, the first portions 711 may be formed to have a specific shape, a specific size, and/or a specific arrangement density, and portions in which the first portions 711 are not formed may form multiple openings 721 (e.g., first openings 721). For example, as the first portions 711 are formed to have a specific shape, a specific size, and/or specific arrangement density, the first portions 711 may form first patterns in the field-of-view areas VA1 and VA2.

In an embodiment, the third portions 713 may be formed to have a specific shape, a specific size, and/or a specific arrangement density, and portions in which the third portions 713 are not formed may form multiple openings 722 (e.g., second openings 722). For example, as the third portions 713 are formed to have a specific shape, a specific size, and/or a specific arrangement density, the third portions 713 may form second patterns in the first active area A1.

In an embodiment, the fourth portions 714 may be formed to have a specific shape, a specific size, and/or a specific arrangement density, and portions in which the fourth portions 714 are not formed may form multiple openings 723 (e.g., third openings 723). For example, as the fourth portions 714 are formed to have a specific shape, a specific size, and/or a specific arrangement density, the fourth portions 714 may form third patterns in the second active area A2.

In an embodiment, the third patterns of the fourth portions 714 may be identical to or different from the first patterns of the first portions 711 and/or the second patterns of the third portions 713. Alternatively, the second patterns may be different from the first patterns, and the third patterns may be different from the first patterns and/or the second patterns.

In the illustrated example, the openings 721, 722, and 723 have a tetragonal shape, but the shape of the openings 721, 722, and 723 of the disclosure may be modified or changed to various shapes.

Figure 16A:
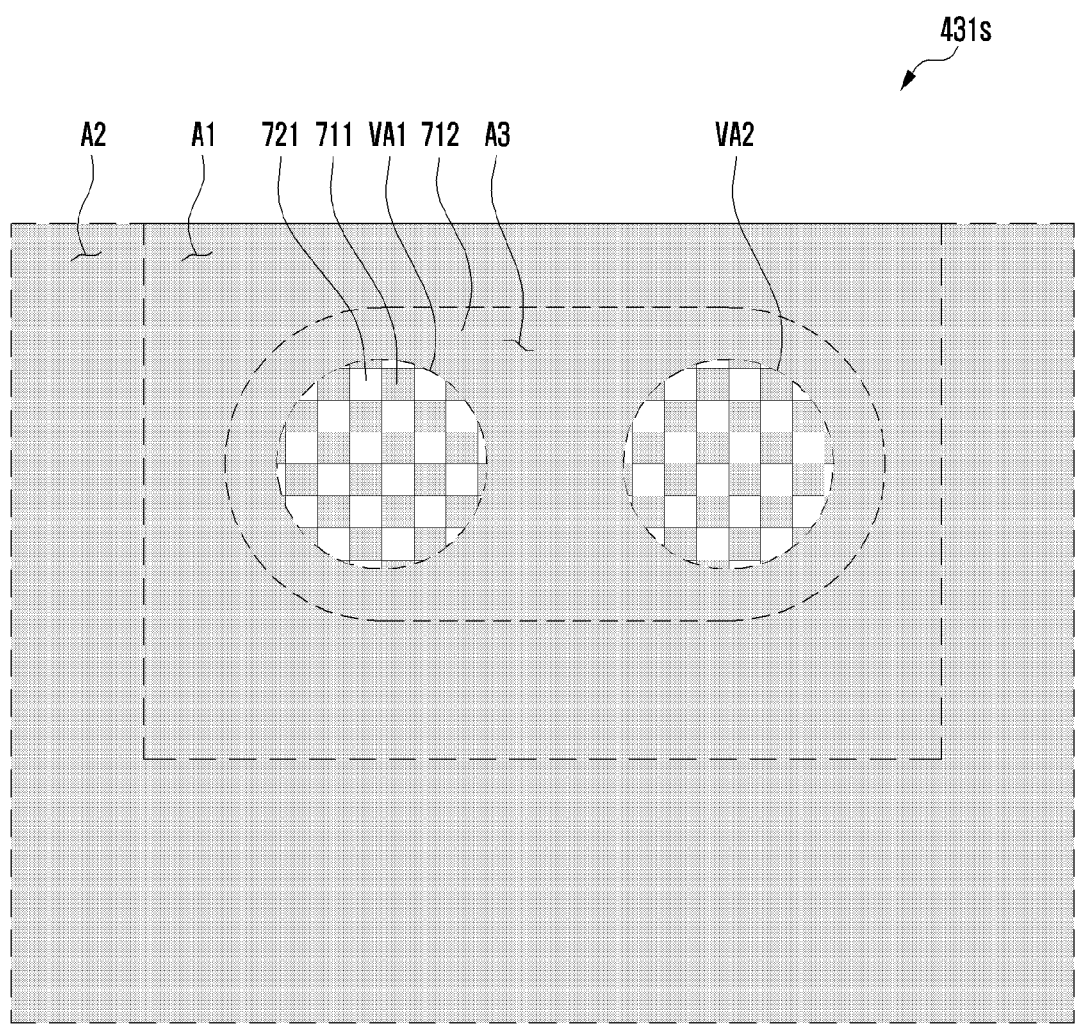
FIG. 16A is a plan view illustrating a shape of an opaque mask of a mask layer according to an embodiment of the disclosure.
Figure 16B:
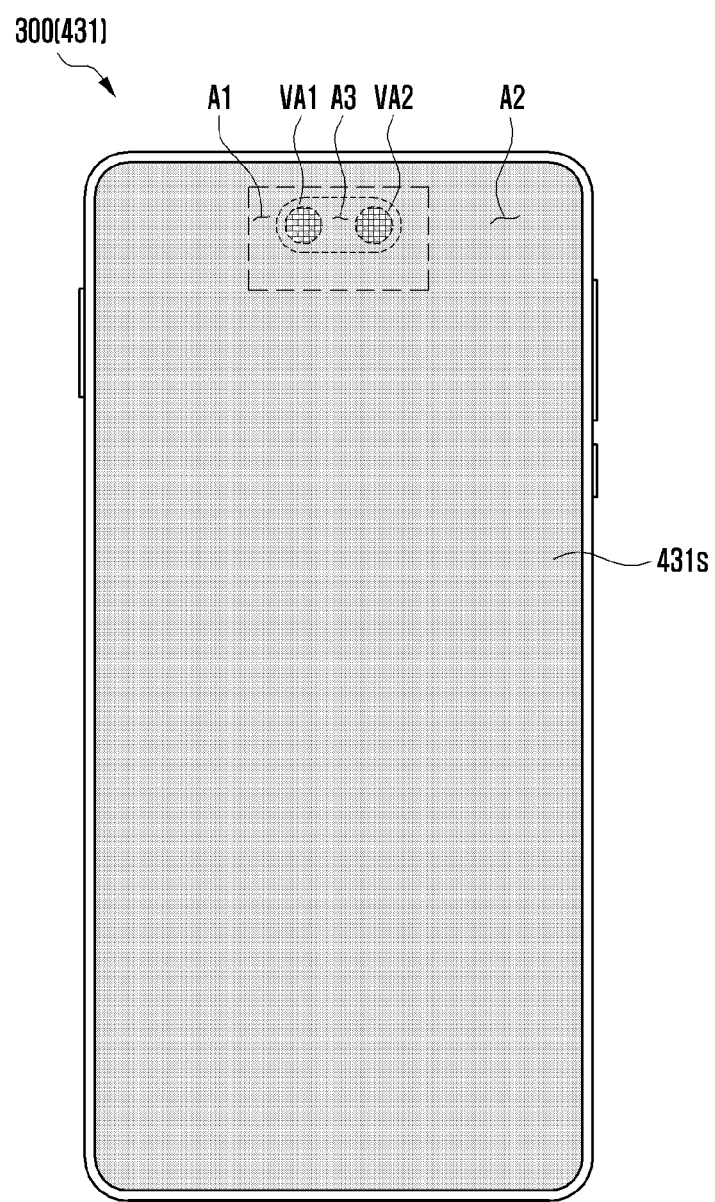
FIG. 16B illustrates a shape of an opaque mask of a mask layer when a front surface of an electronic device is viewed from a first direction according to an embodiment of the disclosure.

FIG. 16A is a plan view illustrating the shape of an opaque mask of a mask layer according to an embodiment of the disclosure. FIG. 16B illustrates a shape of an opaque mask of a mask layer when the front surface (or a display panel) of an electronic device is viewed from a first direction (direction ①) according to an embodiment of the disclosure.

The mask layer 431s illustrated in FIGS. 16A and 16B may be at least partially similar or identical to the mask layer 431s illustrated in FIGS. 9A, 9B, 10A, 10B, 11A, 11B, 12A, 12B, 13A, 13B, 14A, 14B, 15A, and 15B. Hereinafter, only parts changed in FIGS. 16A and 16B will be described.

Referring to FIGS. 16A and 16B, an opaque mask (e.g., the opaque mask 710 of FIG. 7) of a mask layer (e.g., the mask layer 431s of FIG. 7) may be enlarged to the entirety of an area outside field-of-view areas VA1 and VA2 corresponding to the field of view of a camera device (e.g., the camera device 500 of FIG. 3). For example, the opaque mask 710 may be formed to correspond to a portion of the first active area A1 outside of the field-of-view areas VA1 and VA2 and the entirety of the second active area A2. For example, the opaque mask 710 may be formed over an area substantially corresponding to most of the area of the display panel 431, except that the opaque mask 710 is at least partially formed in the field-of-view areas VA1 and VA2.

According to the illustrated example, in the display panel 431, the opaque mask 710 of the mask layer 431s may be enlarged to the entirety of an area outside the field-of-view areas VA1 and VA2, thereby shielding ambient noise and taking over the role of a metal sheet (e.g., the metal sheet 444 of FIG. 6) attached to the display panel 431 in a second direction (direction ②). Accordingly, in the electronic device 300 according to an embodiment of the disclosure, a metal sheet (e.g., the metal sheet 444 of FIG. 6) may be omitted or removed. The metal sheet (e.g., the metal sheet 444 of FIG. 6) may increase the thickness of the electronic device 300, and when deformed (e.g., wrinkled, dented, or pressed), may cause a poor appearance of the display. In the case of the electronic device 300 according to an embodiment of the disclosure, the metal sheet (e.g., the metal sheet 444 of FIG. 6) may be omitted or removed, thereby reducing the thickness of the electronic device 300 and preventing the poor appearance of the display due to wrinkling of the metal sheet.

Figure 17:
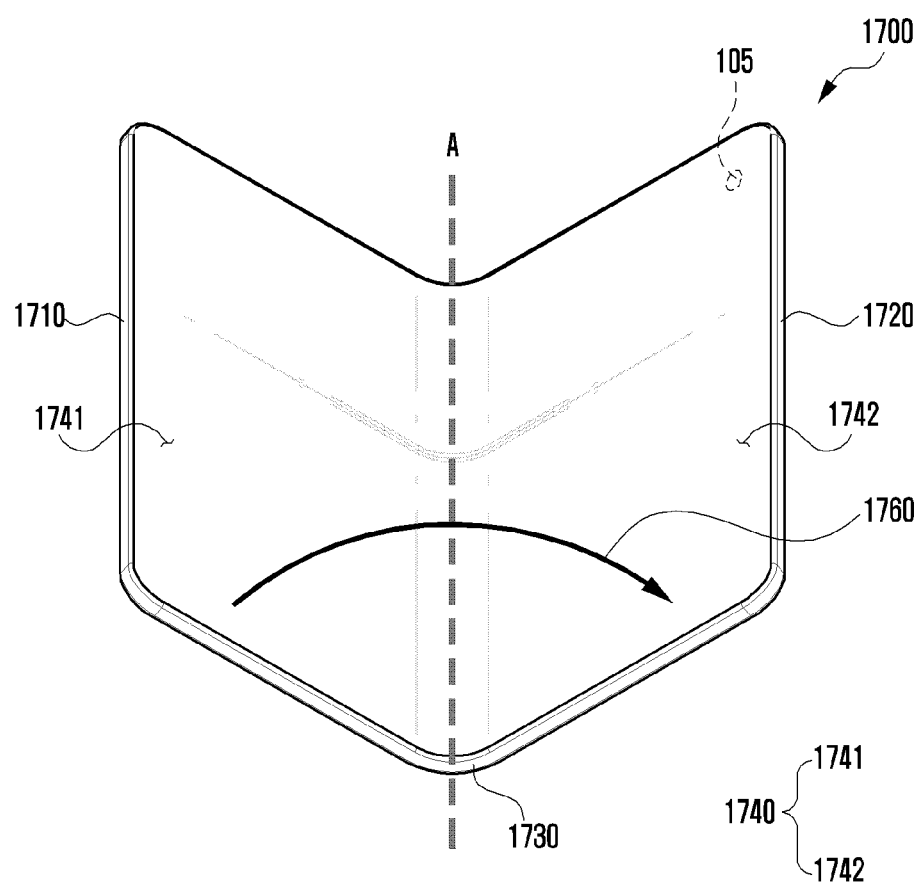
FIG. 17 illustrates an electronic device, which is folded in an in-folding manner according to an embodiment of the disclosure.

FIG. 17 illustrates an electronic device, which is folded in an in-folding manner according to an embodiment of the disclosure.

Referring to FIG. 17, an electronic device 1700 (e.g., the electronic device 100 of FIG. 1) according to another embodiment may be the electronic device 1700 that is folded in an in-folding manner about one folding axis A. For example, the folding axis A may cross the center of a display 1740 (e.g., the display 101 of FIG. 1) in the vertical direction. According to another embodiment that has not been illustrated, the folding axis A may cross the center of the display 1740 in the horizontal direction.

The electronic device 1700 according to another embodiment may include foldable housings (e.g., a first housing 1710 and a second housing 1720), a hinge assembly 1730 connecting the first housing 1710 to the second housing 1720 such that the second housing 1720 is rotatable relative to the first housing 1710, and a flexible or foldable display 1740 disposed in a space formed by the foldable housings 1710 and 1720.

In another embodiment, the display 1740 may be disposed across the hinge assembly 1730 from the first housing 1710 to the second housing 1720. The display 1740 may be divided into a first display area 1741 disposed in the inner space of the first housing 1710 and a second display area 1742 disposed in the inner space of the second housing 1720 with reference to the folding axis A. The hinge assembly 1730 may be implemented in an in-folding manner in which the two display areas 1741 and 1742 face each other when the electronic device 1700 switches from an unfolded state to a folded state (in other words, a shape change), as shown by arrow 1760. For example, when the electronic device 1700 is in an unfolded state, the two display areas 1741 and 1742 may face a substantially identical direction, and when the electronic device 1700 switches from the unfolded state to a folded state (not shown), the two display areas 1741 and 1742 may rotate in directions in which the two display areas 1741 and 1742 face each other.

In another embodiment, two or more hinge assemblies 1730 may be arranged to be folded in a substantially identical direction or in different directions.

In another embodiment, the camera device 105 may be disposed on the rear surface (e.g., the bottom) of the display 1740. In another embodiment, the structure of the mask layer 431s in a portion where the display 1740 and the camera device 105 (e.g., the camera device 500 of FIG. 3) overlap may be identical or similar to the various embodiments described with reference to FIGS. 1, 2, 3, 4, 5, 6, 7, 8A, 8B, 9A, 9B, 10A, 10B, 11A, 11B, 12A, 12B, 13A, 13B, 14A, 14B, 15A, 15B, 16A, and 16B.

Figure 18:
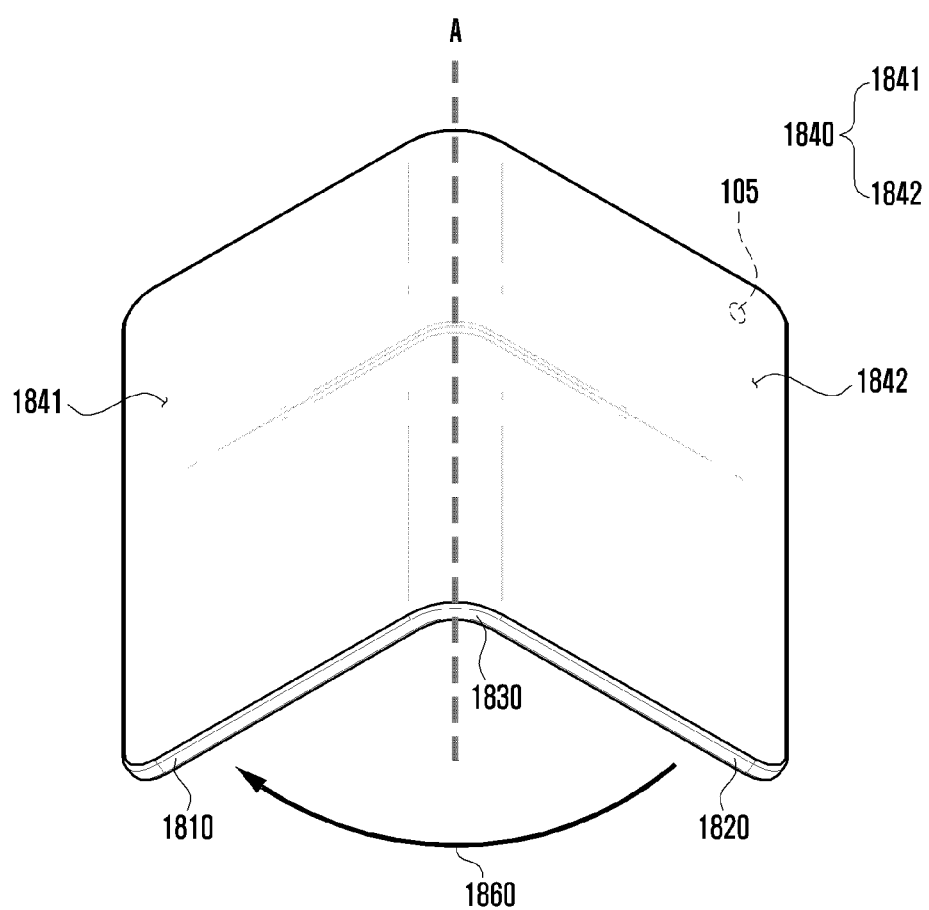
FIG. 18 illustrates an electronic device, which is folded in an out-folding manner according to an embodiment of the disclosure.

FIG. 18 illustrates an electronic device, which is folded in an out-folding manner according to an embodiment of the disclosure.

Referring to FIG. 18, an electronic device 1800 (e.g., the electronic device 100 of FIG. 1) according to another embodiment may be the electronic device 1800 that is folded in an out-folding manner about one folding axis A. For example, the folding axis A may cross the center of a display 1840 (e.g., the display 101 of FIG. 1) in the vertical direction. According to another embodiment that has not been illustrated, the folding axis A may cross the center of the display 1840 in the horizontal direction.

The electronic device 1800 according to another embodiment may include foldable housings (e.g., a first housing 1810 and a second housing 1820), a hinge assembly 1830, and the display 1840 disposed in a space formed by the foldable housings 1810 and 1820. The display 1840 may be divided into a first display area 1841 disposed in the inner space of the first housing 1810 and a second display area 1842 disposed in the inner space of the second housing 1820 with reference to the folding axis A.

The hinge assembly 1830 may be implemented in an out-folding manner in which the two display areas 1841 and 1842 face the opposite directions when the electronic device 1800 switches from an unfolded state to a folded state. For example, when the electronic device 1800 is in an unfolded state, the two display areas 1841 and 1842 may face a substantially identical direction, and when the electronic device 1800 switches from the unfolded state to a folded state, as shown by arrow 1860, the two display areas 1841 and 1842 may rotate in the opposite directions.

In another embodiment, two or more hinge assemblies 1830 may be arranged to be folded in a substantially identical direction or in different directions.

In another embodiment, the camera device 105 (e.g., the camera device 500 of FIG. 3) may be disposed on the rear surface (e.g., the bottom) of the display 1840. In another embodiment, the structure of the mask layer 431s in a portion where the display 1840 and the camera device 105 overlap may be identical or similar to the various embodiments described with reference to FIGS. 1, 2, 3, 4, 5, 6, 7, 8A, 8B, 9A, 9B, 10A, 10B, 11A, 11B, 12A, 12B, 13A, 13B, 14A, 14B, 15A, 15B, 16A, and 16B.

Figure 19:
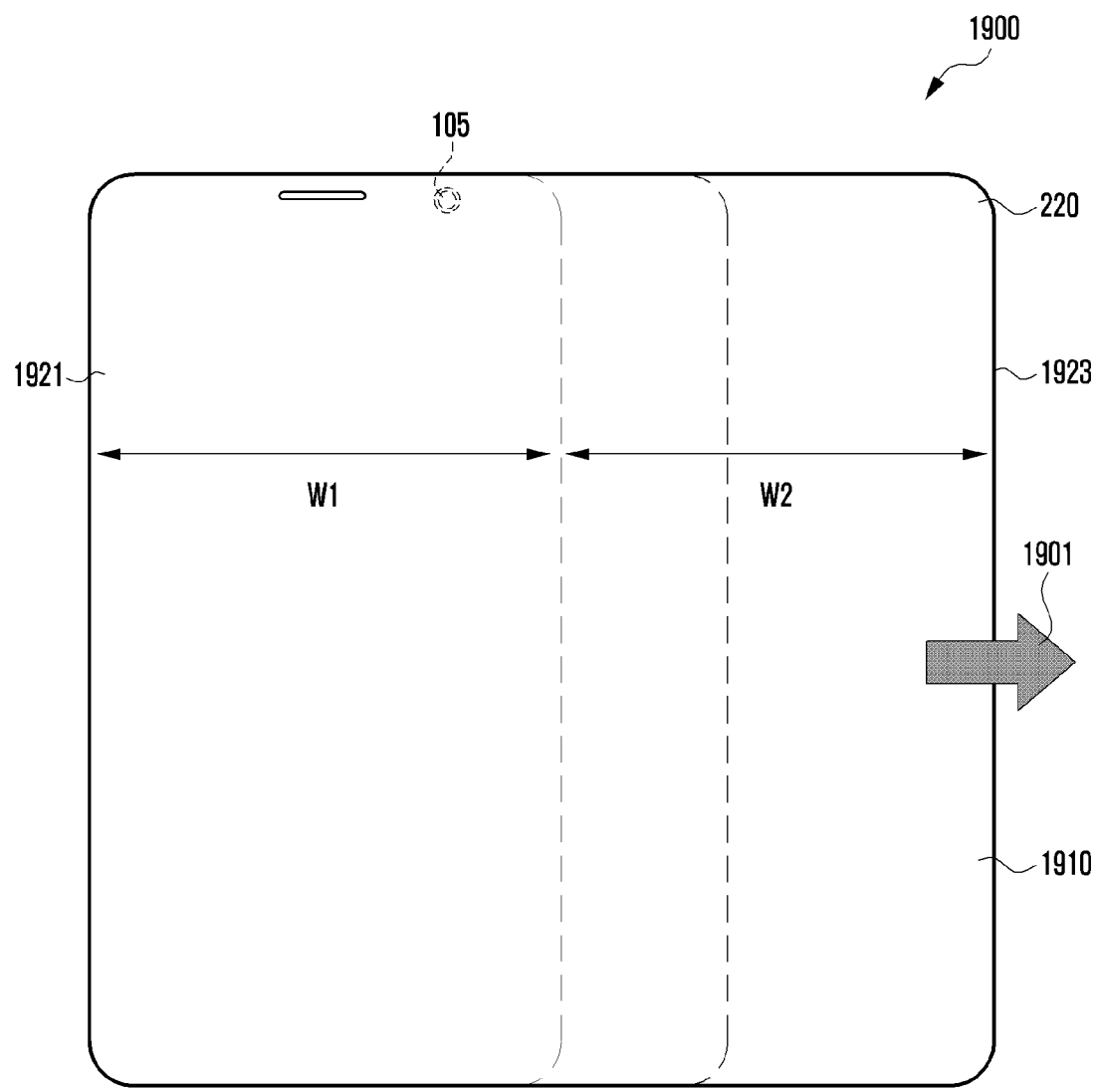
FIG. 19 illustrates an electronic device, which includes a rollable display according to an embodiment of the disclosure.

FIG. 19 illustrates an electronic device, which includes a rollable display according to an embodiment of the disclosure.

Referring to FIG. 19, an electronic device 1900 (e.g., the electronic device 100 of FIG. 1) according to another embodiment may include a housing 220, at least a portion of which has a variable length, and may include a rollable display 1910 (e.g., the display 101 of FIG. 1) in which an area or a width exposed to the outside is adjusted by varying the length of the housing 220.

In another embodiment, the housing 220 may include a first lateral member 1921, which is fixed, and a second lateral member 1923, which is movable and located opposite to the first lateral member 1921. For example, the first lateral member 1921 may be disposed and fixed in the x1 direction from the display 1910. For example, the second lateral member 1923 may be disposed in the x2 direction from the display 1910 and move in a sliding manner in the x2 direction. The exposed area and/or width of the display 1910 may be varied by the movement of the second lateral member 1923 in the x2 direction.

According to an embodiment, the display 1910 may be a flexible display (e.g., the flexible display 1740 of FIG. 17 or the flexible display 1840 of FIG. 18). According to an embodiment, an exposed width of the display 1910 may be adjusted based on the movement of the second lateral member 1923. For example, as shown by arrow 1901 of FIG. 19, when the second lateral member 1923 moves in the x2 direction, the exposed width may increase. For example, when the second lateral member 1923 moves in the x1 direction, the exposed width of the display 1910 may be reduced.

If it is assumed that the exposed width of the display 1910 is a first width W1 when the distance between the first lateral member 1921 and the second lateral member 1923 is the shortest and that the maximum width at which the second lateral member 1923 can move in the x2 direction is a second width W2, the minimum width of the display 1910 and the maximum width of the display 1910 may be as follows.

The minimum width of the display 1910: the first width W1.

The maximum width of the display 1910: the sum of the first width W1 and the second width W2.

In the illustrated example, it has been described that the first lateral member 1921 is fixed, and the second lateral member 1923 is movable in the x2 direction. However, the disclosure is not limited thereto, and the first lateral member 1921 may also move. For example, the first lateral member 1921 may move in the x1 direction, and the exposed width of the display 1910 may increase in the x1 direction based on the movement of the first lateral member 1921.

In the illustrated example, it has been described that the second lateral member 1923 is movable in the x2 direction. However, the disclosure is not limited thereto, and the second lateral member 1923 may move in the y1 direction or the y2 direction. In this case, the exposed width of the display 1910 may increase in the y1 direction or the y2 direction based on the movement of the second lateral member 1923.

In another embodiment illustrated in FIG. 19, the camera device 105 (e.g., the camera device 500 of FIG. 3) may be disposed on the rear surface (e.g., the bottom) of the display 1910. For example, the camera device 105 may be arranged in an area in which the exposure of the display 1910 is fixed. For example, the camera device 105 may be arranged such that the position thereof is fixed regardless of the width of the display 1910. In another embodiment, the structure of the mask layer 431s in a portion where the display 1910 and the camera device 105 overlap may be identical or similar to the various embodiments described with reference to FIGS. 1, 2, 3, 4, 5, 6, 7, 8A, 8B, 9A, 9B, 10A, 10B, 11A, 11B, 12A, 12B, 13A, 13B, 14A, 14B, 15A, 15B, 16A, and 16B.

Figure 20A:
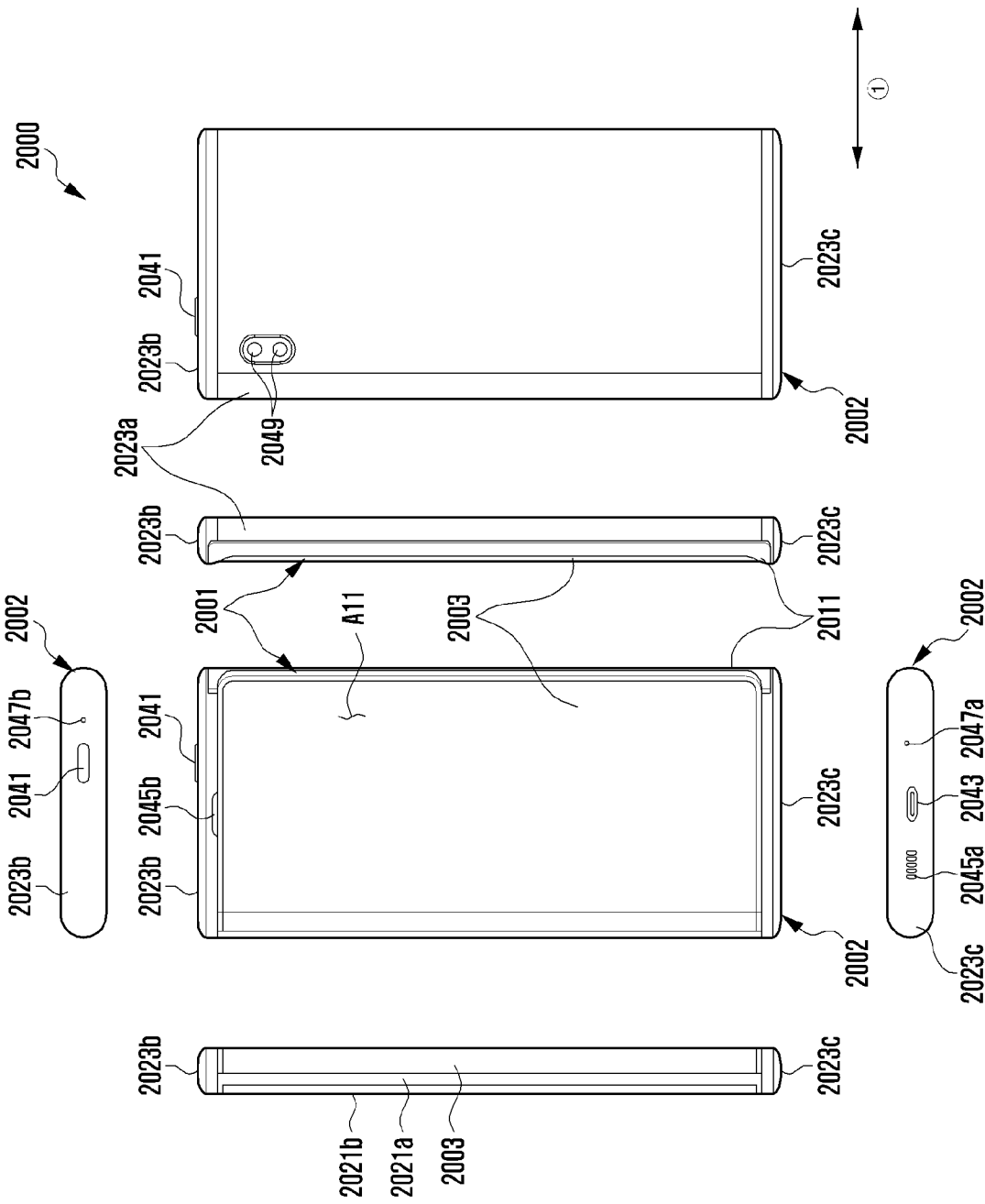
FIG. 20A shows a state in which a portion of a display is accommodated in a second housing according to an embodiment of the disclosure.
Figure 20B:
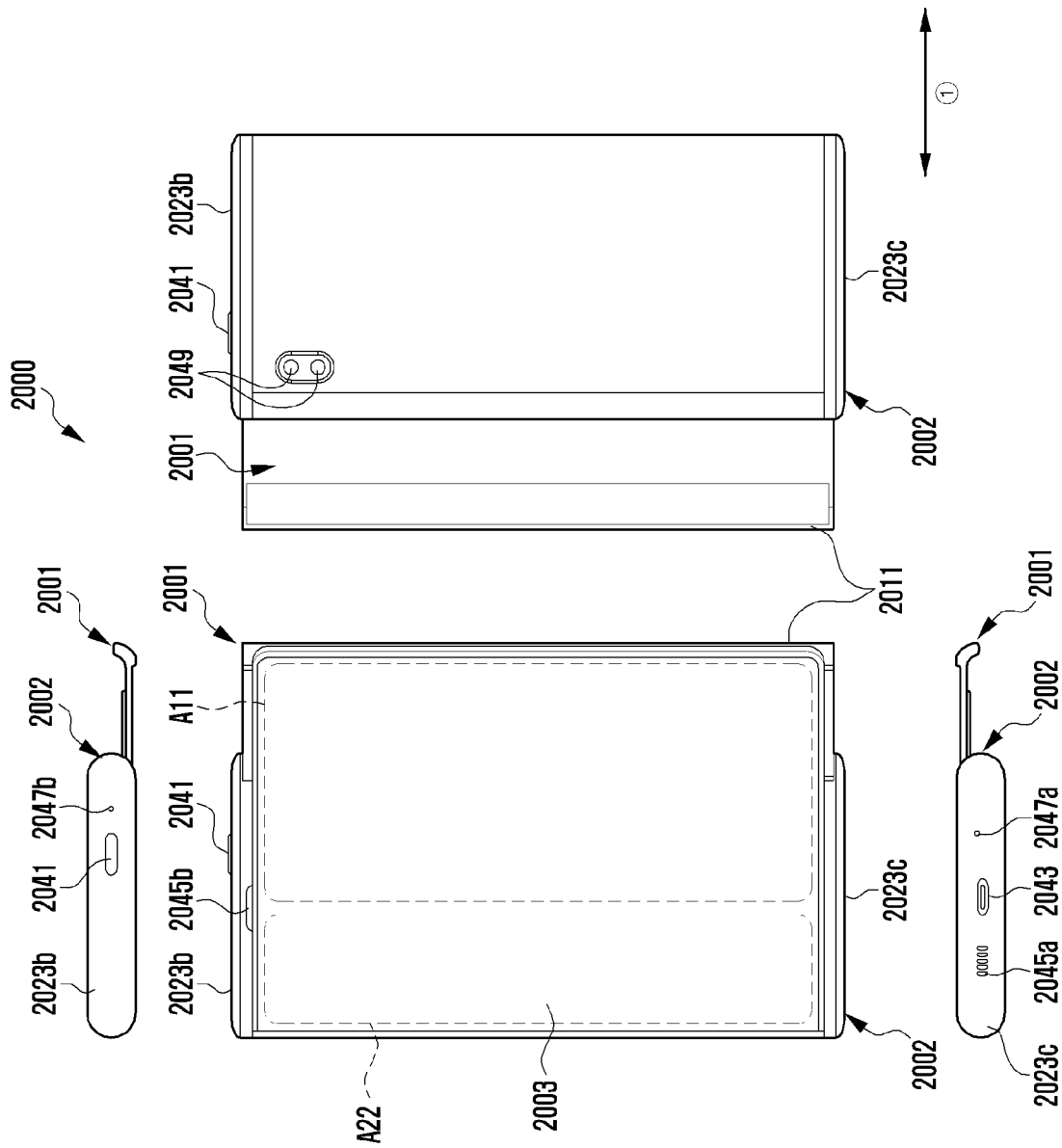
FIG. 20B shows a state in which most of the display is exposed to the outside of the second housing according to an embodiment of the disclosure.

FIG. 20A illustrates an electronic device and shows a state in which a portion (e.g., second area A22) of a display is accommodated in a second housing according to an embodiment of the disclosure. FIG. 20B illustrates an electronic device and shows a state in which most of a display is exposed to the outside of a second housing according to an embodiment of the disclosure.

The state illustrated in FIG. 20A may be defined as a state in which a first housing 2001 is closed with respect to a second housing 2002. The state illustrated in FIG. 20B may be defined as a state in which the first housing 2001 is opened with respect to the second housing 2002. According to various embodiments, a "closed state" or an "opened state" may be defined as a state in which the electronic device is closed or opened.

Referring to FIGS. 20A and 20B, an electronic device 2000 according to an embodiment may include the first housing 2001 and the second housing 2002 slidable from the first housing 2001. In an embodiment, in the electronic device 2000, the first housing 2001 may be disposed to be slidable on one surface of the second housing 2002. According to an embodiment, the second housing 2002 may be fixed, and the first housing 2001 may be disposed to reciprocate a predetermined distance in a designated direction from the second housing 2002, for example, in a direction indicated by an arrow ①.

According to an embodiment, the first housing 2001 may be referred to as, for example, a first housing, a slide unit, or a slide housing. According to an embodiment, the first housing 2001 may reciprocate in a specific direction (e.g., the direction indicated by ①) while being coupled with the second housing 2002.

In an embodiment, the second housing 2002 may be referred to as, for example, a second housing, a main unit, or a main housing. According to an embodiment, the second housing 2002 may accommodate various electrical and electronic components such as a main circuit board or a battery.

According to an embodiment, the first housing 2001 may include a first plate 2011 (e.g., a slide plate). According to an embodiment, a portion (e.g., the first area A11) of a display 2003 may be seated on one surface of the first plate 2011. In an embodiment, the display 2003 may further include another portion (e.g., the second area A22) extending from the seated portion (e.g., the first area A11). In an embodiment, the other portion (e.g., the second area A22) of the display 2003 may be accommodated in the second housing 2002 or exposed to the outside of the second housing 2002, depending on the movement of the first housing 2001. For example, the other portion (e.g., the second area A22) of the display 2003 may be accommodated in (e.g., slid in) the second housing 2002 or exposed out of (e.g., slid out of) the second housing 2002, depending on the movement (e.g., sliding) of the first housing 2001 with respect to the second housing 2002.

According to an embodiment, the display 2003 may include the first area A11 which appears to be fixed irrespective of the movement of the first housing 2001, and the second area A22 which is accommodated in (e.g., slid in) the second housing 2002 or exposed out of (e.g., slid out of) the second housing 2002 depending on the movement of the first housing 2001. In an embodiment, the second area A22 may move while being guided by a roller (not shown) disposed in the second housing 2002. For example, when the first housing 2001 slides, the roller may be rotated. For example, the second area A22 of the display 2003 may be accommodated in (e.g., slid in) the second housing 2002 by the rotation of the roller. For example, the second area A22 of the display 2003 may be exposed out of (e.g., slid out of) the second housing 2002 by the rotation of the roller.

According to an embodiment, the second housing 2002 may include a second plate 2021a and a rear plate 2021b (e.g., a rear window) opposite to the second plate 2021a. According to an embodiment, the second housing 2002 may include a side wall surrounding a space formed between the second plate 2021a and the rear plate 2021b. For example, the second housing may include a first side wall 2023a extending from the second plate 2021a, a second side wall 2023b extending from the first side wall 2023a and the second plate 2021a, and a third side wall 2023c extending from the first side wall 2023a and the second plate 2021a and parallel to the second side wall 2023b.

In an embodiment, the second side wall 2023b and the third side wall 2023c may be formed perpendicular to the first side wall 2023a. According to an embodiment, the second plate 2021a, the first side wall 2023a, the second side wall 2023b, and the third side wall 2023c may have one side (e.g., a front face) open to accommodate (or surround) at least a portion of the first housing 2001. For example, the first housing 2001 may be coupled to the second housing 2002 while being at least partially surrounded. For example, the first housing 2001 may slide in a designated direction, for example, in the direction of arrow ① while being guided by the second housing 2002.

According to an embodiment, the second side wall 2023b or the third side wall 2023c may be omitted. According to an embodiment, the second plate 2021a, the first side wall 2023a, the second side wall 2023b, and/or the third side wall 2023c may be formed as separate housings to be combined or assembled. The rear plate 2021b may be coupled to surround at least a portion of the second plate 2021a. In an embodiment, the rear plate 2021b may be formed substantially integrally with the second plate 2021a. According to an embodiment, the second plate 2021a or the rear plate 2021b may cover at least a portion of the display 2003. For example, the display 2003 may be at least partially accommodated in the second housing 2002, and the second plate 2021a or the rear plate 2021b may cover the portion of the display 2003 accommodated in the second housing 2002.

According to one embodiment, when the first plate 2011 (e.g., the slide plate) is viewed from above, if the first housing 2001 moves from a closed state to an opened state, the second area A22 may be gradually exposed to the outside of the second housing 2002 to form a substantially flat surface together with the first area A11. The display 2003 may be coupled to or disposed adjacent to a touch sensing circuit, a pressure sensor capable of measuring the intensity (pressure) of a touch, and/or a digitizer for detecting a magnetic field-type stylus pen. In an embodiment, the second area A22 may be at least partially accommodated in the second housing 2002, and even in the state (e.g., the closed state) illustrated in FIG. 20A, a portion of the second area A22 may be exposed to the outside. In an embodiment, regardless of the closed state or the opened state, a portion of the exposed second area A22 may be positioned on a roller (not shown), and a portion of the second area A22 at a position corresponding to the roller 2051 may maintain a curved shape.

According to an embodiment, the electronic device 2000 may further include a key input device 2041, a connector hole 2043, audio modules 2045a, 2045b, 2047a, and 2047b, or a camera module 2049. Although not illustrated, the electronic device 2000 may further include an indicator (e.g., an LED device) or various sensor modules.

According to an embodiment, the key input device 2041 may be disposed on the second side wall 2023b or the third side wall 2023c of the second housing 2002. The electronic device 2000 may be designed depending on the appearance and usage state such that the illustrated key input device 2041 is omitted or an additional key input device (additional key input devices) is (are) included. In an embodiment, the electronic device 2000 may include a key input device, which has not been illustrated, for example, a home key button or a touch pad disposed around the home key button. According to another embodiment, at least a portion of the key input device 2041 may be positioned in one area of the first housing 2001.

According to an embodiment, the connector hole 2043 may be omitted, and may accommodate a connector (e.g., a USB connector) for transmitting and receiving power and/or data to and from an external electronic device. Although not illustrated, the electronic device 2000 may include multiple connector holes 2043, and some of the multiple connector holes 2043 may function as connector holes for transmitting and receiving audio signals to and from an external electronic device. In the illustrated embodiment, the connector hole 2043 is disposed in the third side wall 2023c. However, the disclosure is not limited thereto, and the connector hole 2043 or an unillustrated connector hole may be disposed in the first side wall 2023a or the second side wall 2023b.

According to an embodiment, the audio modules 2045a, 2045b, 2047a, and 2047b may include speaker holes 2045a and 2045b or microphone holes 2047a and 2047b. One of the speaker holes 2045a and 2045b may be provided as a receiver hole for a voice call, and the other may be provided as an external speaker hole. In the microphone holes 2047a and 2047b, a microphone for acquiring an external sound may be disposed, and in an embodiment, multiple microphones may be disposed to detect the direction of sound. In an embodiment, the speaker holes 2045a and 2045b and the microphone holes 2047a and 2047b may be implemented as a single hole, or a speaker may be included without the speaker holes 2045a and 2045b (e.g., piezo speaker). According to one embodiment, the speaker hole indicated by reference numeral "2045b" may be disposed in the first housing 2001 so as to be used as a receiver hole for voice calls, and the speaker hole (e.g., the external speaker hole) indicated by reference numeral "2045a", or the microphone hole 2047a and 2047b may be disposed in the second housing 2002 (e.g., one of side walls 2023a, 2023b, and 2023c).

According to an embodiment, the camera module 2049 may be disposed in the second housing 2002 and may capture an image of a subject in a direction opposite to a direction faced by the first area A11 of the display 2003. The electronic device 2000 may include multiple camera modules 2049. For example, the electronic device 2000 may include a wide-angle camera, a telephoto camera, or a close-up camera, and according to an embodiment, may include an infrared projector and/or an infrared receiver, thereby measuring a distance to a subject. The camera module 2049 may include one or more lenses, an image sensor, and/or an image signal processor. Although not illustrated, the electronic device 2000 may further include a camera module (e.g., a front camera) for capturing an image of a subject in a direction opposite to the first area A11 of the display 2003. For example, the front camera may be disposed in the periphery the first area A11 or in an area overlapping the display 2003, and when placed in the area overlapping with the display 2003, may capture an image of the subject through the display 2003.

According to an embodiment, the indicator (not shown) of the electronic device 2000 may be disposed in the first housing 2001 or the second housing 2002, and may include a light-emitting diode to provide state information of the electronic device 2000 as a visual signal. The sensor module (not shown) of the electronic device 2000 may generate an electrical signal or data value corresponding to an internal operation state of the electronic device 2000 or an external environmental state. The sensor module may include, for example, a proximity sensor, a fingerprint sensor, or a biometric sensor (e.g., an iris/face recognition sensor or an HRM sensor). In another embodiment, the sensor module may further include at least one among, for example, a gesture sensor, a gyro sensor, a barometric pressure sensor, a magnetic sensor, an acceleration sensor, a grip sensor, a color sensor, an infrared (IR) sensor, a temperature sensor, a humidity sensor, or an illuminance sensor.

In the electronic device 2000 described with reference to FIGS. 20A and 20B, a camera device (e.g., the camera device 105 of FIG. 1 or the camera device 500 of FIG. 3) may be disposed on the rear surface (e.g., the bottom) of the display 2003. For example, the camera device 105 may be disposed in the first area A11 that appears to be fixed regardless of the movement of the first housing 2001. For example, the structure of a portion where the display 2003 and the camera device 105 overlap may be identical or similar to the various embodiments described with reference to FIGS. 1, 2, 3, 4, 5, 6, 7, 8A, 8B. 9A, 9B, 10A, 10B, 11A, 11B, 12A, 12B, 13A, 13B, 14A, 14B, 15A, 15B, 16A, 16B, 17, 18, and 19. Hereinafter, the structure of the portion overlapping the camera device 105 will be described in more detail with reference to FIGS. 21 and 22.

Figure 21:
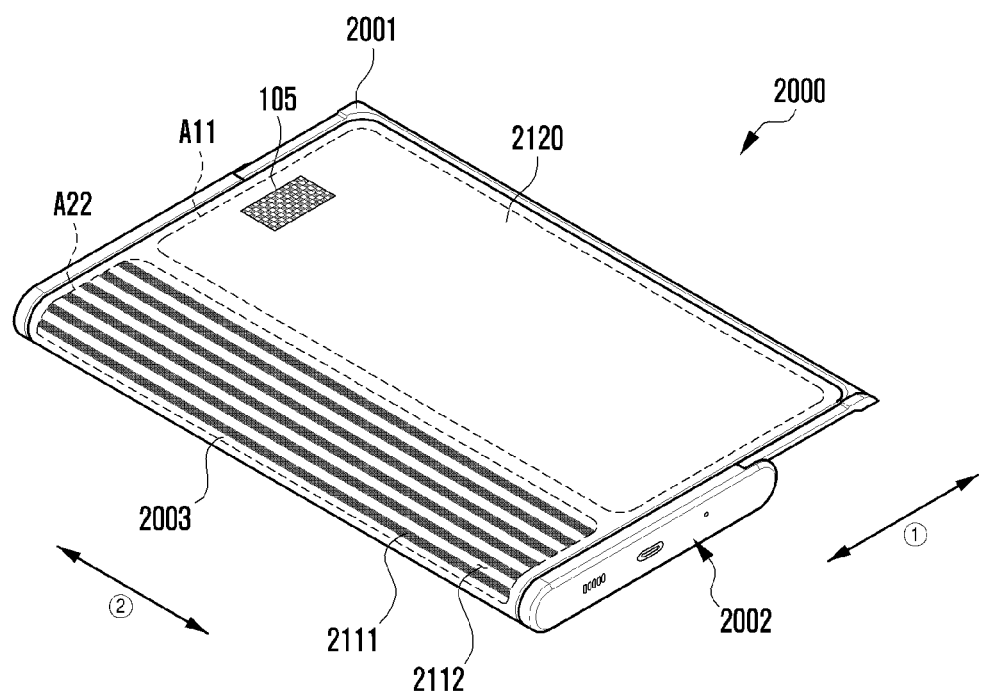
FIG. 21 illustrates an embodiment of an electronic device described with reference to FIGS. 20A and 20B according to an embodiment of the disclosure.

FIG. 21 illustrates an embodiment of an electronic device described with reference to FIGS. 20A and 20B, and shows a state in which most of a display is exposed to the outside of a second housing according to an embodiment of the disclosure.

The electronic device 2000 illustrated in FIG. 21 may be at least partially similar to or identical to the electronic device 2000 illustrated in FIGS. 20A and 20B. Hereinafter, only a description, which has not been made, will be made with reference to FIG. 21.

Referring to FIG. 21, in the electronic device 2000 according to an embodiment, a camera device (e.g., the camera device 105 of FIG. 1 or the camera device 500 of FIG. 3) may be disposed on the rear surface (e.g., the bottom) of the display 2003. For example, the camera device 105 may be disposed in the first area A11 that appears to be fixed regardless of the movement of the first housing 2001. For example, the structure of a mask layer (e.g., the mask layer 431s of FIG. 7) in a portion in which the display 2003 and the camera device 105 overlap may be identical or similar to the various embodiments described with reference to FIGS. 1, 2, 3, 4, 5, 6, 7, 8A, 8B, 9A, 9B, 10A, 10B, 11A, 11B, 12A, 12B, 13A, 13B, 14A, 14B, 15A, 15B, 16A, and 16B.

According to an embodiment, the mask layer 431s may further include opaque masks 2111 arranged with a designated shape in the second area A22 that is exposed to the outside of the second housing 2002 (e.g., a slide-out operation). For example, the opaque masks 2111 may be formed in a direction (e.g., direction ②) perpendicular to a direction in which the display 2003 is accommodated in (e.g., slid in) the second housing 2002 or exposed out of (e.g., slid out of) the second housing 2002.

According to an embodiment, the opaque masks 2111 may be arranged and formed to have multiple columns in the second area A22, and a transmissive area 2112 in which an opaque mask is not formed may be formed in a slit shape between adjacent opaque masks 2111.

According to an embodiment, the opaque masks 2111 may be arranged and formed to have multiple columns in the second area A22, and thus, when the display 2003 is accommodated in (e.g., slid in) the second housing 2002 or exposed out of (e.g., slid out of) the second housing 2002 depending on the movement of the first housing 2001, the stress applied to the display 2003 may be reduced, and the display 2003 may be easily bent.

Unlike the illustrated embodiment, the opaque masks 2111 formed in the second area A22 may be variously modified or changed. For example, the opaque masks 2111 formed in the second area A22 may be arranged in the direction (e.g., direction ①) in which the display 2003 is accommodated in (e.g., slid in) the second housing 2002 or exposed out of (e.g., slid out of) the second housing 2002. For example, each of the opaque masks 2111 formed in the second area A22 may have a length in the direction ① of FIG. 21.

Unlike the illustrated embodiment, opaque masks 2111 formed in the first area A11 may be variously modified or changed. For example, the opaque masks 2111 formed in the first area A11 may not only be at least partially formed at a portion overlapping with the camera device 105, but may also be further formed at a portion (e.g., portion corresponding to 2120 of FIG. 21) that does not overlap the camera device 105. For example, opaque masks 2211 formed in the first area A11 may be formed in a shape identical or similar to those of the opaque masks 711, 712, 713, and 714 described with reference to FIGS. 11A and 11B, or may be formed to correspond to the entirety of the portion (e.g., the portion corresponding to 2120 of FIG. 21) that does not overlap the camera device 105 like the mask layer 431s illustrated in FIGS. 12A and 12B.

Figure 22:
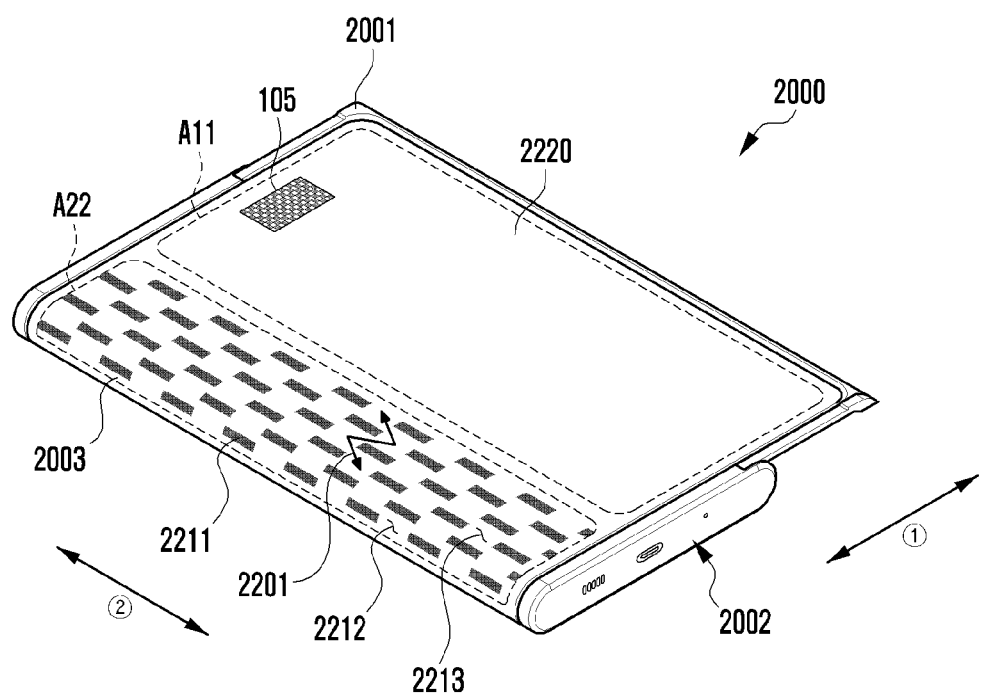
FIG. 22 illustrates another embodiment of an electronic device described with reference to FIGS. 20A and 20B according to an embodiment of the disclosure.

FIG. 22 illustrates another embodiment of an electronic device described with reference to FIGS. 20A and 20B, and shows a state in which most of a display is exposed to the outside of a second housing according to an embodiment of the disclosure.

The electronic device 2000 illustrated in FIG. 22 may be at least partially similar or identical to the electronic device 2000 illustrated in FIGS. 20A, 20B, and 21. Hereinafter, only a description, which has not been made, will be made with reference to FIG. 22.

Referring to FIG. 22, according to one embodiment, the mask layer 431s may further include opaque masks 2211 arranged with a designated shape in the second area A22 exposed out of (e.g., slid out of) the second housing 2002. For example, the opaque masks 2211 may be formed in a direction (e.g., direction ②) perpendicular to a direction in which the display 2003 is accommodated in (e.g., slid in) the second housing 2002 or exposed out of (e.g., slid out of) the second housing 2002.

According to an embodiment, the opaque masks 2211 may be arranged and formed to have multiple columns in the second area A22, and a transmissive area 2212 in which an opaque mask is not formed may be formed in a slit shape between adjacent opaque masks 2211.

According to an embodiment, each column of the opaque masks 2211 may not be continuously connected and may include segment portions 2213. For example, the segment portions 2213 may imply portions of the mask layer 431s, in which the opaque masks 2211 are not formed.

According to an embodiment, the segment portions 2213 formed in each column of the opaque masks 2211 may be formed so as not to be adjacent to segment portions 2213 formed in an adjacent column. For example, the segment portions 2213 formed in each column of the opaque mask 2211 may be formed in a zigzag type without being parallel thereto as indicated by arrow 2201.

Unlike the illustrated embodiment, the opaque masks 2211 formed in the second area A22 may be variously modified or changed. For example, the opaque masks 2211 formed in the second area A22 may be arranged in the direction (e.g., direction ①) in which the display 2003 is accommodated in (e.g., slid in) the second housing 2002 or exposed out of (e.g., slid out of) the second housing 2002. For example, each of the opaque masks 2211 formed in the second area A22 may have a length in the direction ① of FIG. 22.

Unlike the illustrated embodiment, opaque masks 2211 formed in the first area A11 may be variously modified or changed. For example, the opaque masks 2211 formed in the first area A11 may not only be at least partially formed at a portion overlapping with the camera device 105, but may also be further formed at a portion (e.g., portion corresponding to 2220 of FIG. 22) that does not overlap the camera device 105. For example, the opaque masks 2211 formed in the first area A11 may be formed in a shape identical or similar to those of the opaque masks 711, 712, 713, and 714 described with reference to FIGS. 11A and 11B, or may be formed to correspond to the entirety of the portion (e.g., the portion corresponding to 2220 of FIG. 22) that does not overlap the camera device 105 like the mask layer 431s illustrated in FIGS. 12A and 12B.

Figure 23:
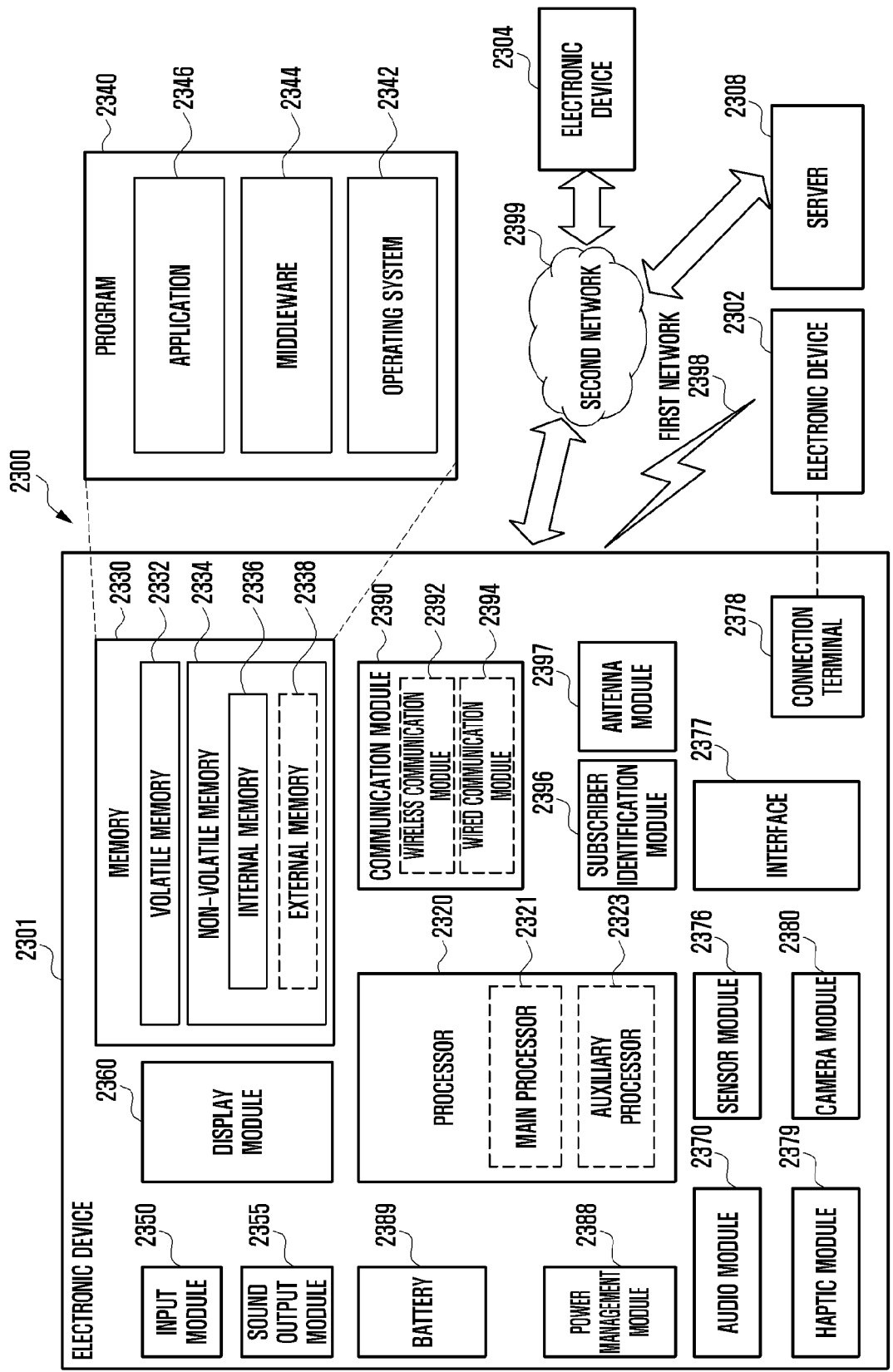
FIG. 23 is a block diagram of an electronic device in a network environment according to an embodiment of the disclosure.

FIG. 23 is a block diagram illustrating an electronic device in a network environment according to an embodiment of the disclosure.

Electronic device 2301 illustrated in FIG. 23 may be at least partially similar to the electronic devices described with reference to FIGS. 1, 2, 3, 4, 5, 6, 7, 8A, 8B, 9A, 9B, 10A, 10B, 11A, 11B, 12A, 12B, 13A, 13B, 14A, 14B, 15A, 15B, 16A, 16B, 17, 18, 19, 20A, 20B, 21, and 22 (e.g., the electronic device 100 illustrated in FIG. 1 or the electronic device 300 illustrated in FIG. 3), or may further include another embodiment. According to various embodiments, a camera module 2380 illustrated in FIG. 23 may be at least partially similar to the camera device 105 of FIG. 1, the camera device 500 of FIG. 3, the camera device 500 of FIG. 5, the camera device 105 of FIGS. 18 and 19, the camera module 2049 of FIGS. 20A and 20B, and/or the camera device 105 of FIGS. 21 and 22, or may further include another embodiment.

Referring to FIG. 23, an electronic device 2301 in a network environment 2300 may communicate with an electronic device 2302 via a first network 2398 (e.g., a short-range wireless communication network), or at least one of an electronic device 2304 or a server 2308 via a second network 2399 (e.g., a long-range wireless communication network). According to an embodiment, the electronic device 2301 may communicate with the electronic device 2304 via the server 2308. According to an embodiment, the electronic device 2301 may include a processor 2320, memory 2330, an input module 2350, a sound output module 2355, a display module 2360, an audio module 2370, a sensor module 2376, an interface 2377, a connection terminal 2378, a haptic module 2379, the camera module 2380, a power management module 2388, a battery 2389, a communication module 2390, a subscriber identification module (SIM) 2396, or an antenna module 2397. In some embodiments, at least one of the components (e.g., the connection terminal 2378) may be omitted from the electronic device 2301, or one or more other components may be added in the electronic device 2301. In some embodiments, some of the components (e.g., the sensor module 2376, the camera module 2380, or the antenna module 2397) may be implemented as a single component (e.g., the display module 2360).

The processor 2320 may execute, for example, software (e.g., a program 2340) to control at least one other component (e.g., a hardware or software component) of the electronic device 2301 coupled with the processor 2320, and may perform various data processing or computation. According to one embodiment, as at least part of the data processing or computation, the processor 2320 may store a command or data received from another component (e.g., the sensor module 2376 or the communication module 2390) in volatile memory 2332, process the command or the data stored in the volatile memory 2332, and store resulting data in non-volatile memory 2334. According to an embodiment, the processor 2320 may include a main processor 2321 (e.g., a central processing unit (CPU) or an application processor (AP)), or an auxiliary processor 2323 (e.g., a graphics processing unit (GPU), a neural processing unit (NPU), an image signal processor (ISP), a sensor hub processor, or a communication processor (CP)) that is operable independently from, or in conjunction with, the main processor 2321. For example, when the electronic device 2301 includes the main processor 2321 and the auxiliary processor 2323, the auxiliary processor 2323 may be adapted to consume less power than the main processor 2321, or to be specific to a specified function. The auxiliary processor 2323 may be implemented as separate from, or as part of the main processor 2321.

The auxiliary processor 2323 may control at least some of functions or states related to at least one component (e.g., the display module 2360, the sensor module 2376, or the communication module 2390) among the components of the electronic device 2301, instead of the main processor 2321 while the main processor 2321 is in an inactive (e.g., sleep) state, or together with the main processor 2321 while the main processor 2321 is in an active state (e.g., executing an application). According to an embodiment, the auxiliary processor 2323 (e.g., an image signal processor or a communication processor) may be implemented as part of another component (e.g., the camera module 2380 or the communication module 2390) functionally related to the auxiliary processor 2323. According to an embodiment, the auxiliary processor 2323 (e.g., the neural processing unit) may include a hardware structure specified for artificial intelligence model processing. An artificial intelligence model may be generated by machine learning. Such learning may be performed, e.g., by the electronic device 2301 where the artificial intelligence is performed or via a separate server (e.g., the server 2308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2330 may store various data used by at least one component (e.g., the processor 2320 or the sensor module 2376) of the electronic device 2301. The various data may include, for example, software (e.g., the program 2340) and input data or output data for a command related thereto. The memory 2330 may include the volatile memory 2332 or the non-volatile memory 2334.

The program 2340 may be stored in the memory 2330 as software, and may include, for example, an operating system (OS) 2342, middleware 2344, or an application 2346.

The input module 2350 may receive a command or data to be used by another component (e.g., the processor 2320) of the electronic device 2301, from the outside (e.g., a user) of the electronic device 2301. The input module 2350 may include, for example, a microphone, a mouse, a keyboard, a key (e.g., a button), or a digital pen (e.g., a stylus pen).

The sound output module 2355 may output sound signals to the outside of the electronic device 2301. The sound output module 2355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2360 may visually provide information to the outside (e.g., a user) of the electronic device 2301. The display module 2360 may include, for example, a display, a hologram device, or a projector and control circuitry to control a corresponding one of the display, hologram device, and projector. According to an embodiment, the display module 2360 may include a touch sensor adapted to detect a touch, or a pressure sensor adapted to measure the intensity of force incurred by the touch.

The audio module 2370 may convert a sound into an electrical signal and vice versa. According to an embodiment, the audio module 2370 may obtain the sound via the input module 2350, or output the sound via the sound output module 2355 or a headphone of an external electronic device (e.g., electronic device 2302) directly (e.g., wiredly) or wirelessly coupled with the electronic device 2301.

The sensor module 2376 may detect an operational state (e.g., power or temperature) of the electronic device 2301 or an environmental state (e.g., a state of a user) external to the electronic device 2301, and then generate an electrical signal or data value corresponding to the detected state. According to an embodiment, the sensor module 2376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2377 may support one or more specified protocols to be used for the electronic device 2301 to be coupled with the external electronic device (e.g., electronic device 2302) directly (e.g., wiredly) or wirelessly. According to an embodiment, the interface 2377 may include, for example, a high definition multimedia interface (HDMI), a universal serial bus (USB) interface, a secure digital (SD) card interface, or an audio interface.

The connection terminal 2378 may include a connector via which the electronic device 2301 may be physically connected with the external electronic device (e.g., electronic device 2302). According to an embodiment, the connection terminal 2378 may include, for example, an HDMI connector, a USB connector, an SD card connector, or an audio connector (e.g., a headphone connector).

The haptic module 2379 may convert an electrical signal into a mechanical stimulus (e.g., a vibration or a movement) or electrical stimulus which may be recognized by a user via his tactile sensation or kinesthetic sensation. According to an embodiment, the haptic module 2379 may include, for example, a motor, a piezoelectric element, or an electric stimulator.

The camera module 2380 may capture a still image or moving images. According to an embodiment, the camera module 2380 may include one or more lenses, image sensors, image signal processors, or flashes.

The power management module 2388 may manage power supplied to the electronic device 2301. According to one embodiment, the power management module 2388 may be implemented as at least part of, for example, a power management integrated circuit (PMIC).

The battery 2389 may supply power to at least one component of the electronic device 2301. According to an embodiment, the battery 2389 may include, for example, a primary cell which is not rechargeable, a secondary cell which is rechargeable, or a fuel cell.

The communication module 2390 may support establishing a direct (e.g., wired) communication channel or a wireless communication channel between the electronic device 2301 and the external electronic device (e.g., electronic device 2302, the electronic device 2304, or the server 2308) and performing communication via the established communication channel. The communication module 2390 may include one or more communication processors that are operable independently from the processor 2320 (e.g., the application processor (AP)) and supports a direct (e.g., wired) communication or a wireless communication. According to an embodiment, the communication module 2390 may include a wireless communication module 2392 (e.g., a cellular communication module, a short-range wireless communication module, or a global navigation satellite system (GNSS) communication module) or a wired communication module 2394 (e.g., a local area network (LAN) communication module or a power line communication (PLC) module). A corresponding one of these communication modules may communicate with the external electronic device via the first network 2398 (e.g., a short-range communication network, such as Bluetooth™, wireless-fidelity (Wi-Fi) direct, or infrared data association (IrDA)) or the second network 2399 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2392 may identify and authenticate the electronic device 2301 in a communication network, such as the first network 2398 or the second network 2399, using subscriber information (e.g., international mobile subscriber identity (IMSI)) stored in the subscriber identification module 2396.

The wireless communication module 2392 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2392 may support a high-frequency band (e.g., the millimeter wave (mmWave) band) to achieve, e.g., a high data transmission rate. The wireless communication module 2392 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 2392 may support various requirements specified in the electronic device 2301, an external electronic device (e.g., electronic device 2304), or a network system (e.g., the second network 2399). According to an embodiment, the wireless communication module 2392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2397 may transmit or receive a signal or power to or from the outside (e.g., the external electronic device) of the electronic device 2301. According to an embodiment, the antenna module 2397 may include an antenna including a radiating element composed of a conductive material or a conductive pattern formed in or on a substrate (e.g., a printed circuit board (PCB)). According to an embodiment, the antenna module 2397 may include a plurality of antennas (e.g., array antennas). In such a case, at least one antenna appropriate for a communication scheme used in the communication network, such as the first network 2398 or the second network 2399, may be selected, for example, by the communication module 2390 (e.g., the wireless communication module 2392) from the plurality of antennas. The signal or the power may then be transmitted or received between the communication module 2390 and the external electronic device via the selected at least one antenna. According to an embodiment, another component (e.g., a radio frequency integrated circuit (RFIC)) other than the radiating element may be additionally formed as part of the antenna module 2397.

According to various embodiments, the antenna module 2397 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2301 and the external electronic device 2304 via the server 2308 coupled with the second network 2399. Each of the electronic devices 2302 or 2304 may be a device of a same type as, or a different type, from the electronic device 2301. According to an embodiment, all or some of operations to be executed at the electronic device 2301 may be executed at one or more of the external electronic devices (e.g., electronic devices 2302 and 2304 or the server 2308). For example, if the electronic device 2301 should perform a function or a service automatically, or in response to a request from a user or another device, the electronic device 2301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2301. The electronic device 2301 may provide the outcome, with or without further processing of the outcome, as at least part of a reply to the request. To that end, a cloud computing, distributed computing, mobile edge computing (MEC), or client-server computing technology may be used, for example. The electronic device 2301 may provide ultra low-latency services using, e.g., distributed computing or mobile edge computing. In another embodiment, the external electronic device 2304 may include an internet-of-things (IoT) device. The server 2308 may be an intelligent server using machine learning and/or a neural network. According to an embodiment, the external electronic device 2304 or the server 2308 may be included in the second network 2399. The electronic device 2301 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2340) including one or more instructions that are stored in a storage medium (e.g., internal memory 2336 or external memory 2338) that is readable by a machine (e.g., the electronic device 2301). For example, a processor (e.g., the processor 2320) of the machine (e.g., the electronic device 2301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
 a display including a first active area and a second active area surrounding the first active area; and
 a camera disposed under the first active area of the display, the camera configured to receive external light through at least a portion of the first active area of the display,
 wherein the display comprises:
  a pixel layer including a plurality of pixels,
  a base layer disposed under the pixel layer, and
  a mask layer disposed between the pixel layer and the base layer, the mask layer including an opaque metal mask and a plurality of openings,
 wherein a first portion of the opaque metal mask is disposed to overlap a first plurality of pixels in the first active area of the display,
 wherein at least one of the plurality of openings is disposed in the first active area of the display such that the camera receives external light through the at least one of the plurality of openings disposed in the first active area of the display, and
 wherein the opaque metal mask further comprises a second portion surrounding an outer boundary of a field-of-view area corresponding to a field of view of the camera with a designated width.

2. The electronic device of claim 1, wherein the opaque metal mask further comprises a third portion at least partially formed in the first active area and formed outside the second portion.

3. The electronic device of claim 2, wherein the opaque metal mask further comprises a fourth portion at least partially formed in the second active area.

4. The electronic device of claim 3,
 wherein the first portion comprises a first pattern,
 wherein the third portion comprises a second pattern, and
 wherein the fourth portion comprises a third pattern.

5. The electronic device of claim 4, wherein the first pattern, the second pattern, and the third pattern are identical.

6. The electronic device of claim 4,
 wherein the second pattern is different from the first pattern, and
 wherein the third pattern is different from each of the first pattern and the second pattern.

7. The electronic device of claim 3, wherein the fourth portion corresponds to an entirety of the second active area.

8. The electronic device of claim 2, wherein the third portion corresponds to an entirety of an area outside the second portion.

9. The electronic device of claim 1,
 wherein the display further comprises:
  a wiring layer stacked in a first direction from the base layer and having multiple wirings and multiple thin film transistors formed therein;
  an intermediate layer stacked in the first direction from the wiring layer and comprising an organic layer; and
  an encapsulation layer stacked in the first direction from the intermediate layer, and
 wherein the mask layer is stacked between the base layer and the wiring layer.

10. The electronic device of claim 1, further comprising:
 a protective layer attached in a second direction from the display, the second direction being opposite to a first direction,
 wherein the protective layer is free of a metal sheet.

11. The electronic device of claim 1, wherein the opaque metal mask shields ambient noise and functions as a metal sheet attached to the display.

12. The electronic device of claim 1, wherein the mask layer includes the first portion of the opaque metal mask for reducing unintentional diffraction of light in the first active area.

13. The electronic device of claim 1, wherein the plurality of openings of the masking layer are arranged to be spaced apart from each other.

14. The electronic device of claim 1, wherein the plurality of openings defines transmissive areas which are formed in a circular or elliptical shape.

15. The electronic device of claim 1, wherein the first active area comprises a field-of-view area corresponding to a field of view of the camera.

* * * * *